US008942512B2

(12) United States Patent
Chen et al.

(10) Patent No.: US 8,942,512 B2
(45) Date of Patent: *Jan. 27, 2015

(54) METHODS AND SYSTEMS FOR PROCESSING A FIRST IMAGE WITH REFERENCE TO A SECOND IMAGE

(71) Applicant: École de Technologie Supérieure, Montreal (CA)

(72) Inventors: Guangyi Chen, Montreal (CA); Stephane Coulombe, Brossard (CA)

(73) Assignee: Ecole de Technologie Superieure, Montreal (CA)

(*) Notice: Subject to any disclaimer, the term of this patent is extended or adjusted under 35 U.S.C. 154(b) by 108 days.

This patent is subject to a terminal disclaimer.

(21) Appl. No.: 13/723,724

(22) Filed: Dec. 21, 2012

(65) Prior Publication Data

US 2013/0272627 A1    Oct. 17, 2013

Related U.S. Application Data

(60) Provisional application No. 61/580,200, filed on Dec. 24, 2011, provisional application No. 61/603,347, filed on Feb. 26, 2012.

(51) Int. Cl.
*G06K 9/32* (2006.01)
*G06T 3/00* (2006.01)
*G06T 7/00* (2006.01)

(52) U.S. Cl.
CPC ........... *G06T 3/0068* (2013.01); *G06T 7/0036* (2013.01)
USPC ............ 382/294; 382/295; 382/296; 382/298

(58) Field of Classification Search
USPC ......... 382/113, 278, 280, 294, 295, 296, 297, 382/298, 312, 128, 154, 289; 345/420, 428, 345/441; 348/218.1, 295
See application file for complete search history.

(56) References Cited

U.S. PATENT DOCUMENTS 7,187,810 B2    3/2007   Clune
7,853,098 B2    12/2010  Hardy
(Continued)

OTHER PUBLICATIONS

Z. Wang, A. C. Bovik, H.R. Sheikh and E.P. Simoncelli, "Image quality assessment: From error visibility to structural similarity," IEEE Transactions on Image Processing, vol. 13, No. 4, pp. 600-612, Apr. 2004.
(Continued)

*Primary Examiner* — Anh Do
(74) *Attorney, Agent, or Firm* — Victoria Donnelly; IP-Mex Inc.

(57) ABSTRACT

An image registration method is disclosed for processing a distorted image into a registered image that is aligned with reference to an original image. Distortions from the original image may include scaling, rotation, and noise. The method is based on correlating Radon transforms of both images to determine the rotation angle, and the scaling factor is determined by dividing averages of the overall luminance of each image on the assumption that any added noise will cancel. The Fast Fourier Transform (FFT) is used to estimate global spatial shifts. In one embodiment, the distorted image is first scaled to the size of the original image before being rotated. In another embodiment, the original image is first scaled to the size of the distorted image before rotating the distorted image, and finally scaling it to match the original image. A corresponding system for image registration is also provided.

22 Claims, 27 Drawing Sheets

(56) References Cited

U.S. PATENT DOCUMENTS 7,961,982 B2  6/2011  Sibiryakov
2010/0226592 A1  9/2010  Ferguson

OTHER PUBLICATIONS

H.R. Sheikh and A.C. Bovik, "Image information and visual quality," IEEE Transactions on Image Processing, vol. 15, No. 2, pp. 430-444, Feb. 2006.

S. Rezazadeh and S. Coulombe, "Novel discrete wavelet transform framework for full reference image quality assessment," Signal, Image and Video Processing, pp. 1-15, Sep. 2011.

S. Rezazadeh and S. Coulombe, "A novel discrete wavelet domain error-based image quality metric with enhanced perceptual performance," to appear in Procedia Engineering (Elsevier), Apr. 9, 2012.

S.E. Qian and G.Y. Chen, "Four reduced-reference metrics for measuring hyperspectral images after spatial resolution enhancement," ISPRS International Archives of the photogrammetry, Remote sensing and Spatial Information Sciences, Vienna, Austria, pp. 204-208, Jul. 5-7, 2010.

D.G. Lowe, "Distinctive Image Features from Scale-Invariant Keypoints," International Journal of Computer Vision, vol. 60, No. 2, pp. 91-110, Jan. 5, 2004.

G. Varghese and Z. Wang, "Video denoising based on a spatiotemporal Gaussian scale mixture model," IEEE Transactions on Circuits and Systems for Video Technology, vol. 20, No. 7, pp. 1032-1040, Jul. 2010.

H.R. Sheikh, Z. Wang, L. Cormack and A.C. Bovik, "LIVE image quality assessment database release 2," http://live.ece.utexas.edu/research/quality, Nov. 2006.

Z. Wang and Q. Li, "Information content weighting for perceptual image quality assessment," IEEE Transactions on Image Processing, vol. 20, No. 5, pp. 1185-1198, May 2011.

M.P. Sampat, Z. Wang, S. Gupta, A.C. Bovik and M.K. Markey, "Complex wavelet structure similarity: A new image similarity index," IEEE Transactions on Image Processing, vol. 18, No. 11, pp. 2385-2401, Nov. 2009.

G.Y. Chen, T.D. Bui and A. Krzyzak, "Invariant pattern recognition using radon, dual-tree complex wavelet and Fourier transforms," Pattern Recognition, vol. 42, No. 9, pp. 2013-2019, Apr. 2008.

G.Y. Chen and W. F. Xie, "Contour-based feature extraction using dual-tree complex wavelets," International Journal of Pattern Recognition and Artificial Intelligence, vol. 21, No. 7, pp. 1233-1245, Nov. 2007.

G.Y. Chen and W.F. Xie, "Pattern recognition with SVM and dual-tree complex wavelets," Image and Vision Computing, vol. 25, No. 6, pp. 960-966, Jun. 2007.

G.Y. Chen and B. Kegl, "Image denoising with complex ridgelets," Pattern Recognition, vol. 40, No. 2, pp. 578-585, Apr. 20, 2006.

A. Averbuch, R.R. Coifman, D.L. Donoho, M. Israeli, Y. Shkolnisky, and I. Sedelnikov, "A Framework for Discrete Integral Transformations II—The 2D Discrete Radon Transform," SIAM Journal on Scientific Computing, vol. 30, No. 2. pp. 785-803, Jan. 18, 2006.

G. Wolberg and S. Zokai "Robust Image Registration using Log-Polar Transform," Proceedings of the IEEE International Conference on Image Processing (ICIP), pp. 493-496, Sep. 2000.

B.S. Reddy and B.N. Chatterji, "An FFT-based technique for translation, rotation and scale-invariant image registration," IEEE Transactions on Image Processing, vol. 5, No. 8, pp. 1266-1271, Aug. 1996.

K. Jafari-Khouzani and H. Soltanian-Zadeh, "Radon transform orientation estimation for rotation invariant texture analysis," IEEE Transactions on Pattern Analysis and Machine Intelligence, vol. 27, No. 6, pp. 1004-1008, Jun. 2005.

E. De Castro and C. Morandi, "Registration of translated and rotated images using finite Fourier transforms," IEEE Transactions on Pattern Analysis and Machine Intelligence, vol. PAMI-95, pp. 700-703, Sep. 1987.

W. Wei, S. Wang, X. Zhang and Z. Tang, "Estimation of image rotation angle using interpolation-related spectral signatures with application to blind detection of image forgery," IEEE Transactions on Information Forensics and Security, vol. 5, No. 3, pp. 507-517, Sep. 2010.

H. Bay, A. Ess, T. Tuyte-Iaars and L. Van Gool "SURF: Speeded Up Robust Features," Computer Vision and Image Understanding (CVIU), vol. 110, No. 3, pp. 346-359, Jun. 2008.

K. Keller, A. Averbuch and M. Israeli, "Pseudo polar-based estimation of large translations, rotations, and scalings in images," IEEE Transactions on Image Processing, vol. 14, No. 1, pp. 12-22, Jan. 2005.

Y. Pan, K. Li and M. Hamdi, "An improved constant-time algorithm for computing the radon and hough transforms on a reconfigurable mesh," IEEE Transactions on Systems, Man, and Cybernetics, Part A—Systems and Humans, vol. 29, No. 4, pp. 417-421, Jul. 1999.

Nikolic, R.C. Muresan, W., Feng and W. Singer, "Scaled correlation analysis: a better way to compute a cross-correlogram," European Journal of Neuroscience, pp. 1-21, Mar. 2012.

D. G. Lowe, "Object Recognition from Local Scale-Invariant Features", University of British Columbia, Proc. of the International Conference Computer Vision, Sep. 1999.

Encyclopedia of Mathematics, Convolution of functions, Dec. 26, 2012, http://www.encyclopediaofmath.org/index.php/Convolution_of_fun . . . .

Scale-invariant feature transform, Wikipedia, Dec. 23, 2011, http://en.wikipedia.org/w/index/php?title=Scale-invariant.

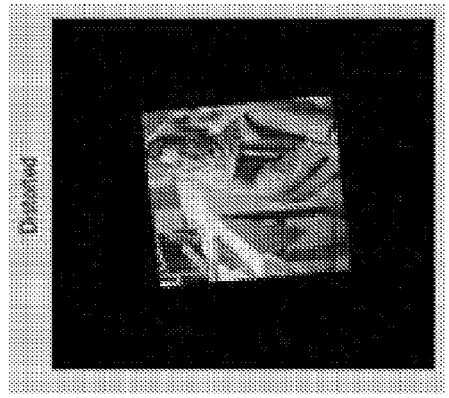
FIGURE 21A
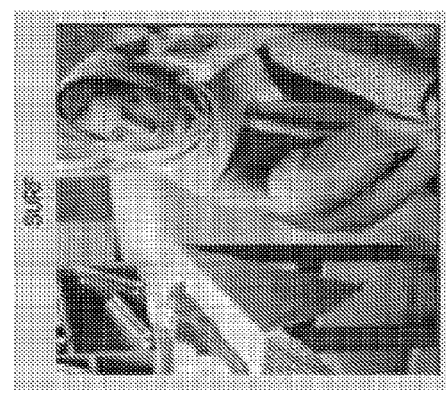
FIGURE 21C
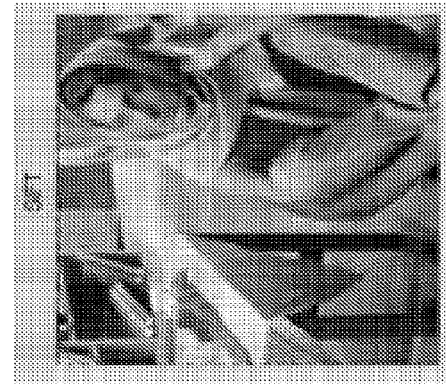
FIGURE 21B
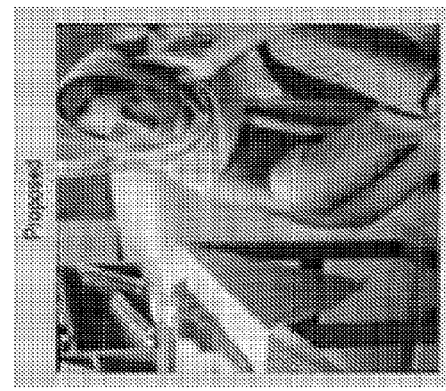
FIGURE 21D
FIGURE 21E

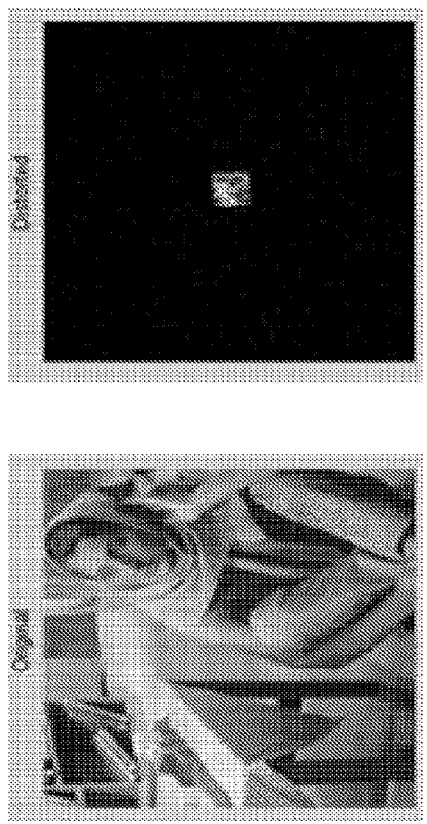
FIGURE 22A
FIGURE 22B
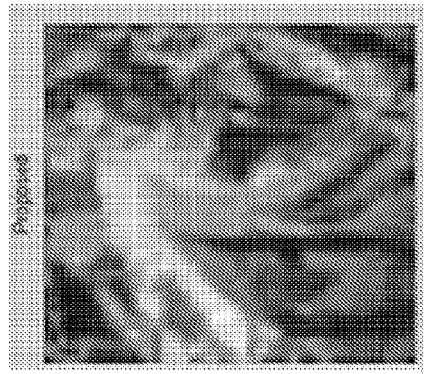
FIGURE 22C
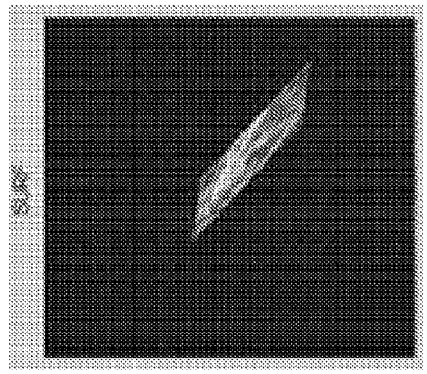
FIGURE 22D
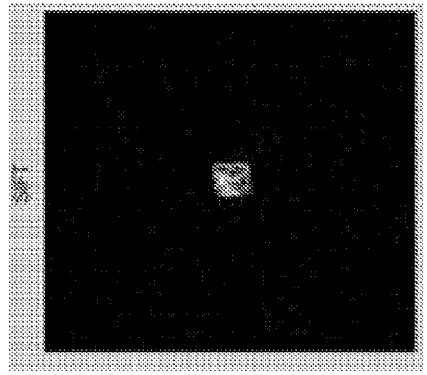
FIGURE 22E

METHODS AND SYSTEMS FOR PROCESSING A FIRST IMAGE WITH REFERENCE TO A SECOND IMAGE

RELATED APPLICATIONS

The present application claims priority from U.S. provisional application Ser. Nos. 61/580,200 filed on Dec. 24, 2011 and 61/603,347 filed on Feb. 26, 2012, entire contents of which are incorporated herein by reference.

FIELD OF THE INVENTION

The present invention generally relates to digital image processing, specifically to processing an image in combination with a reference image.

The present invention relates to image registration, including estimating translation, rotation, and scaling parameters between a reference image and a distorted image. In particular, the present invention relates to the image registration system and method robust to noise.

The present invention relates to the assessment of a visual quality of an image, and particular to a method and system for assessment of a visual quality of an image that are robust to affine transforms.

BACKGROUND OF THE INVENTION

Image registration is an important task in applications such as image quality assessment, medical imaging, automatic target recognition, and so forth. Existing image registration methods include for example: a paper by A. Averbuch, R. R. Coifman, D. L. Donoho, M. Israeli, Y. Shkolnisky, and I. Sedelnikov, "A Framework for Discrete Integral Transformations II—The 2D Discrete Radon Transform," *SIAM Journal on Scientific Computing*, vol. 30, no. 2, pp. 785-803, January 2008, who have used pseudo-polar-based estimation of large translations, rotations, and scalings in images; a paper by G. Wolberg and S. Zokai "Robust Image Registration Using Log-Polar Transform," Proceedings of the IEEE International Conference on Image Processing (ICIP), pp. 493-496, 2000, who have also worked on robust image registration by using the log-polar transform paper by G. Varghese and Z. Wang, "Video denoising based on a spatiotemporal Gaussian scale mixture model," IEEE Transactions on Circuits and Systems for Video Technology, vol. 20, no. 7, pp. 1032-1040, 2010, who have used the Fourier transform to estimate global spatial shifts; a paper by B. S. Reddy and B. N. Chatterji, "An FFT-based technique for translation, rotation and scale-invariant image registration," IEEE Transactions on Image Processing, vol. 5, no. 8, pp. 1266-1271, 1996 who have proposed an FFT-based technique for translation, rotation and scale-invariant image registration; a paper by K. Jafari-Khouzani and H. Soltanian-Zadeh, "Radon transform orientation estimation for rotation invariant texture analysis," IEEE Transactions on Pattern Analysis and Machine Intelligence, vol. 27, no. 6, pp. 1004-1008, 2005 who have applied the Radon transform to orientation estimation for rotation invariant texture analysis; a paper by E. De Castro and C. Morandi, "Registration of translated and rotated images using finite Fourier transforms," IEEE Transactions on Pattern Analysis and Machine Intelligence, vol. PAMI-95, pp. 700-703, 1987 who have developed an image registration method for translated and rotated images using finite Fourier transforms, but this method fails in the presence of scale change; a paper by W. Wei, S. Wang, X. Zhang and Z. Tang, "Estimation of image rotation angle using interpolation-related spectral signatures with application to blind detection of image forgery," IEEE Transactions on Information Forensics and Security, vol. 5, no. 3, pp. 507-517, 2010 who have estimated the image rotation angle by using interpolation-related spectral signatures with application to blind detection of image forgery; a paper by D. G. Lowe, "Distinctive Image Features from Scale-Invariant Keypoints," International Journal of Computer Vision, vol. 60, no. 2, pp. 91-110, 2004 who has proposed a distinctive image feature approach for scale-invariant keypoint extraction and registration (SIFT); and a paper by H. Bay, A. Ess, T. Tuytelaars and L. Van Gool "SURF: Speeded Up Robust Features," Computer Vision and Image Understanding (CVIU), vol. 110, no. 3, pp. 346-359, 2008 who have developed SURF (Speeded Up Robust Feature), which was claimed to be faster than SIFT.

In full reference image quality assessment, a comparison of a distorted image against a reference image is often used to obtain a visual quality metric, which is computed by comparing the two images. A number of methods exist for generating such a quality metric, among these: a simple peak signal-to-noise ratio (PSNR) measurement, a structural similarity (SSIM) index proposed in Z. Wang, A. C. Bovik, H. R. Sheikh and E. P. Simoncelli, "Image quality assessment: From error visibility to structural similarity," IEEE Transactions on Image Processing, vol. 13, no. 4, pp. 600-612, 2004, a visual information fidelity (VIF) index that was proposed in H. R. Sheikh and A. C. Bovik, "Image information and visual quality." IEEE Transactions on Image Processing, vol. 15, no. 2, pp. 430-444, 2006. Further, Rezazadeh and Coulombe proposed a discrete wavelet transform framework for full-reference image quality assessment in "Novel discrete wavelet transform framework for full reference image quality assessment," Signal, Image and Video Processing, pp. 1-15, September 2011, and in "A novel discrete wavelet domain error-based image quality metric with enhanced perceptual performance," to appear in Procedia Engineering (Elsevier), while Qian and Chen in "Four reduced-reference metrics for measuring hyperspectral images after spatial resolution enhancement," ISPRS International Archives of the Photogrammetry, Remote Sensing and Spatial Information Sciences, Vienna, Austria, pp. 204-208, Jul. 5-7, 2010 developed four reduced-reference metrics for measuring the visual quality of hyperspectral images after spatial resolution enhancement.

However, there is still the need in the industry for the development of simple yet quick and accurate methods for realignment of an image with a reference image, which would avoid or mitigate disadvantages of the prior art, be capable of improving the objective measurement of visual image quality, and provide image registration that is robust to noise.

SUMMARY OF THE INVENTION

There is an object of the invention to provide an image registration method and system for processing a first image Y into a registered image Y* which is aligned with a second image X.

According to one aspect of the invention, there is provided an image registration method of processing a first image Y into a registered image Y* which is aligned with a second image X, the method comprising:

(a) determining a scale factor "a" between the reference image X and the distorted image Y;

(b) resizing the distorted image Y by the scale factor "a" thereby generating a normalised distorted image Y2;

(c) determining a rotation angle "$\theta_0$" between the reference image X and the normalised distorted image Y2;

(d) rotating the normalised distorted image Y2 by the rotation angle "$-\theta_0$", thereby obtaining a rotated distorted image Y3; and (e) obtaining the registered image Y* by translating the rotated distorted image Y3 to be aligned horizontally and vertically with the reference image X.

In the method described above, the step (a) comprises determining the scale factor "a" by computing a ratio of a sum of pixel values of the reference image X to a sum of pixel values of the distorted image Y.

The step (a) further comprises padding the smaller of the reference image X and the distorted image Y with zero-valued pixels to equalise horizontal and vertical dimensions of the reference image X and the distorted image Y.

The step (b) further comprises centering the distorted image Y thereby forming a centered distorted image Y1, and resizing the centered distorted image Y1 by the scale factor "a" to generate the normalised distorted image Y2.

The step (c) comprises forming Radon transforms R1 and R2 of the reference image X and of the normalised distorted image Y2 respectively, and computing cross-correlations of rows of the Radon transforms R1 and R2 to determine the rotation angle "$\theta_0$".

The computing of cross-correlations comprises:
(i) computing a set of circular cross-correlations between each of the rows of the Radon transform R1 and each of the rows of the Radon transform R2, each circular cross-correlation defining a rotational offset angle "θ" between the respective rows;
(ii) selecting for each row a circular cross-correlation having the highest value; and
(iii) determining the rotational offset "θ" defined by each selected circular cross-correlation for each row, and setting the rotation angle "θ" to equal to the median of the determined rotational offsets "θ".

The computing of cross-correlations further comprises:
(iv) computing 1-dimensional (1D) Fast Fourier Transforms (FFTs) of the Radon transform R1 and of the Radon transform R2;
(v) combining the 1D FFTs of the Radon transform R1 and of the Radon transform R2 into an intermediate result R3;
(vi) generating a second intermediate result R4 which comprises the circular cross-correlations, the second intermediate result R4 being based on elements of the intermediate result R3;
(vii) selecting in each row of the intermediate result R3, a circular cross-correlation having the highest value; and
(viii) determining a corresponding rotational offset "θ" defined in each selected circular cross-correlation, and setting the rotation angle "$\theta_0$" to equal to the median of the determined rotational offsets "θ".

The step of combining comprises forming a component-wise product of the 1D FFT of the Radon transform R1 with a "conjugate" function of the 1D FFT of the Radon transform R2.

In the method described above, the step (vi) further comprises: determining for each component, a row, in the second intermediate result R4, a maximum value, corresponding to a respective angle "θ". The method further comprises taking the median of the maximum values, the median corresponding to the rotation angle "$\theta_0$".

The method further comprises performing a visual quality assessment on the pre-processed image Y*, for example performing any one of the visual quality assessments: determining a peak signal-to-noise ratio (PSNR); computing a structural similarity (SSIM) index; and computing visual information fidelity (VIF) index.

According to another aspect of the invention, there is provided an image registration method of processing a first image into a registered image Y* which is aligned with a second image, the method comprising:
(a) determining a scale factor "a" between the first image and the second image;
(b) equalizing the sizes of the first image and the second image by resizing the first image with the scale factor "a" to generate a resized version of the first image;
(c) using Radon transforms for determining a rotation angle "$\theta_0$" between the resized version of the first image and the second image;
(d) rotating the resized version of the first image by the rotation angle "$-\theta_0$" and outputting it as the registered image Y* after translating it to be aligned horizontally and vertically with the second image.

According to yet another aspect of the invention, there is provided a system for processing a distorted image Y into a registered image Y* by aligning it with a reference image X, comprising:
a processor;
a computer readable storage medium having computer readable instructions stored thereon for execution by the processor, forming:
a Scaling Factor Estimation module for determining a scale factor "a";
an Image Resizing module for resizing the distorted image Y into a resized Distorted Image $Y_2$ using the scale factor "a";
a Rotation Angle Determination unit for estimating a rotation angle "$\theta_0$";
an Image Rotation module for rotating the resized Distorted Image Y2 by the rotation angle "$-\theta_0$" to form a corrected image Y3; and
an Image Translation module for translating the corrected image Y3 to generate the Registered Image Y*.

In the system described above, the Rotation Angle Determination unit further comprises:
a Radon Transform module for generating Radon transforms R1 and R2 of the resized Distorted Image Y2 and the Reference Image X respectively; and
a Radon Transforms Correlation module for estimating a rotation angle "$\theta_0$" from the Radon transforms R2 and R1.

The system further comprises an Image Evaluation module process module for performing a visual quality assessment on the registered image Y.

In the system described above, the Image Evaluation module process module performs the visual quality assessment by any one of:
determining a peak signal-to-noise ratio (PSNR);
computing a structural similarity (SSIM) index; and
computing visual information fidelity (VIF) index.

The system further comprises:
an Image Centering module for centering the distorted image Y and generate a centered image Y1;
wherein the Image Resizing module is configured to perform resizing the centered image Y1 into the resized Distorted Image Y2 using the scale factor "a".

The system further comprises:
an Image Masking module for extracting a masked image Y0 from the distorted image Y; and
a Centroid Computation module for determining centering parameters "$c_r$" and "$c_c$" from the masked image Y0;
wherein the Image Centering module is configured to generate the centered image Y1 from the distorted image Y, using the centering parameters "$c_r$" and "$c_c$".

The system further comprises:
a Translation Estimating module for determining an offset vector "TV" between the corrected image Y3 and the Reference Image X;
wherein the Image Translation module is configured to translate the corrected image Y3 to generate the Registered Image Y* using the offset vector "TV".

A system and method of yet another embodiment of the invention are described next.

According to yet another aspect of the invention, there is provided an image registration method of processing a distorted image Y into a registered image Y* which is aligned with a reference image X, the method comprising:
(a) determining a scale factor "a" between the reference image X and the distorted image Y;
(b) resizing the reference image X with an inverse of the scale factor "a", thereby generating a resized reference image X2;
(c) determining a rotation angle "$\theta_0$" between the resized reference image X2 and the distorted image Y;
(d) rotating the distorted image Y by the rotation angle "$-\theta_0$" to generate a rotated distorted image Y3; and
(e) resizing the rotated distorted image Y3 with the scale factor "a", thereby obtaining the registered image Y*.

In the method described above, the step (a) comprises determining the scale factor "a" by computing a ratio of a sum of pixel values of the reference image X to a sum of pixel values of the distorted image Y.

The step (a) further comprises padding the smaller of the reference image X and the distorted image Y with zero-valued pixels to equalise horizontal and vertical dimensions of the reference image X and the distorted image Y.

The step (c) further comprises centering the distorted image Y thereby forming a centered distorted image Y1, and performing the determination of the rotation angle "$\theta_0$" between the resized reference image X2 and the centered distorted image Y1.

The step (c) comprises forming Radon transforms R1 and R2 of the resized reference image X2 and of the distorted image Y respectively, and computing cross-correlations of rows of the Radon transforms R1 and R2 to determine the rotation angle "$\theta_0$".

The step (c) includes forming Radon transforms R1 and R2 of the resized reference image X2 and of the centered distorted image Y1 respectively, and computing cross-correlations of rows of the Radon transforms R1 and R2 to determine the rotation angle "$\theta_0$".

The computing of cross-correlations comprises:
(i) computing a set of circular cross-correlations between each of the rows of the Radon transform R1 and each of the rows of the Radon transform R2, each circular cross-correlation defining a rotational offset angle "$\theta$" between the respective rows;
(ii) selecting for each row a circular cross-correlation having the highest value; and
(iii) determining the rotational offset "$\theta$" defined by each selected circular cross-correlation for each row, and setting the rotation angle "$\theta_0$" to equal to the median of the determined rotational offsets "$\theta$".

The computing of cross-correlations further comprises:
(iv) computing 1-dimensional (1D) Fast Fourier Transforms (FFTs) of the Radon transform R1 and of the Radon transform R2;
(v) combining the 1D FFTs of the Radon transform R1 and of the Radon transform R2 into an intermediate result R3;
(vi) generating a second intermediate result R4 which comprises the circular cross-correlations, the second intermediate result R4 being based on elements of the intermediate result R3;
(vii) selecting in each row of the intermediate result R3, a circular cross-correlation having the highest value; and
(viii) determining a corresponding rotational offset "$\theta$" defined in each selected circular cross-correlation, and setting the rotation angle "$\theta 0$" to equal to the median of the determined rotational offsets "$\theta$".

The step (v) of combining comprises forming a component-wise product of the 1D FFT of the Radon transform R1 with a "conjugate" function of the 1D FFT of the Radon transform R2.

The step (vi) comprises determining for each row in the second intermediate result R4 a maximum value, corresponding to a respective angle "$\theta$".

The method further comprises taking the median of the maximum values, the rotation angle "$\theta_0$" corresponding to the angle referred to by the cross-correlation indicated by median.

The method further comprises performing a visual quality assessment on the registered image Y*.

The method of claim 12, wherein the visual quality assessment is performed by any of: determining a peak signal-to-noise ratio (PSNR); computing a structural similarity (SSIM) index; and computing visual information fidelity (VIF) index.

According to one more aspect of the invention, there is provided an image registration method of processing a first image into a registered image Y* which is aligned with a second image, the method comprising:
(a) determining a scale factor "a" between the first image and the second image;
(b) equalizing the sizes of the first image and the second image by resizing one of the images with the scale factor "a" to generate a respective resized version;
(c) using Radon transforms for determining a rotation angle "$\theta_0$" between the first image and the second image or their respective resized versions; and
(d) rotating the first image by the rotation angle "$-\theta_0$", translating it to be aligned horizontally and vertically with the resized version of the second image, and outputting it as the registered image Y* after first resizing it with the scale factor "a".

According to yet one more aspect of the invention, there is provided a system for processing a distorted image Y into a registered image Y* by aligning it with a reference image X, the system comprising:
a processor;
a computer readable storage medium having computer readable instructions stored thereon for execution by the processor, forming:
a Scaling Factor Estimation module for determining a scale factor "a" between the reference image X and the distorted image Y;
a Rotation Angle Determination unit for estimating a rotation angle "$\theta_0$" between the reference image X and the distorted image Y;
an Image Rotation module for rotating the Distorted Image Y by the rotation angle "$-\theta_0$" to form a rotated Distorted Image Y3; and
an Image Scaling module for resizing the rotated Distorted Image Y3 to generate the Registered Image Y*.

The system further comprises an Optional Centering module for generating a centered image Y1, wherein the Rotation Angle Determination unit is configured to estimate the rotation angle "$\theta_0$" between the reference image X and the centered image Y1.

The system further comprises an Image Prescaling module for scaling the Reference Image X by the inverse of the scale factor "a" into a resized Reference Image X2, wherein the Rotation Angle Determination unit is configured to estimate the rotation angle "$\theta_0$" between the resized Reference Image X2 and the centered image Y1.

The system further comprises a Translation Estimating module for determining an offset vector "TV" between the corrected image Y3 and the Reference Image X, the Image Translation module being configured to translate the rotated Distorted Image Y3 to generate the Registered Image Y* using the offset vector "TV".

The system further comprises an Image Evaluation module process module for performing a visual quality assessment on the registered image Y.

The Image Evaluation module is configured to perform the visual quality assessment by any of: determining a peak signal-to-noise ratio (PSNR); computing a structural similarity (SSIM) index; and computing visual information fidelity (VIF) index.

Thus, improved image registration methods and systems have been provided.

BRIEF DESCRIPTION OF THE DRAWINGS

The embodiments of present invention will be more fully understood from the following detailed description of the preferred embodiments that should be read in light of the accompanying drawings. These drawings should not be construed as limiting the present invention, but are intended to be exemplary only.

FIG. 21A shows the original image of FIG. 18A;

FIG. 21B shows a distorted version (scale=0.5, rotation=0.2 radian, translation=(4,4), the noise standard deviation $\sigma_n$=10) of the image of FIG. 21A;

FIG. 21C shows the distorted image of FIG. 21B registered by the method of the third embodiment of the present invention;

FIG. 21D shows the distorted image of FIG. 21B registered by the SURF method;

FIG. 21E shows the distorted image of FIG. 21B registered by the SIFT method;

FIG. 22A shows the original image of FIG. 18A;

FIG. 22B shows a distorted version (scale=0.1, rotation=0.2 radian, translation=(4,4), the noise standard deviation $\sigma_n$=10) of the image of FIG. 22A;

FIG. 22C shows the distorted image of FIG. 22B registered by the method of the third embodiment of the present invention;

FIG. 22D shows the distorted image of FIG. 22B registered by the SURF method;

FIG. 22E shows the distorted image of FIG. 22B registered by the SIFT method;

DESCRIPTION OF THE EMBODIMENTS OF THE INVENTION

The present invention proposes systems and methods for pre-processing the distorted image by which the distorted image is aligned with the reference image before computing a quality metric. The process of aligning a distorted image with a reference image may also variously be referred to as "registering" or "registration".

The full reference methods of image quality assessment of a distorted image are based on a specific form of comparison of the distorted image with a reference image. If the distortion includes changes of geometric properties such as dimensional differences between the two images, horizontal and/or vertical displacement or rotation of the distorted image within its envelope, or other deformations, existing full reference quality assessment methods fail to generate a quality metric which would correspond with a visual assessment.

Other applications of image registration methods proposed in embodiments of the present invention, are automatic comparison of two images which would in a visual observation appear to be (almost) identical, but which may differ in scale, rotation, or where one of the images is noisy.

Image registration has thus application in remote sensing (cartography updating), and in computer vision.

Medical image registration (for image data of the same patient taken at different points in time such as change detection or tumor monitoring) may be used to compensate for elastic (also known as nonrigid) deformation due to breathing or anatomical changes for example. Nonrigid registration of medical images may also be useful in registering a patient's image data to an anatomical atlas, such as the Talairach atlas for neuroimaging.

A further use of image registration would be in astrophotography to align images taken of space. Using control points (automatically or manually entered), one would perform transformations on one image in order to align major features with a second image.

Image registration is also an essential part of panoramic image creation. The technique proposed in the present invention may be implemented in real time and run on embedded devices such as cameras and camera-phones.

Figure 1:
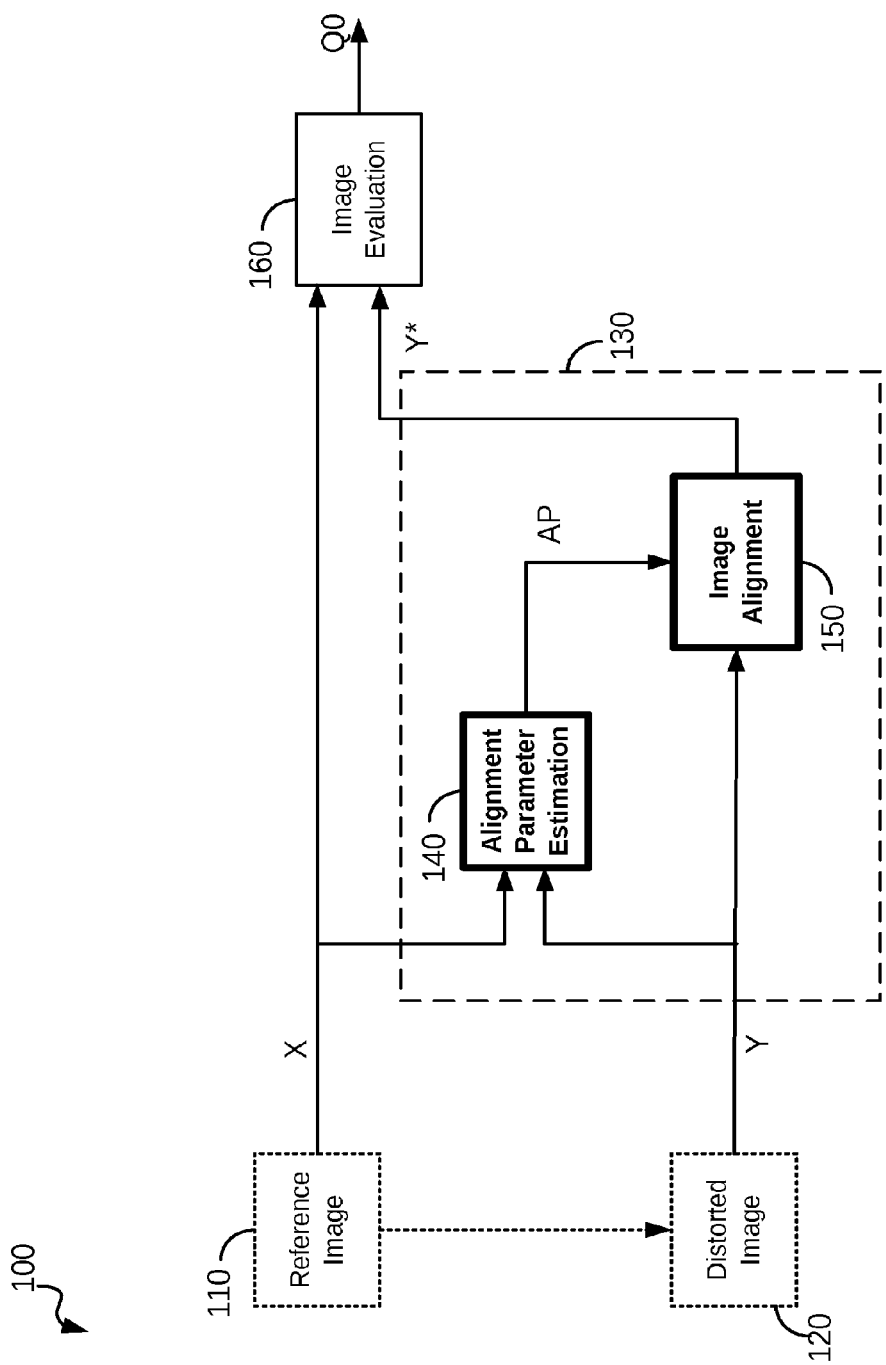
FIG. 1 illustrates a general block diagram of an Image Alignment System 100.

FIG. 1 illustrates a general block diagram of an Image Alignment System 100 including a Reference Image source 110 providing a Reference Image X, a Distortion Image source 120 providing a Distorted Image Y, and an Image Pre-processing system 130 comprising an Alignment Parameter Estimation process 140 and an Image Alignment process 150, and an Image Evaluation process 160.

Both, the Reference Image X and the Distorted Image Y, are input into the Image Pre-processing system 130 in which the Distorted Image Y is pre-processed with reference to the Reference Image X, to produce a pre-processed image Y*, which is also referred to as a registered image Y.

In general, the Image Evaluation process 160 receives as inputs, the Reference Image X and the Pre-processed Image Y*, and generates an Evaluation Result Q0.

The Distorted Image Y may be traced back to the Reference Image X, wherein the distortion of the Distorted Image Y may have been a result, alone or in combination, of any the following: compression, followed by decompression of the image; geometric transformation characterized by rotation, translation, or linear scaling of the image; cropping of the image resulting in a loss of part of the image; the addition of noise due to transmission over a noisy channel.

The purpose of the Alignment Parameter Estimation process 140 is to analyze the Distorted Image Y with reference to the Reference Image X, and to generate a set of Alignment Parameters AP, which provide an estimation of geometric aspects of the distortion.

The Alignment Parameters AP are then used by the Image Alignment process 150 to transform the Distorted Image Y into a Pre-processed Image Y*, which may also be referred to as a Registered Image Y*. Using the Alignment Parameters AP, the Image Alignment process 150 compensates for some or all geometric distortions of the Distorted Image Y, but does not change the visual nature of the image as such. As a result, the Distorted Image Y is transformed into the Registered Image Y* by the Image Alignment process 150, i.e. it is registered and aligned with the Reference Image X.

The Image Evaluation process 160, may be based on a conventional visual quality measurement, in which case the Evaluation Result Q0 represents a quality metric such a structural similarity (SSIM) index or a visual information fidelity (VIF) index. In this case, the Evaluation Result Q0, while computed on the Pre-processed Image Y*, is presumed to be a true visual quality metric of the Distorted Image Y, because the pre-processing action only corrects geometric distortions without changing the visual content of the image. For instance, the effect of compression and noise remain.

In many other applications, the output Q0 of the Image Evaluation process 160 may simply be an indicator of visual similarity between the Distorted Image Y and the Reference Image X, for example when both images are discrete photographs of the same scene.

A first embodiment of the Image Pre-processing system 130 is based on:
- extracting sets of keypoints from both the Reference Image X and the Distorted Image Y;
- matching a selected number of pairs of keypoints from X and Y that are closest;
- solving for parameters of a first affine transform;
- generating a second affine transform which is an inverse of the first affine transform;
- applying the second affine transform on the Distorted Image Y, thereby generating the Pre-processed Image Y*.

A keypoint is known as a Scale Invariant Feature Transform (SIFT) parameter set that was proposed by D. G. Lowe in "Distinctive Image Features from Scale-Invariant Keypoints," International Journal of Computer Vision, vol. 60, no. 2, pp. 91-110, 2004, to characterize a distinctive area in an image. Two specific implementations of the Alignment Parameter Estimation process 140 and corresponding implementations of the Image Alignment process 150 are proposed.

Figure 2A:
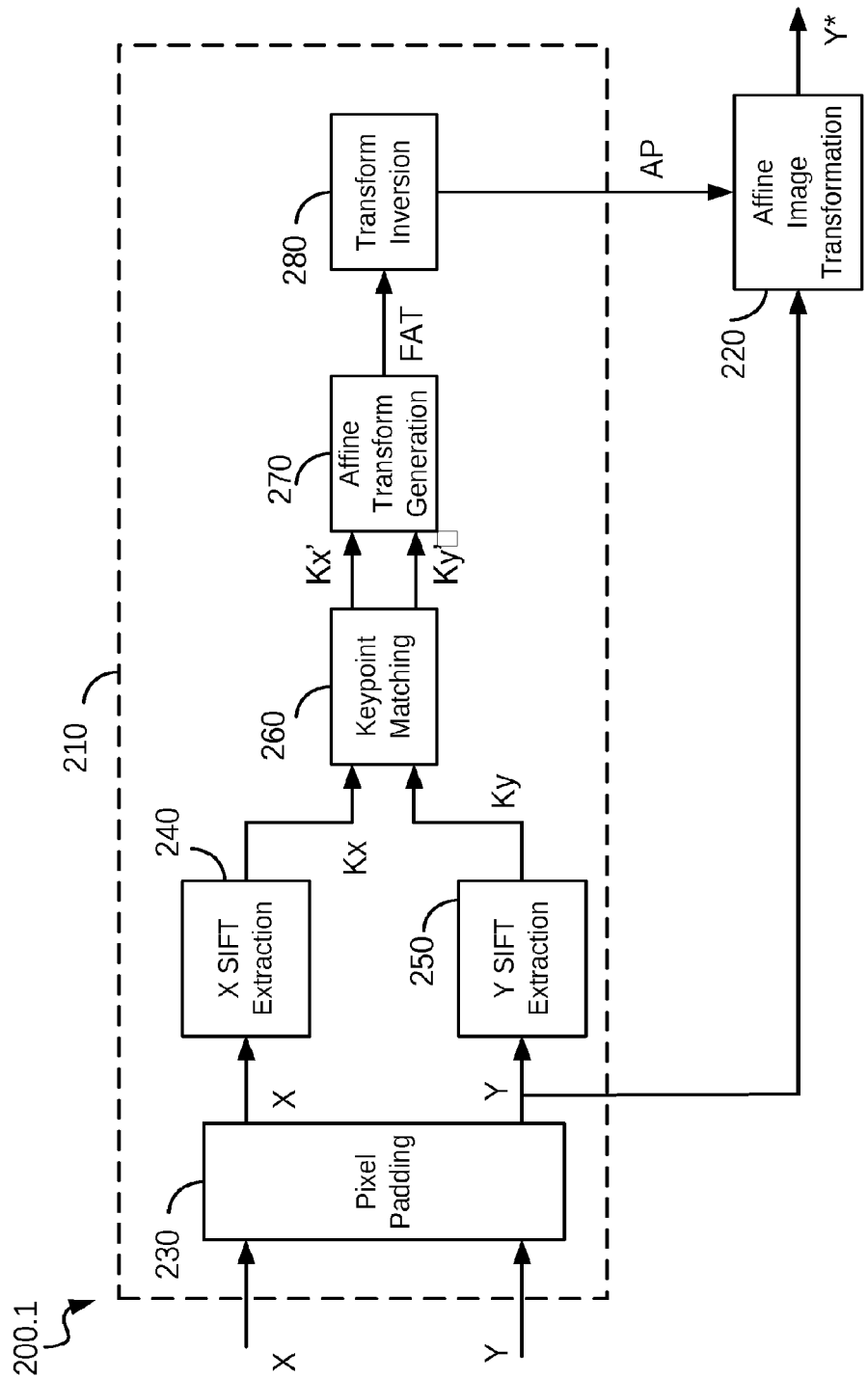
FIG. 2A shows a block diagram of an Affine Transform based image alignment system 200.1.

FIG. 2a shows a block diagram of an Affine Transform based image alignment system 200.1 which is a first embodiment of the Image Pre-processing system 130, comprising an Affine Transform Parameter Estimation sub-system 210 which is an embodiment of the Alignment Parameter Estimation process 140 of FIG. 1, and an Affine Image Transformation module 220 which is an embodiment of the Image Alignment process 150 of FIG. 1.

The Affine Transform Parameter Estimation sub-system 210 includes a Pixel Padding module 230, an X-SIFT Extraction module 240, a Y-SIFT Extraction module 250, a Keypoint Matching module 260, an Affine Transform Generation module 270, and a Transform Inversion module 280.

In the Pixel Padding module 230, the two images X and Y are passed through unchanged unless they are not the same size in terms of their horizontal and vertical dimensions "M" and "N", measured in pixels. If they are not of equal size, they are modified and their horizontal and vertical dimensions made equal in size by padding one or both of the images with zero-valued pixels appropriately (for each dimension, we pad the image with the smallest resolution in that dimension). The dimension-equalized images will be referred to as Equalized Reference Image X' and Equalized Distorted Image Y', which are both of size M×N pixels.

For simplicity in the following description, the Equalized Reference Image X' and the Equalized Distorted Image Y' will continued to be referred to simply as the Reference Image X and Distorted Image Y, on the understanding that pixel padding may actually not be necessary in any given case. Persons familiar with the concepts of image processing will readily understand that if pixel padding was done, a processing step (not shown in the description of the embodiments), may be performed to remove rows or columns of pixels from the Registered Image Y* to ensure that the dimensions of the Registered Image Y* match those of the (true) Reference Image X.

In the X SIFT Extraction module 240 and the Y-SIFT Extraction module 250, the scale invariant feature transform (SIFT) features as described by D. G. Lowe in "Distinctive Image Features from Scale-Invariant Keypoints," International Journal of Computer Vision, vol. 60, no. 2, pp. 91-110, 2004, are extracted from the Reference Image X and the Distorted Image Y, in the form of keypoint sets Kx and Ky respectively.

The keypoint sets Kx and Ky are input into the Keypoint Matching module 260.

In the Keypoint Matching module 260, a predefined number of keypoints are selected from the keypoint sets "Kx" and "Ky", that have the closest matching feature vectors, as matched keypoint sub-sets Kx' and Ky'. The selected keypoint sub-sets Kx' and Ky' are sent to the Affine Transform Generation module 270 for computing the parameters of a forward affine transform "FAT" that most closely approximates the geometric relationship between the Reference Image X and the Distorted Image Y. The FAT is sent to the Transform Inversion module 280 to be inverted, thus to generate an inverse affine transform IAT, which represents a first embodiment version of the set of Alignment Parameters AP of FIG. 1.

In the Affine Transform Parameter Estimation sub-system 210, the reverse affine transform IAT is applied for transforming the Distorted Image Y into the Registered Image Y*.

Figure 2B:
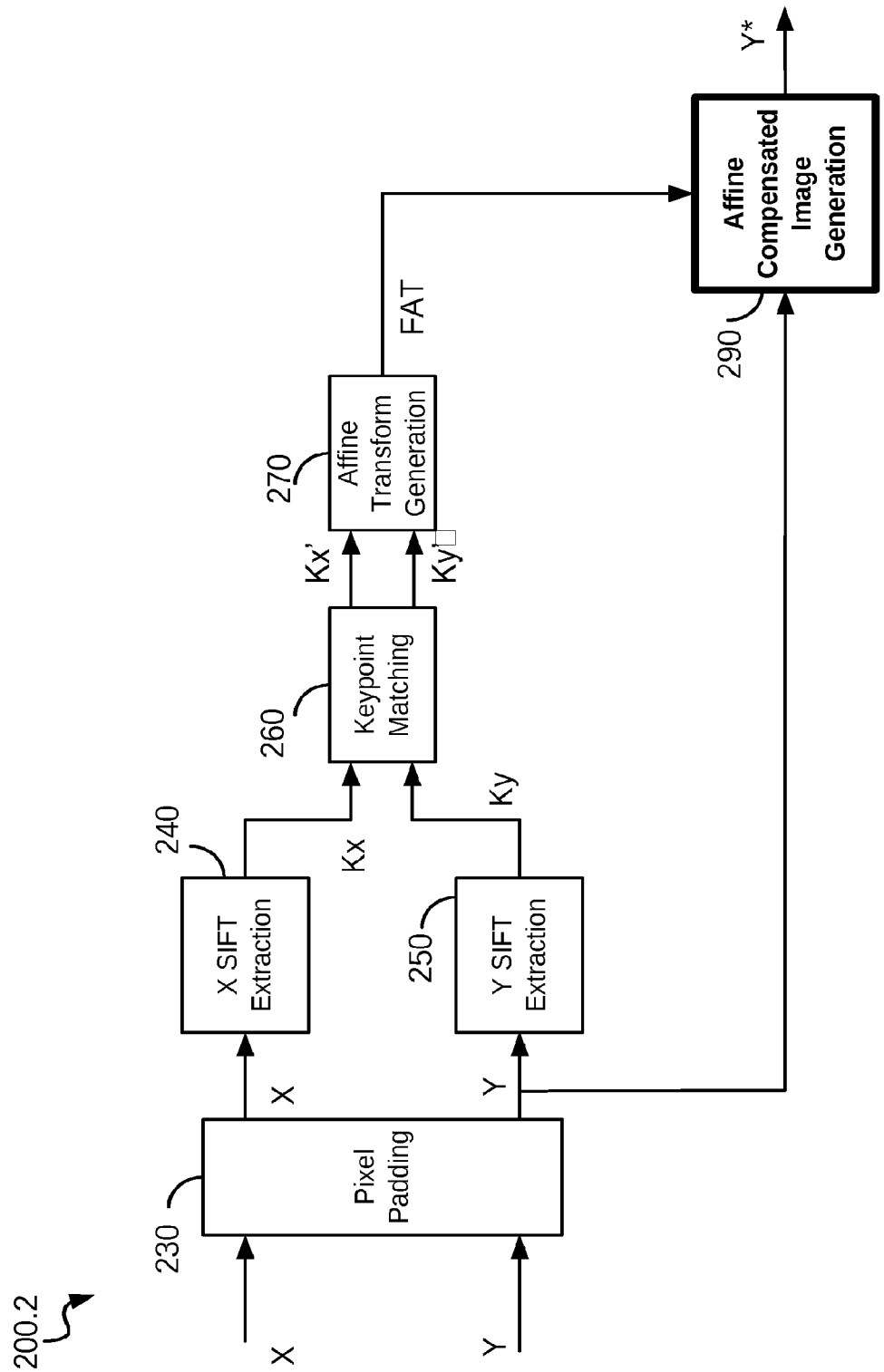
FIG. 2B shows a block diagram of an alternative Affine Transform based image alignment system 200.2 which is a second embodiment of the invention.

FIG. 2b shows a block diagram of an alternative Affine Transform based image alignment system 200.2 which is a second embodiment of the Image Pre-processing system 130. The alternative Affine Transform based image alignment system 200.2 of FIG. 2b provides the same functionality as the Affine Transform based image alignment system 200.1 of FIG. 2a, with the exception that the Transform Inversion module 280 and the Affine Image Transformation module 220 are combined into a single, more efficient, Affine Compensated Image Generation module 290.

Figure 3:
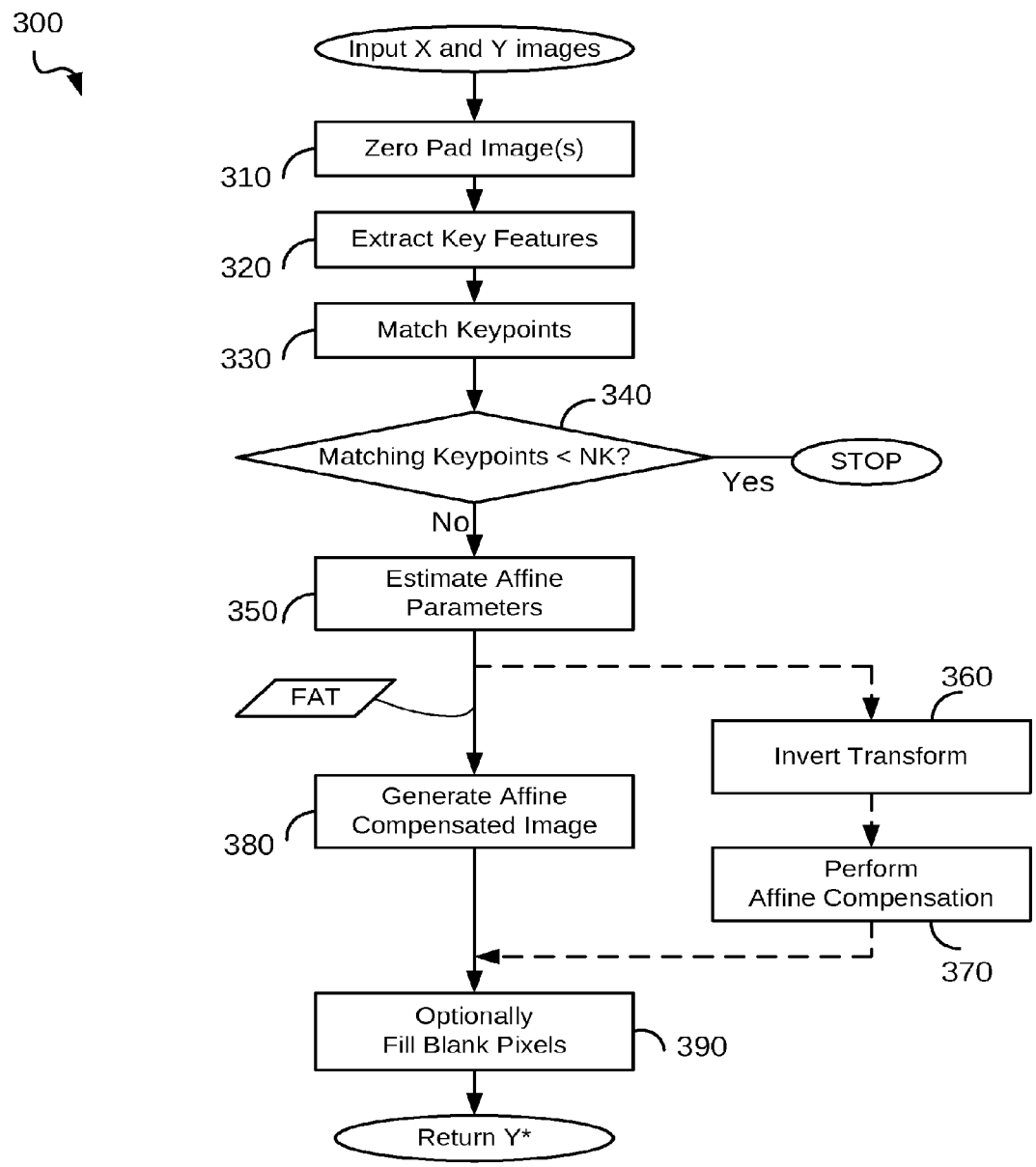
FIG. 3 is a flowchart of an affine transform based realignment method 300 according to the first embodiment of the invention.

FIG. 3 is a flow chart of an affine transform based realignment method 300 according to the first embodiment of the invention, including steps:
310 "Zero Pad Image(s)";
320 "Extract Key Features";
330 "Match Keypoints";
340 "Number of Matching Pixels <NK?";
350 "Estimate Affine Parameters";
360 "Invert Transform";
370 "Perform Affine Transform";
380 "Generate Affine Compensated Image"; and
390 "Fill Blank Pixels".

Let the Reference Image X be referred to as $x(i,j)$ where $i=1$ to m and $j=1$ to n, and the Distorted Image Y be referred to as $y(i,j)$ where $i=1$ to m' and $j=1$ to n'. It is assumed that the Reference Image X may have been subject to various distortions, including compression, noise contamination, as well as a possible affine transform, to generate the Distorted Image Y. It is not expected that the two images (X and Y) are completely different images.

In step 310 "Zero Pad Image(s)" which is performed in the Pixel Padding module 230 of FIG. 2a, the dimensions m and n of the Reference Image X are compared with the corresponding dimensions m' and n' of the Distorted Image Y.

If the Reference Image X and the Distorted Image Y do not have the same number of pixels, the dimension of the equalized images X and Y are set as M and N, where M is the larger of m and m', and N is the larger of n and n'. Either image may then be padded by adding zero pixels around the original image in the shorter dimensions, to create the Equalized Reference Image X' or the Equalized Distorted Image Y' replacing the Reference Image X and the Distorted Image Y as the case may be. To simplify the description, the images, whether they were padded or not, will be referred to as the Reference Image X and the Distorted Image Y.

In step 320 "Extract Key Features" which is performed in the X SIFT Extraction module 240 and the Y SIFT Extraction module 250 of FIG. 2*a*, scale invariant feature transforms (SIFT) are computed to detect and describe local features in the Reference Image X and in the Distorted Image Y respectively, the detailed method having been proposed by David Lowe in "Distinctive Image Features from Scale-Invariant Keypoints," International Journal of Computer Vision, vol. 60, no. 2, pp. 91-110, 2004.

SIFT key points are extracted from both the Reference Image X and the Distorted Image Y. Following the "SIFT" approach of David Lowe, a list of keypoints is obtained, where each keypoint includes a vector of local descriptors, i.e. descriptions of the visual features of the contents such as colour, texture, etc., and its position in the image. For the Reference Image X and the Distorted Image Y, pluralities (or sets) of Kx and Ky keypoints respectively are obtained by this method. Each keypoint may be represented by a descriptor vector of 128 values and coupled to a location record comprising 4 values including a row index, a column index, a scale factor, and an orientation of the keypoint.

The keypoint descriptors are then normalized to represent points in an N-dimensional Euclidean space, with N=128, corresponding to the 128 values of each descriptor.

In the step 330 "Match Keypoints", which is performed in the Keypoint Matching module 260 of FIG. 2*a*, a number NK of close matches between keypoints of the Reference Image X and keypoints of the Distorted Image X are computed, where closeness of a match is determined by a distance value in 128 dimensional space. A match is only accepted if its distance, in terms of keypoint features, is less than distRatio times the distance to the second closest match. The parameter distRatio may be chosen in a range from 0.2 to 0.6. A value for distRatio of 0.4 has been used in the experiments described below.

For efficiency in computing, it may be more efficient to compute dot products between unit vectors rather than true Euclidean distances. It is noted that the ratio of angles, computed by acos of dot products of unit vectors, is a close approximation to the ratio of Euclidean distances for small angles. Accordingly, only matches are kept in which the ratio of vector angles from the nearest to second nearest neighbor is less than distRatio.

In the step 340 "Number of Matching Pixels <NK?", it is determined whether at least NK matching keypoint pairs were found in the previous step 330. The value of NK is preferably set at 4. If less than 4 matching keypoint pairs were found (exit "Yes" from step 340), it is not possible to perform the affine preprocessing of the Distorted Image Y and the function must stop, otherwise (exit "No" from step 340), execution continues with the step 350.

In the step 350 "Estimate Affine Parameters", which is performed in the Affine Transform Generation module 260 of FIG. 2*a*, a global affine transform between the matching keypoint pairs may be determined using a linear least squares method:

In detail, the parameters in the affine transform are determined as follows.

The affine transform of a point $[i_k, j_k]^T$ in the reference image to a point $[u_k, v_k]^T$ in the distorted image can be written as:

$$\begin{pmatrix} u_k \\ v_k \end{pmatrix} = \begin{pmatrix} a_1 & a_2 \\ a_3 & a_4 \end{pmatrix} \begin{pmatrix} i_k \\ j_k \end{pmatrix} + \begin{pmatrix} t_1 \\ t_2 \end{pmatrix} \quad (1)$$

where k is the index of the matched keypoint. The unknown variables are the transform parameters $a_1, a_2, a_3, a_4, t_1,$ and $t_2$. Equation (1) may be rewritten as:

$$\begin{pmatrix} i_1 & j_1 & 0 & 0 & 1 & 0 \\ 0 & 0 & i_1 & j_1 & 0 & 1 \\ \ldots & \ldots & \ldots & \ldots & \ldots & \ldots \\ \ldots & \ldots & \ldots & \ldots & \ldots & \ldots \end{pmatrix} \begin{pmatrix} a_1 \\ a_2 \\ a_3 \\ a_4 \\ t_1 \\ t_2 \end{pmatrix} = \begin{pmatrix} u_1 \\ v_1 \\ \ldots \\ \ldots \end{pmatrix} \quad (2)$$

where every pair of matched keypoints contributes two rows to the left-most matrix and the right-most vector. The right-most vector is thus $[u_1\ v_1\ u_2\ v_2 \ldots u_{NK}\ u_{NK}]^T$. This equation can be solved by the linear least squares method. Let us abbreviate equation (2) as PX=Q. Then, we obtain:

$$X=(P^TP)^{-1}P^TQ. \quad (3)$$

Therefore, the transform parameters are $a_1=X(1), a_2=X(2), a_3=X(3), a_4=X(4), t_1=X(5),$ and $t_2=X(6)$.

The output of the step 350 "Estimate Affine Parameters" is thus a set of affine transform parameters a1, a2, a3, a4, t1, and t2 derived as shown above, which represent the forward affine transform (FAT) between the Reference Image X and the Distorted Image Y.

The distorted image can now be geometrically manipulated, i.e. scaled, rotated, shifted (translated), even sheared, to resemble the reference image, by applying the inverse of the FAT to the distorted image, thereby converting the Distorted Image Y to the Registered Image Y*, i.e. an affine compensated image y*(i*, j*), which will have the same resolution as the Reference Image X.

For the affine compensated image y*(i*,j*), where i*ϵ[1, m] and j*ϵ[1,n], we can calculate $[i^* j^*]^T$ in two ways.

In the step 360 "Invert Transform", which is performed in the Transform Inversion module 260 of FIG. 2*a*, an inverse affine transform is performed:

$$\begin{pmatrix} i^* \\ j^* \end{pmatrix} = \begin{pmatrix} a_1 & a_2 \\ a_3 & a_4 \end{pmatrix}^{-1} \begin{pmatrix} u - t_1 \\ v - t_2 \end{pmatrix}, \quad (4)$$

followed by the step 370 "Perform Affine Transform", which is performed in the Affine Image Transformation module 220 of FIG. 2*a*, by which the pre-processed image is obtained as:

$$y^*(i^*,j^*)=y(u,v) \quad (5)$$

But because the calculated values i* and j* can have non-integer values, it is necessary to address the problem of finding the elements of y*(i*,j*) the affine compensated image y* at integer locations (present, but not explicitly shown in step 370).

In the preferred step 380 "Generate Affine Compensated Image", which is performed in the Affine Compensated Image Generation module 290 of FIG. 2*b*, the functions of the steps 360 and 370 above, are combined to generate the affine compensated image y*(i*,j*) directly with pixels projected to integer index locations. The pixel values are calculated by bilinear interpolation as follows:

For every pixel (i*,j*) in the affine compensated image y*(i*,j*), we have $$\begin{pmatrix} u \\ v \end{pmatrix} = \begin{pmatrix} a_1 & a_2 \\ a_3 & a_4 \end{pmatrix} \begin{pmatrix} i^* \\ j^* \end{pmatrix} + \begin{pmatrix} t_1 \\ t_2 \end{pmatrix} \qquad (6)$$

Since the transformed index values $(u,v)^T$ are real values, bilinear interpolation may be used to calculate the value y*(i*,j*).

When the index values u and v lie in the ranges 1≤u≤m and 1≤v≤n, the following equation (7) provides a short hand description of the process of the step 380:

$$y^*(i^*, j^*) = y(\lfloor u \rfloor, \lfloor v \rfloor)(\lceil u \rceil - u)(\lceil v \rceil - v) + y(\lceil u \rceil, \lfloor v \rfloor)(u - \lfloor u \rfloor)(\lceil v \rceil - v) + \qquad (7)$$
$$y(\lfloor u \rfloor, \lceil v \rceil)(\lceil u \rceil - u)(v - \lfloor v \rfloor) + y(\lceil u \rceil, \lceil v \rceil)(u - \lfloor u \rfloor)(v - \lfloor v \rfloor).$$

where $\lceil u \rceil$ and $\lfloor u \rfloor$ are the ceiling and floor functions of real value u, respectively. If, on the other hand, the values of u or v lie outside these ranges, i.e. u<1 or m<u or v<1 or n<v, then we assign the corresponding pixel values to 0: y*(i*,j*)=0.

The step 380, i.e. an exemplary implementation of equations (6) and (7), is further illustrated in the following MATLAB code sample 1. Note: MATLAB (matrix laboratory) is a numerical computing environment and fourth-generation programming language, developed by MathWorks (http://www.mathworks.com). MATLAB code sample 1.

MATLAB code sample 1

```
% Affine transform
if (NK >3) % Check if we have enough key points
    % Estimate affine parameters using linear least squares
    ii=1;
    for jj = 1 : size(loc1,1)
        if match(jj)>0
            a(2*(ii-1)+1,1:6)=[loc1(jj,1)-rows/2 loc1(jj,2)-
                cols/2 0 0 1 0];
            a(2*(ii-1)+2,1:6)=[0 0 loc1(jj,1)-rows/2
loc1(jj,2)-                     cols/2 0 1];
            b(2*(ii-1)+1,1)=loc2(match(jj),1)-rows/2;
            b(2*(ii-1)+2,1)=loc2(match(jj),2)-cols/2;
            ii=ii+1;
        end
    end
    x=a\b;
    m(1,1)=x(1); m(1,2)=x(2);
    m(2,1)=x(3); m(2,2)=x(4);
    t(1)=x(5); t(2)=x(6);
    yy=zeros(size(im2));
    r=sqrt(x(1)*x(1)+x(2)*x(2));
    theta=atan(-x(2)/x(1));
    % display results for debugging
    fprintf('rows=%d, cols=%d, r=%f, theta=%f \n', size(im1,1),
        size(im1,2), r, theta);
    fprintf('m=%f, %f, %f, %f; t1=%f, t2=%f\n',
        x(1),x(2),x(3),x(4),t(1),t(2));
    % display results for debugging
    fprintf('rows=%d, cols=%d, r=%f, theta=%f \n', size(im1,1),
        size(im1,2), r, theta);
    fprintf('m=%f, %f, %f, %f; t1=%f, t2=%f\n',
        x(1),x(2),x(3),x(4),t(1),t(2));
    % Perform affine compensation
    for u=1:rows
        for v=1:cols
            x=m(1,1)*(u-rows/2)+m(1,2)*(v-cols/2)+rows/2+t(1);
            y=m(2,1)*(u-rows/2)+m(2,2)*(v-cols/2)+cols/2+t(2);
            if ((x<=rows)&&(1<=x)&&(y<=cols)&&(1<=y))
                yy(u,v)=im2(floor(x),floor(y))*(ceil(x)-x)
                    *(ceil(y)-y)+ ...
```

MATLAB code sample 1 -continued

```
                im2(ceil(x),floor(y))*(x-floor(x))
                    *(ceil(y)-y)+ ...
                im2(floor(x),ceil(y))*(ceil(x)-x)
                    *(y-floor(y))+ ...
                im2(ceil(x),ceil(y))*(x-floor(x))
                    *(y-floor(y));
            end
        end
    end
else
    yy=im2;
end
```

In the step 390 "Optionally Fill Blank Pixels", any blank pixels near the image boundaries of the affine compensated image y* may be left blank, or may optionally be filled in by mirroring values of the non-blank image pixels at the image boundary.

For instance, if we have the following image:

```
00000000
00123400
00567800
00912300
00000000
```

Then, filling in the missing pixels (zero values) by mirroring values is performed by mirroring the non-blank pixels values at the boundaries between blank and non-blank values. It gives:

```
21123443
21123443
65567887
19912332
19912332
```

For the purpose of evaluating the first embodiment of the invention, these pixels were left blank.

In summary, the affine transform based realignment method 300 receives the Reference Image X and the Distorted Image Y as inputs and, using the SIFT technique coupled with the affine transform technique, outputs the aligned Registered Image Y*.

Figure 4C:
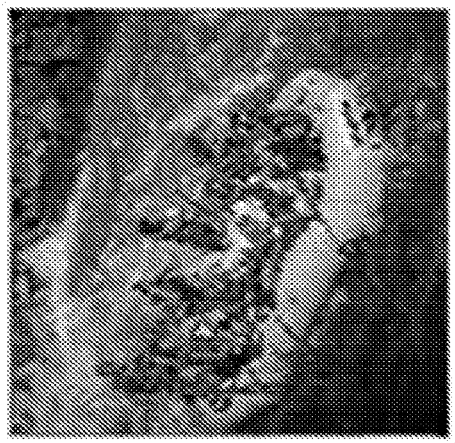
FIG. 4C shows a pre-processed image Y*, generated from the distorted image Y of FIG. 4B with the affine transform based realignment method 300 of FIG. 3.
Figure 4B:
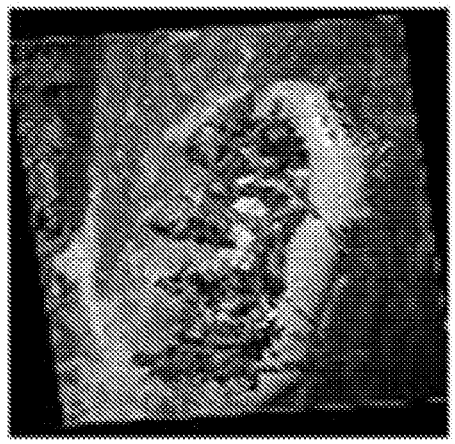
FIG. 4B shows a distorted image Y created by an affine transform of the original image of FIG. 4A.
Figure 4A:
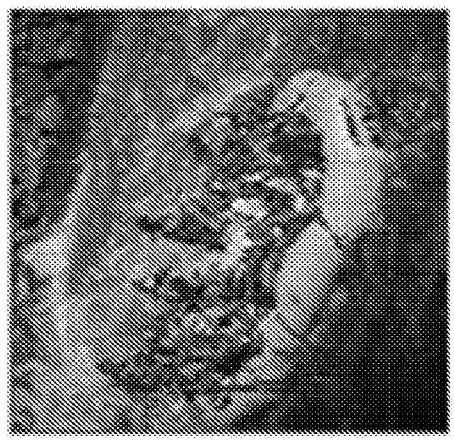
FIG. 4A shows an original image.

FIGS. 4a, 4b, and 4c show a pictorial result of the affine transform based realignment method 300 of FIG. 3. An original image, used in the place of the Reference Image X, is shown in FIG. 4a. For demonstrating the affine transform based realignment method 300, a distorted image was created for use as the Distorted Image Y, by an affine transform of the original image of FIG. 4a, and exhibits a combination of scale, rotation, translation, and shearing distortions. The Distorted Image Y is shown in FIG. 4b. The Distorted Image Y of FIG. 4b was pre-processed with the affine transform based realignment method 300 of FIG. 3 to generate the pre-processed image, i.e. the Registered Image Y* shown in FIG. 4c. Through a visual inspection, one can see that the pre-processing method is capable of doing an excellent job in aligning the distorted image with the reference image.

To test the performance of the affine transform based realignment method 300, a number of experiments were carried out using images from the LIVE Image Quality Assessment Database Release 2, published by H. R. Sheikh, Z. Wang, L. Cormack and A. C. Bovik, and available on the internet from http://live.ece.utexas.edu/research/quality. This database consists of 779 distorted images derived from 29 original images using five types of distortions. The distortions include JPEG compression, JPEG2000 compression, Gaussian white noise (GWN), Gaussian blurring (GBlur), and the Rayleigh fast fading (FF) channel model. In addition, distorted images were also generated from the original images by scaling, rotation, and spatial shifts in both the horizontal and vertical directions.

For the tests, the pre-processed Registered Images Y*, that were aligned with the original (reference) images, were subjected to visual quality assessments, as shown in FIG. 1 (see the Image Evaluation process 160). Standard metrics were used to measure the visual quality of the Reference Image X and the pre-processed version of the Distorted Image Y, that is the Registered Image Y*. Three full-reference metrics, peak signal-to-noise ratio (PSNR), mean structural similarity index measurements (MSSIM), and visual information fidelity (VIF) measurements, were also considered for measuring image visual quality.

Three measures of performance were considered, namely, the correlation coefficients (CC) between the difference mean opinion score (DMOS) and the objective model outputs after nonlinear regression, the root mean square error (RMSE), and the Spearman rank order correlation coefficient (SROCC). The SROCC is defined as $$SROCC = 1 - \frac{6 \times \sum_{i=1}^{N} d_i^2}{N(N^2-1)} \quad (8)$$

where N is the number of pixels in the images for which the evaluations are performed, and $d_1$ is the difference between the ith image's ranks in subjective and objective evaluations. SROCC is a nonparametric rank-based correlation metric, independent of any monotonic nonlinear mapping between subjective and objective score, as described in Z. Wang and Q. Li, "Information content weighting for perceptual image quality assessment," IEEE Transactions on Image Processing, vol. 20, no. 5, pp. 1185-1198, 2011.

Tables 1-5 below show summarized experimental results, from comparisons between visual quality measurements of distorted images without pre-processing (identified as "original" method) and with affine pre-processing according to the first embodiment of the invention (identified as "proposed" method).

Table 1 shows the experimental results of this database without any added distortion for three full-reference metrics: PSNR, MSSIM, and VIF. The best performing method is highlighted in bold font. The results shown in Table 1 demonstrate that pre-processing the distorted image does not negatively affect the performance of image quality assessment worse than the original method for the original database; it actually performs better.

Table 2 tabulates the results when every image in the LIVE database is distorted by scaling factor 0.9, rotation angle $0.1 \times 180/\pi$ degrees, spatial shifts 4 pixels in the horizontal direction, and 4 pixels in the vertical direction. In the table, the standard full-reference metrics, PSNR, MSSIM, and VIF get very low quality scores, while the pre-processing method gives very good visual quality scores, i.e. the objective quality assessment performed on pre-processed images is much more correlated with subjective assessment than without pre-processing. The best performing method is highlighted in bold font. Actually, we can see that without pre-processing, the existing quality metrics will give very poor performance.

Table 2 shows that performance is improved over the original method when the distortion involves scaling, rotation and shifting. Such improved performance is visible by the better correlation between the proposed metric and human score shown in FIGS. 8, 9 and 10. Results shown in FIGS. 11, 12, 13 demonstrate that the proposed method of the present invention is less sensitive than the original method to the various distortions.

The purpose and justification for the proposed pre-processing of the distorted images is given in the following. We want to compensate for the affine transformations such as rotation, scaling which should not affect at all the visual quality. In fact, looking at FIGS. 11 and 12, one can see that the proposed method is quite flat (invariant) to small rotation and shift. But scaling is more tricky because one cannot expect the quality to remain the same if the image is scaled considerably and image details are thereby lost. But it is desired that the method gives a reasonable score that reduces gracefully with a change in scaling factor as shown in FIG. 13c for VIF. In this case, our proposed method score reduces gracefully and stays reasonable (e.g. a score of 0.7 if scaling is 0.5) while the original method (i.e. without pre-processing) scores below 0.1 for scaling of 0.5 which intuitively doesn't make much sense because quality is not going to be that poor if one scales an image to half of the original resolution.

TABLE 1

Overall performance comparison of image quality assessment for all distorted test images in the LIVE image database.

| Method | | CC | SROCC | RMSE |
|---|---|---|---|---|
| PSNR | Original | 0.8700 | 0.8754 | 13.47 |
| | Proposed | 0.8939 | 0.8974 | 12.25 |
| MSSIM | Original | 0.9042 | 0.9104 | 11.67 |
| | Proposed | 0.9129 | 0.9190 | 11.15 |
| VIF | Original | 0.9595 | 0.9636 | 7.69 |
| | Proposed | 0.9610 | 0.9649 | 7.56 |

TABLE 2

Overall performance comparison of image quality assessment for every image in the LIVE image database, which is distorted by scaling, rotation, and spatial shifts in both the horizontal and vertical directions.

| Method | | CC | SROCC | RMSE |
|---|---|---|---|---|
| PSNR | Original | 0.0451 | 0.0465 | 27.29 |
| | Proposed | 0.7959 | 0.7840 | 16.54 |
| MSSIM | Original | 0.2844 | 0.0998 | 26.20 |
| | Proposed | 0.8894 | 0.8903 | 12.49 |
| VIF | Original | 0.0686 | 0.0695 | 35.08 |
| | Proposed | 0.8986 | 0.8864 | 11.99 |

Tables 3-5 show the CC, SROCC, and RMSE values for PSNR, MSSIM, and VIF versus the five kinds of distortions in the LIVE image database, respectively. The scores with affine pre-processing are better than those without it. For VIF, the scores with affine pre-processing are comparable with those without it.

TABLE 3

CC values after nonlinear regression for the LIVE image database

| | Method | JPEG | JPEG2000 | GWN | GBlur | FF | All data |
|---|---|---|---|---|---|---|---|
| PSNR | Original | 0.8879 | 0.8996 | 0.9852 | 0.7835 | 0.8895 | 0.8700 |
| | Proposed | 0.9260 | 0.9080 | 0.9824 | 0.8199 | 0.8967 | 0.8930 |
| MSSIM | Original | 0.9504 | 0.9413 | 0.9747 | 0.8743 | 0.9449 | 0.9042 |
| | Proposed | 0.9614 | 0.9428 | 0.9736 | 0.8856 | 0.9492 | 0.9129 |
| VIF | Original | 0.9864 | 0.9773 | 0.9901 | 0.9742 | 0.9677 | 0.9595 |
| | Proposed | 0.9859 | 0.9763 | 0.9866 | 0.9742 | 0.9655 | 0.9610 |

TABLE 4

SROCC values after nonlinear regression for the LIVE image database

| | Method | JPEG | JPEG2000 | GWN | GBlur | FF | All data |
|---|---|---|---|---|---|---|---|
| PSNR | Original | 0.8809 | 0.8954 | 0.9854 | 0.7823 | 0.8907 | 0.8754 |
| | Proposed | 0.9246 | 0.9046 | 0.9846 | 0.8100 | 0.8943 | 0.8972 |
| MSSIM | Original | 0.9449 | 0.9355 | 0.9629 | 0.8944 | 0.9413 | 0.9104 |
| | Proposed | 0.9594 | 0.9365 | 0.9732 | 0.9014 | 0.9443 | 0.9190 |
| VIF | Original | 0.9845 | 0.9696 | 0.9858 | 0.9726 | 0.9649 | 0.9636 |
| | Proposed | 0.9841 | 0.9685 | 0.9835 | 0.9729 | 0.9650 | 0.9649 |

TABLE 5

RMSE values after nonlinear regression for the LIVE image database

| | Method | JPEG | JPEG2000 | GWN | GBlur | FF | All data |
|---|---|---|---|---|---|---|---|
| PSNR | Original | 14.6532 | 11.0174 | 4.7918 | 11.4784 | 13.0148 | 13.47 |
| | Proposed | 12.0254 | 10.5693 | 5.2294 | 10.5760 | 12.6109 | 12.25 |
| MSSIM | Original | 9.9106 | 8.5151 | 6.2603 | 8.9663 | 9.3253 | 11.67 |
| | Proposed | 8.7635 | 8.4138 | 6.4174 | 8.5798 | 8.9624 | 11.15 |
| VIF | Original | 5.2420 | 5.3498 | 3.9186 | 4.1669 | 7.1968 | 7.69 |
| | Proposed | 5.3373 | 5.4587 | 4.5682 | 4.1691 | 7.4321 | 7.56 |

FIGS. 5 to 13 show graphical results depicting the experimental results in further detail.

Figure 5A:
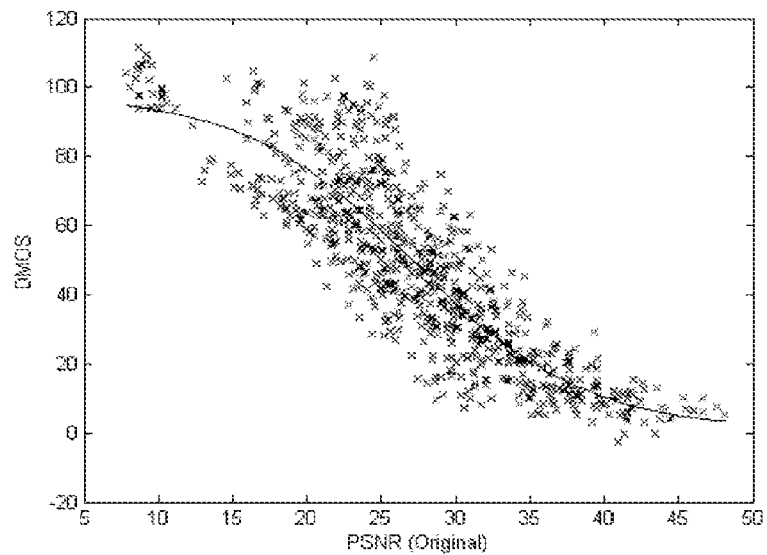
FIG. 5A shows a scatter plot of DMOS (vertical axis) versus PSNR scores (horizontal axis) for "original" measurements.
Figure 5B:
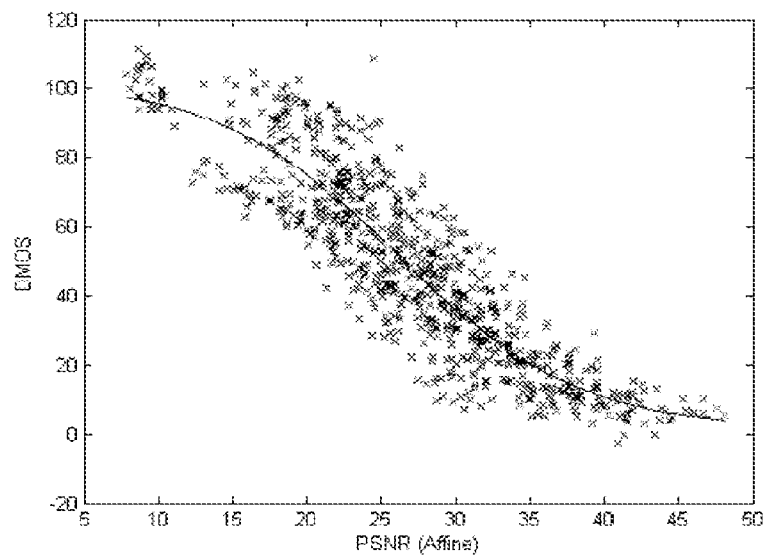
FIG. 5B shows a scatter plot corresponding to FIG. 5A for measurements after affine pre-processing of the images.
Figure 6A:
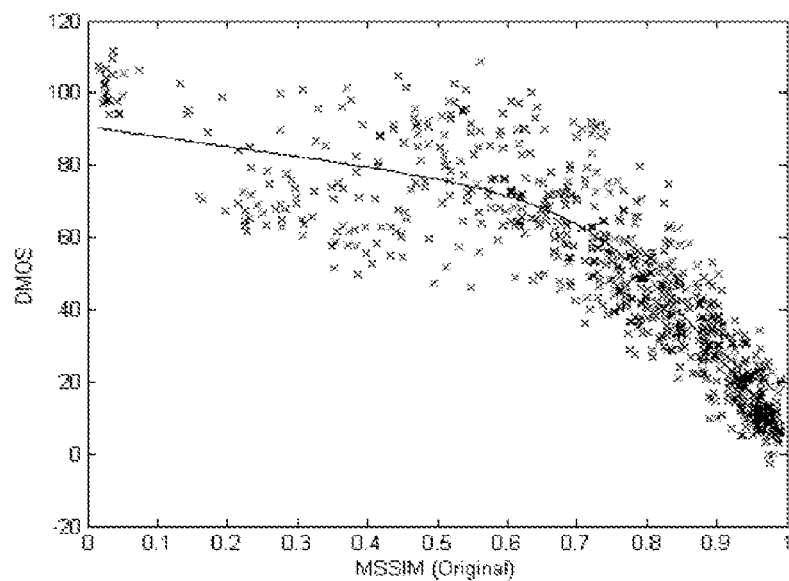
FIG. 6A shows a scatter plot of DMOS (vertical axis) versus MSSIM scores (horizontal axis) for "original" measurements.
Figure 6B:
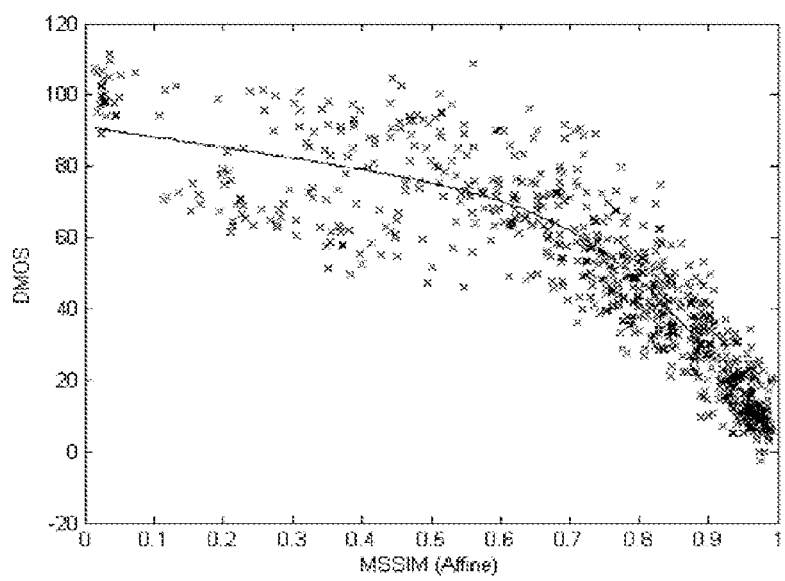
FIG. 6B shows a scatter plot corresponding to FIG. 6A for measurements after affine pre-processing of the images.
Figure 7A:
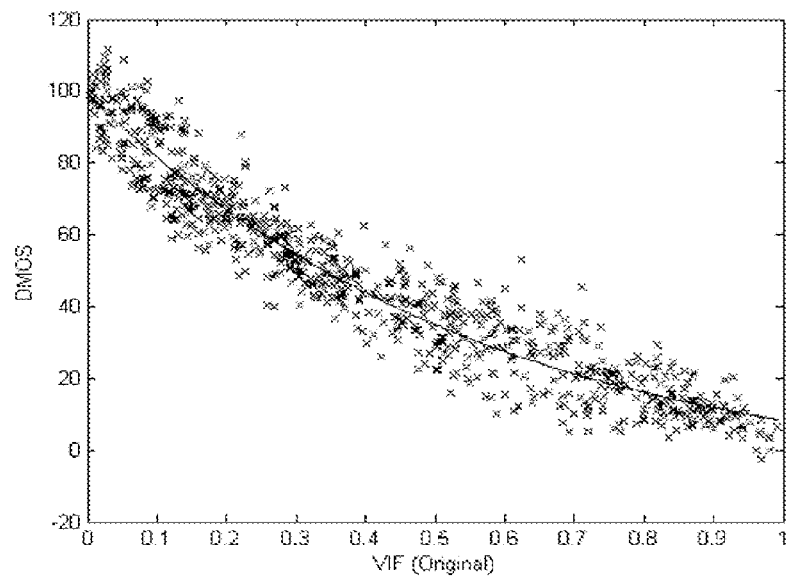
FIG. 7A shows a scatter plot of DMOS (vertical axis) versus VIF scores (horizontal axis) for "original" measurements.
Figure 7B:
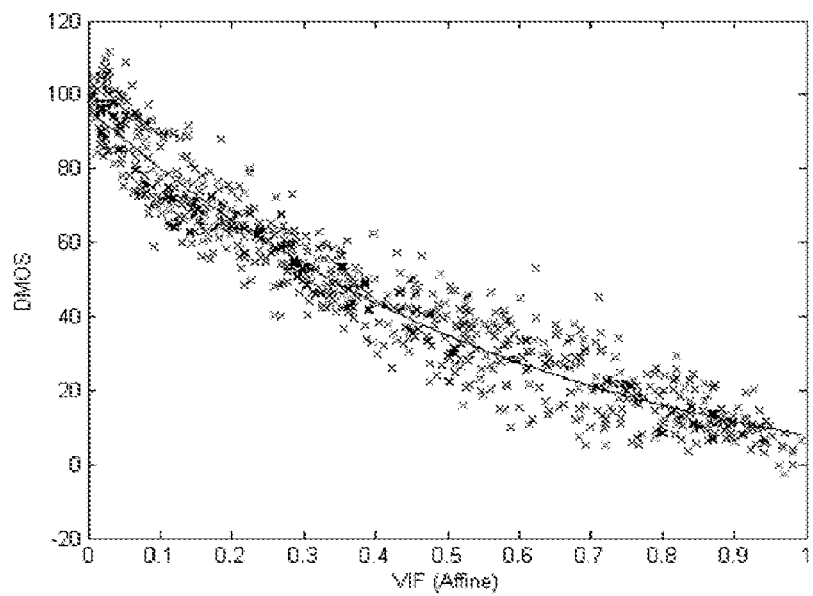
FIG. 7B shows a scatter plot corresponding to FIG. 7A for measurements after affine pre-processing of the images.

FIGS. 5a, 6a, and 7a show scatter plots of DMOS (vertical axis) versus PSNR, MSSIM, and VIF scores (horizontal axis), respectively for all distorted images in the LIVE image database without affine distortion, for "original" measurements (i.e. without affine transform parameter estimation and affine compensation), while FIGS. 5b, 6b, and 7b show corresponding scatter plots, for measurements after affine pre-processing of the images.

Figure 8A:
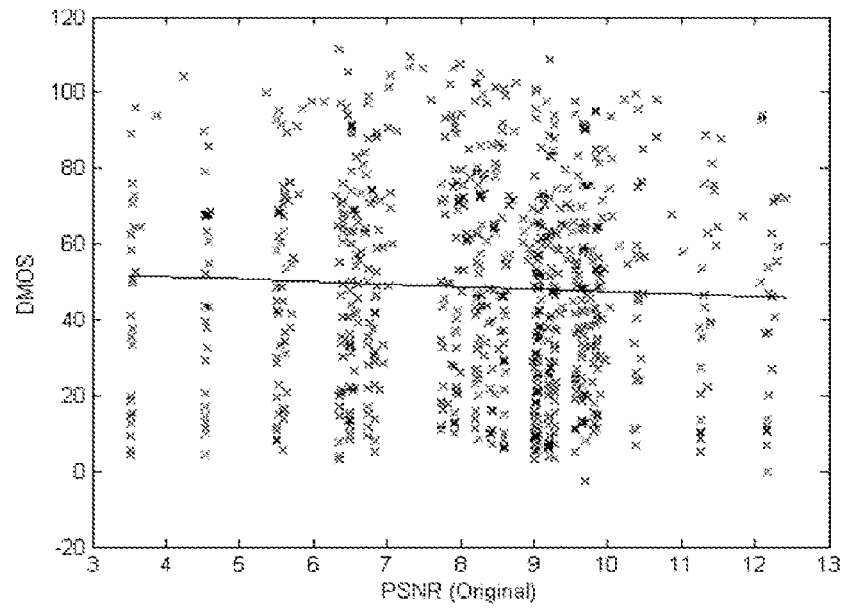
FIG. 8A shows a scatter plot of DMOS (vertical axis) versus PSNR scores (horizontal axis) for all distorted images in the LIVE image database with additional affine distortion for "original" measurements.
Figure 8B:
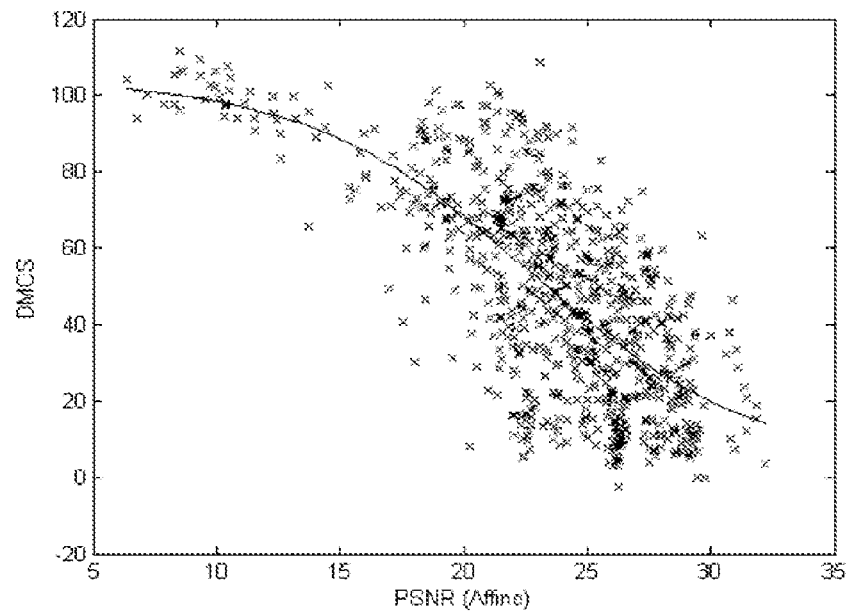
FIG. 8B shows a scatter plot corresponding to FIG. 8A for measurements after affine pre-processing of the images.
Figure 9A:
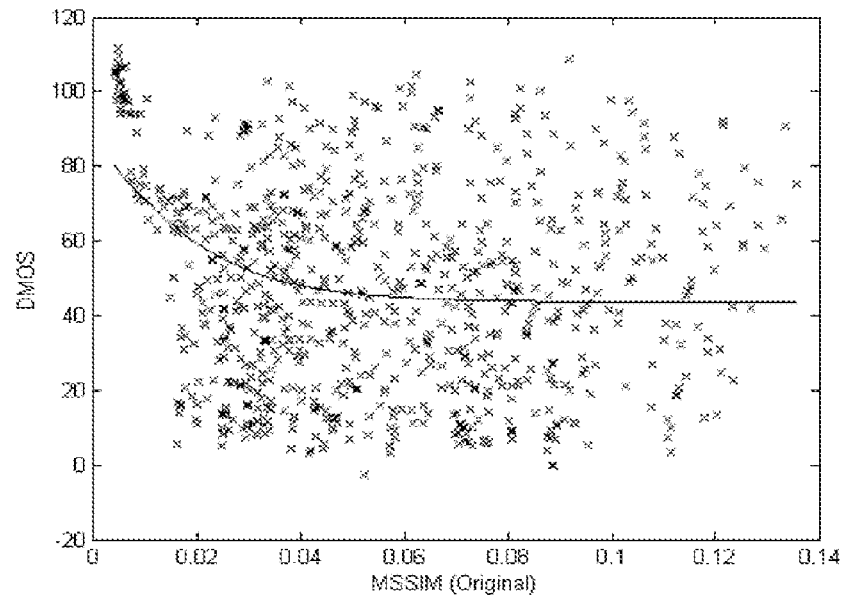
FIG. 9A shows a scatter plot of DMOS (vertical axis) versus MSSIM scores (horizontal axis) for all distorted images in the LIVE image database with additional affine distortion for "original" measurements.
Figure 9B:
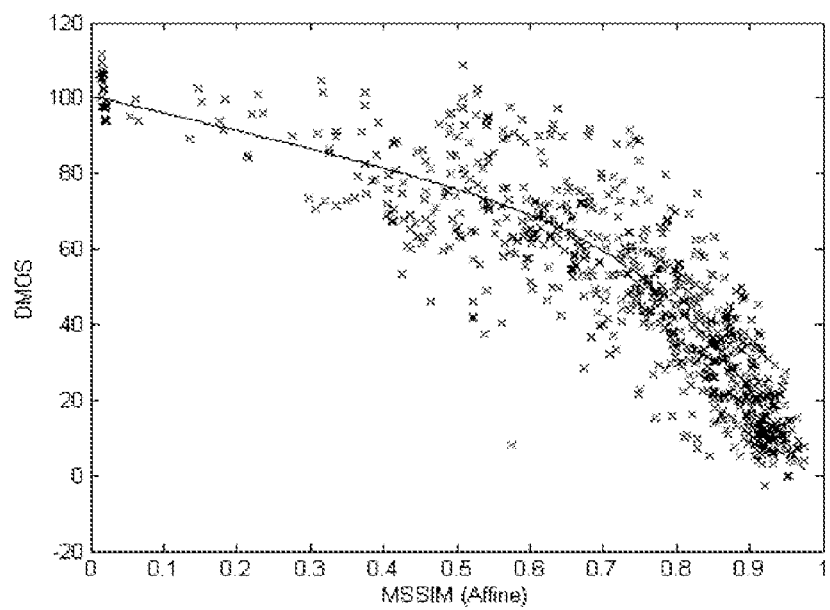
FIG. 9B shows a scatter plot corresponding to FIG. 9A for measurements after affine pre-processing of the images.
Figure 10A:
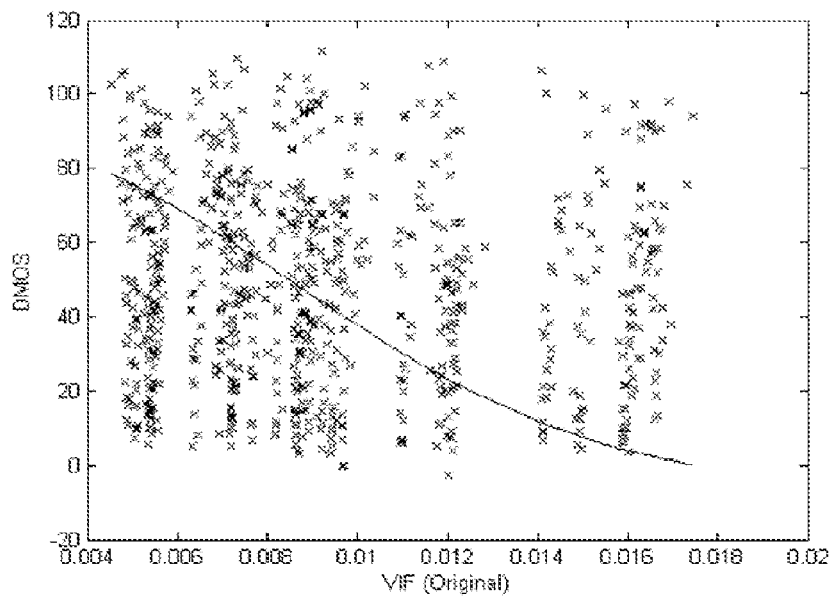
FIG. 10A shows a scatter plot of DMOS (vertical axis) versus VIF scores (horizontal axis) for all distorted images in the LIVE image database with additional affine distortion for "original" measurements.
Figure 10B:
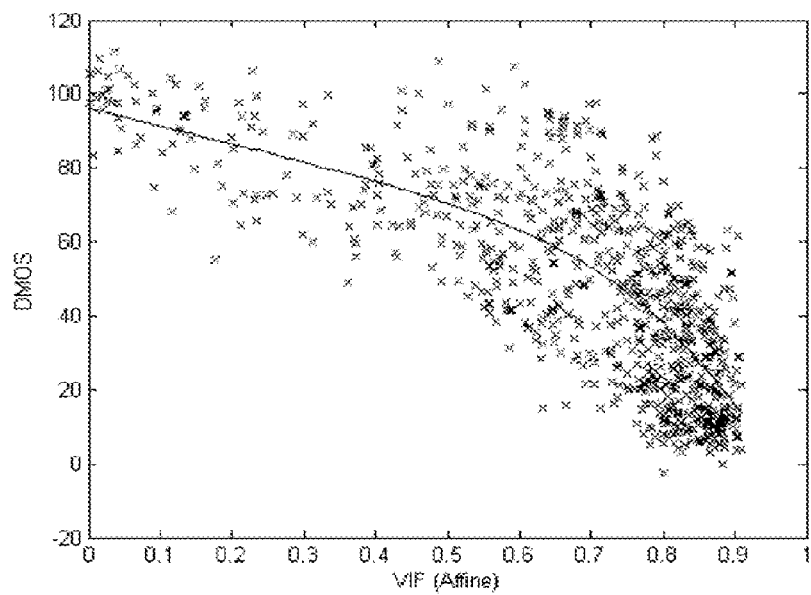
FIG. 10B shows a scatter plot corresponding to FIG. 10A for measurements after affine pre-processing of the images.

FIGS. 8a, 9a, and 10a show scatter plots of DMOS (vertical axis) versus PSNR, MSSIM, and VIF scores (horizontal axis), respectively for all distorted images in the LIVE image database with additional affine distortion (scaling factor 0.9, rotation angle 0.1×180/π degrees, spatial shifts 4 pixels in the horizontal direction, and 4 pixels in the vertical direction), for "original" measurements, while FIGS. 8b, 9b, and 10b show corresponding scatter plots, for measurements after affine pre-processing of the images.

The scatter plots of FIGS. 8 to 10 show the correlation for the images with the additional distortions, showing marked improvements due to pre-processing compared to the original measurements. This is made clearer by different horizontal axis scales. For the images without pre-processing, the VIF scores are as low as 0.004 to 0.02. However, after affine pre-processing, the VIF scores range from 0 to 1.

Figure 11A:
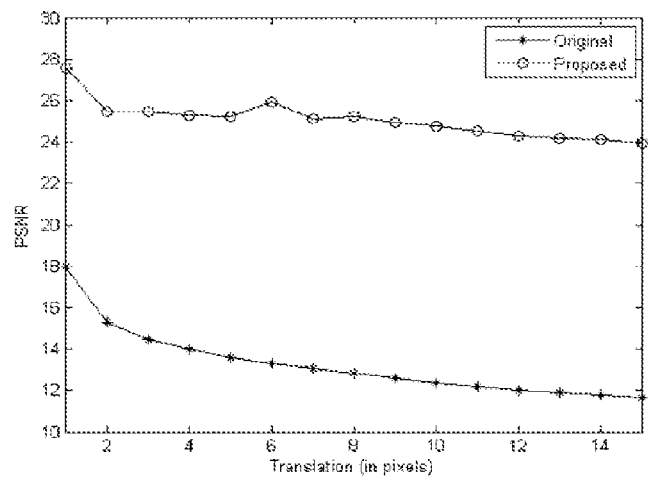
FIG. 11A shows a graph of experimental results of distorting a selected image in the LIVE database with translation for PSNR metrics.
Figure 11B:
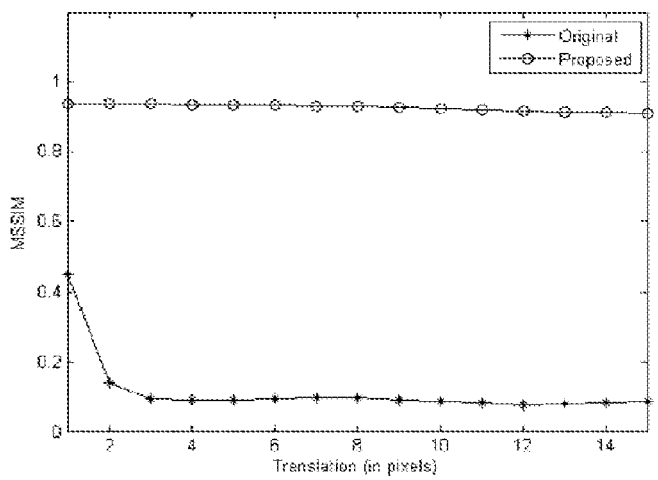
FIG. 11B shows a graph of experimental results of distorting a selected image in the LIVE database with translation for MSSIM metrics.
Figure 11C:
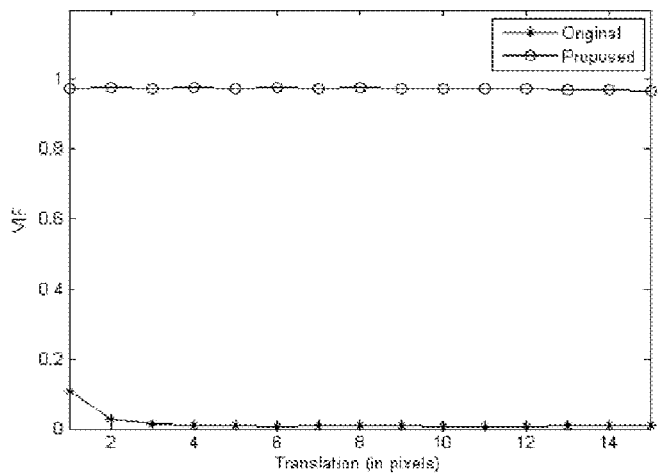
FIG. 11C shows a graph of experimental results of distorting a selected image in the LIVE database with translation for VIF metrics.

FIGS. 11a, 11b, and 11c show graphs of the experimental results of distorting a selected image in the LIVE database with translation for metrics PSNR, MSSIM, and VIF respectively. The translations range from 1 to 15 pixels.

Figure 12A:
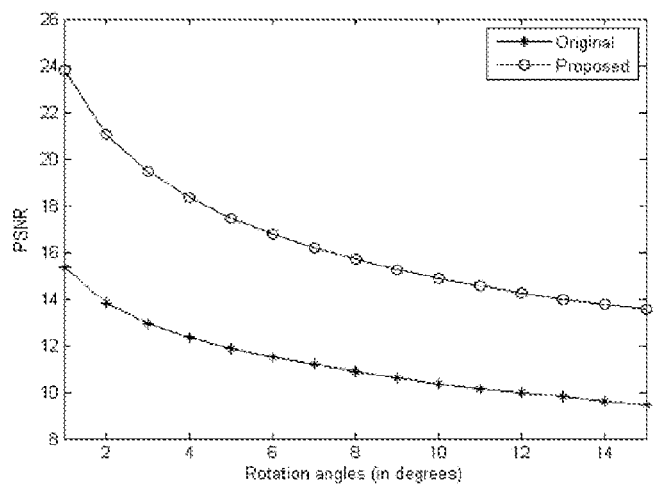
FIG. 12A shows a graph of experimental results of distorting the selected image in the LIVE database with rotation ranging from 1 to 15 degrees for PSNR metrics.
Figure 12B:
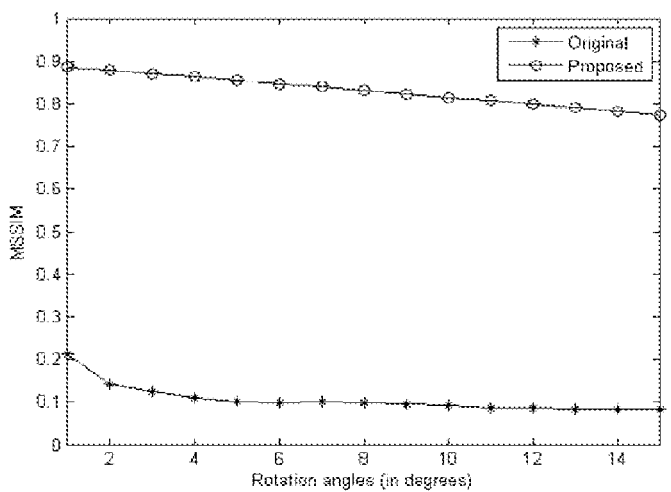
FIG. 12B shows a graph of experimental results of distorting the selected image in the LIVE database with rotation ranging from 1 to 15 degrees for MSSIM metrics.
Figure 12C:
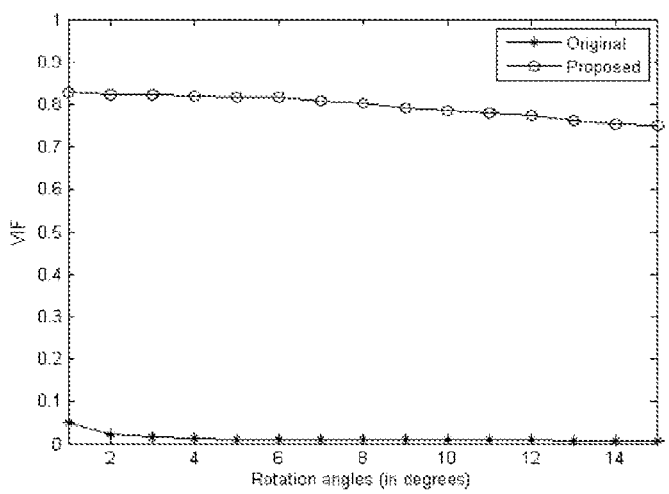
FIG. 12C shows a graph of experimental results of distorting the selected image in the LIVE database with rotation ranging from 1 to 15 degrees for VIF metrics.
Figure 13A:
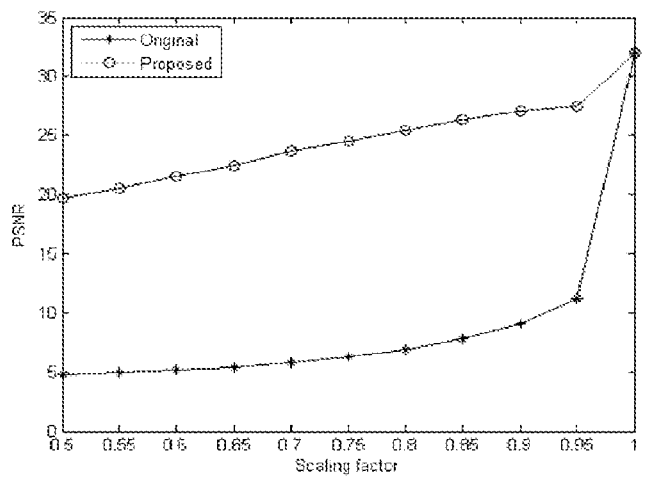
FIG. 13A shows a graph of experimental results of distorting the selected image in the LIVE database with scaling factors ranging from 0.5 to 1.0 for PSNR metrics.
Figure 13B:
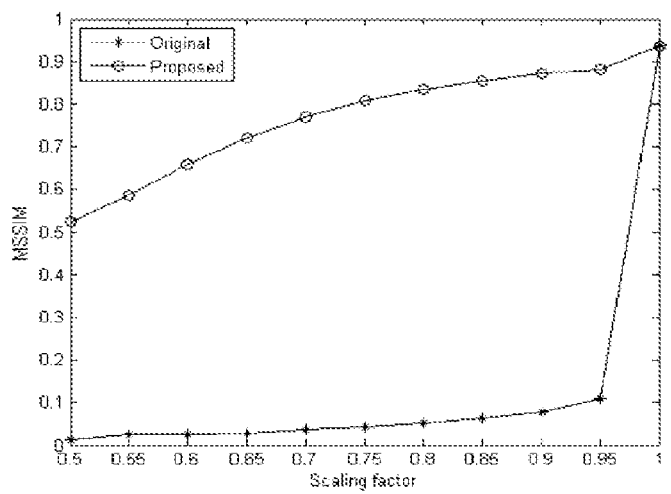
FIG. 13B shows a graph of experimental results of distorting the selected image in the LIVE database with scaling factors ranging from 0.5 to 1.0 for MSSIM metrics.
Figure 13C:
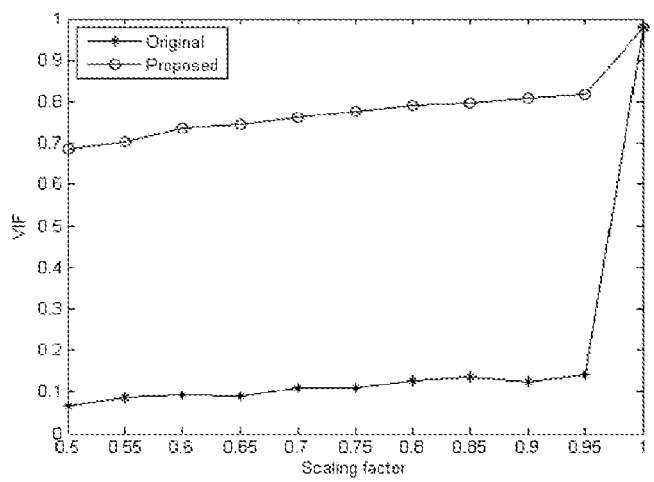
FIG. 13C shows a graph of experimental results of distorting the selected image in the LIVE database with scaling factors ranging from 0.5 to 1.0 for VIF metrics.

Similarly, FIGS. 12a, 12b, and 12c show graphs of the experimental results of distorting the selected image in the LIVE database with rotation ranging from 1 to 15 degrees for metrics PSNR, MSSIM, and VIF respectively, and FIGS. 13a, 13b, and 13c show graphs of the experimental results of distorting the selected image in the LIVE database with scaling factors ranging from 0.5 to 1.0 for metrics PSNR, MSSIM, and VIF respectively.

The horizontal axis scales in FIGS. 11 and 12 do not include the (0,0) point, in order to show the comparison more clearly. Actually, there are no distortions at (0,0), so both the original and the affine pre-processed images will have the same metric scores.

As is seen in the graph for translation distortions, the proposed method of affine pre-processing the distorted image generates nearly constant scores for metrics PSNR, MSSIM, and VIF. Nearly constant scores are expected when a good pre-processing is performed since small translations should not affect the visual quality. For rotation distortions, the proposed method generates nearly constant scores for MSSIM and VIF. The PSNR values decreases as the spatial shift increases, but the proposed method is still better than the standard PSNR without pre-processing. Again, nearly constant scores are expected when a good pre-processing is performed since small rotations should not affect the visual quality. The fact that the metric score stays mostly constant under translation and rotation shows the effectiveness of the proposed pre-processing prior to applying the metric. For scaling distortion, the proposed method yields significantly higher scores than the standard metrics for PSNR, MSSIM, and VIF. A decrease in quality is expected as the scaling factor is reduced since the image quality decreases (becomes more blurry) as it gets smaller. However it intuitively cannot drop drastically as show with the original method. A gradual decrease in quality, as exhibited with the proposed method, is more appropriate.

This is shown in FIGS. 7a, 7b and 7c, where the metric values decrease as the scaling factor decreases, but the change is gradual with the pre-processing method of the invention, and is representative of the gradual loss of quality associated with scaling images. Our finding is that MSSIM and VIF are better metrics when the images are affine-distorted than PSNR. Nevertheless, all three metrics produced with the pre-processing step of the invention generate higher scores than those standard metrics without pre-processing. It is easy to see that the proposed pre-processing method is very robust against different kinds of distortion.

Sampat et al. in M. P. Sampat, Z. Wang, S. Gupta, A. C. Bovik and M. K. Markey, "Complex wavelet structure similarity: A new image similarity index," IEEE Transactions on Image Processing, vol. 18, no. 11, pp. 2385-2401, 2009, proposed a new image similarity index (CW-SSIM) in the complex wavelet domain, which is invariant only to small translations and small rotations. The proposed pre-processing method in the present patent application, on the other hand, is more robust to any amount of translation, rotation, and scaling factors. This indicates that the proposed method of the present invention is feasible for measuring image visual quality under different kinds of distortion.

While the first and second embodiments of the Image Pre-processing system 130 are "affine transform based" embodiments, using SIFT keypoint matching and affine transforms, additional embodiments based on Radon transforms are described in the following.

While both, the affine transform based methods and the Radon transform based methods serve the same goal of processing the distorted image into alignment with the reference image, there are some differences in capability. For example, the affine transform based methods are able to correct many geometric distortions including skewing and flipping (reversing), but the Radon transform based methods are not capable of correcting the skewing and flipping distortions. On the other hand, the robustness of the Radon transform based methods in the presence of very noisy images may exceed the performance of the affine transform based methods.

The Radon transform based embodiments of the Image Pre-processing system 130 are based on methods for determining a scaling factor and a rotation angle for "registering" the Distorted Image Y with the Reference Image X. These additional embodiments are conducive to efficient implementation, and are excellently robust in the presence of noise, but are limited with respect to certain types of distortion for which the aforementioned first and second embodiments may be superior (e.g. shearing distortion, see FIG. 4b). These embodiments are further based on the assumption that the same scaling factor applies both horizontally and vertically. However, the proposed methods work very well in noisy environments.

Figure 14:
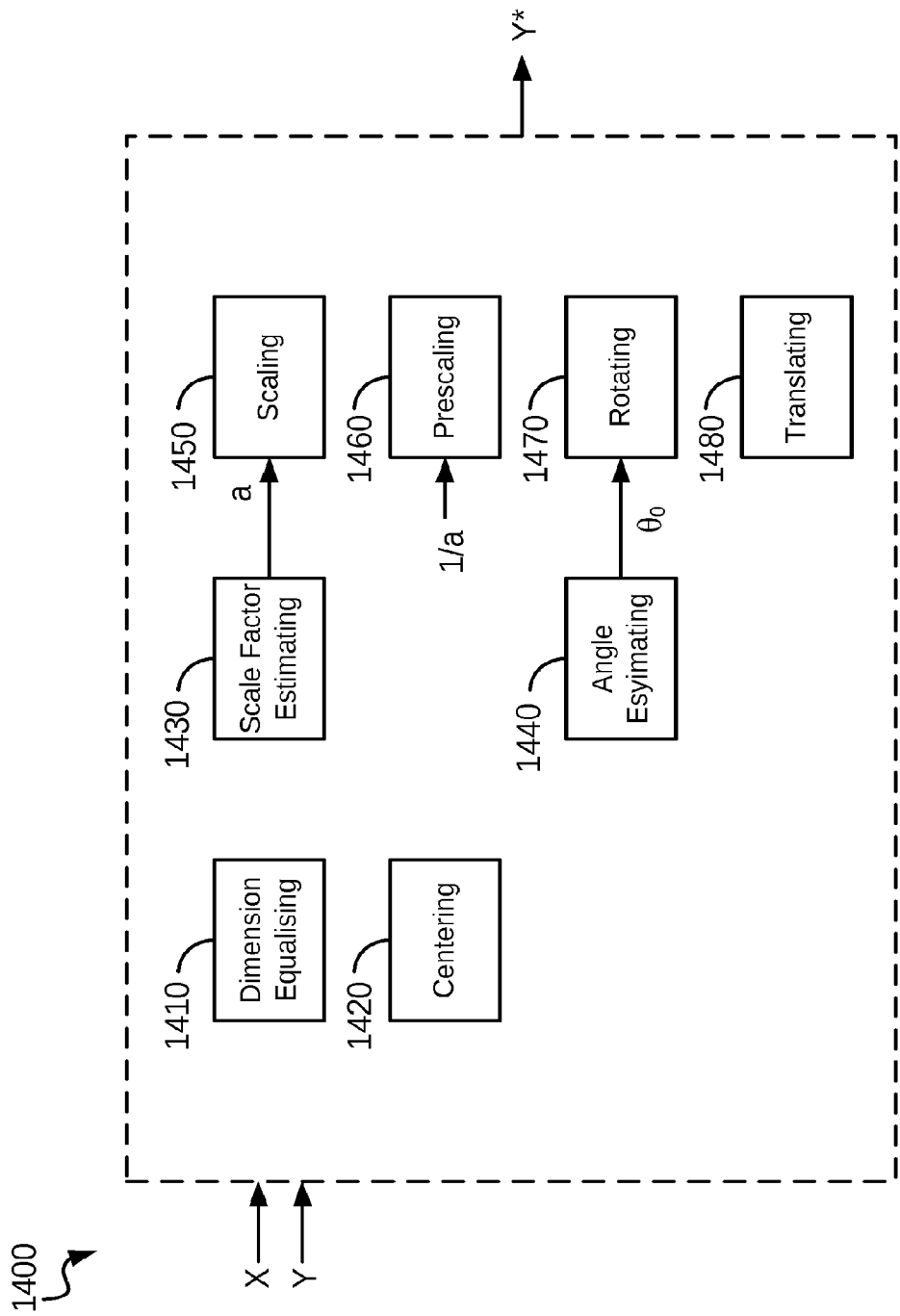
FIG. 14 shows a diagram 1400 of a set of building blocks for Radon Transform based alignment systems.

FIG. 14 shows a diagram 1400 of a set of building blocks for Radon Transform based alignment systems, comprising a number of blocks for performing the following functions:

a Dimension Equalising function 1410 for equalising the horizontal dimensions of the input images, i.e. the Reference Image X and the Distorted Image Y;

a Centering function 1420 for centering an image to its centroid;

a Scale Factor Estimating function 1430 for determining a scale factor "a" as a ratio of the size of the Reference Image X to the size of the Distorted Image Y;

an Angle Estimating function 1440 for determining a rotational angle $\theta_0$ that exists between the orientation of the Reference Image X and the Distorted Image Y;

a Scaling function 1450 for scaling the Distorted Image Y or a processed version of it by the scale factor "a", thereby making its size substantially equal to the size of the Reference Image X;

a Prescaling function 1460 for prescaling the Reference Image X or a processed version of it by the inverse of the scale factor "a", thereby making its size substantially equal to the size of the Distorted Image Y or a processed version of it;

a Rotating function 1470 for rotating the Distorted Image Y or a processed version of it by the rotational angle $\theta_0$;

a Translating function 1480 for performing a translation of a processed version of the Distorted Image Y to align it horizontally and vertically with the Reference Image X or a processed version of it.

Embodiments of the invention which are described in the following, make use of the set of building blocks 1400 in various combinations and sequences, to generate the registered image Y* by processing the Distorted Image Y and the Reference Image X.

Figure 15:
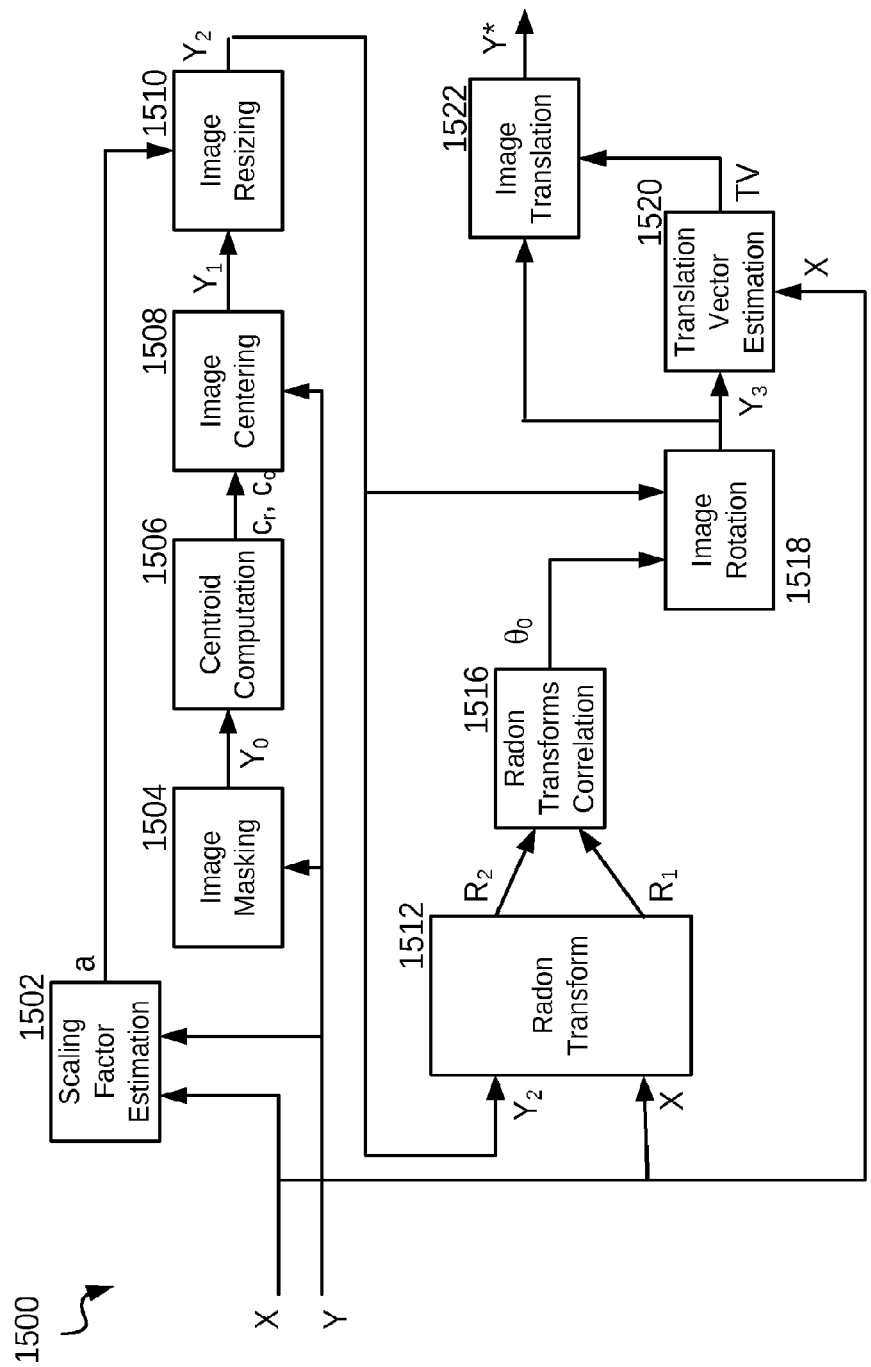
FIG. 15 is a block diagram of a first Radon Transform based image alignment system 1500 which is a third embodiment of the invention.

FIG. 15 is a block diagram of a first Radon Transform based image alignment system 1500 which is a third embodiment of the Image Pre-processing system 130 of FIG. 1, comprising the following modules:

a Scaling Factor Estimation module 1502 for determining the scale factor "a";

an Image Masking module 1504 for extracting a masked image $Y_o$ from the Distorted Image Y;

a Centroid Computation module 1506 for determining centering parameters "$c_r$" and "$c_c$" from the masked image $Y_0$;

an Image Centering module 1508 for centering the Distorted Image Y and generate a centered image $Y_1$ using the centering parameters "$c_r$" and "$c_c$"; and an Image Resizing module 1510 for resizing the centered image $Y_1$ into a resized Distorted Image $Y_2$ using the scale factor "a".

The resized Distorted Image $Y_2$ is of the same size as the Reference Image X and has been centered, but may still need to be rotated.

The first Radon Transform based image alignment system 1500 further includes:

a Rotation Anlge Determination unit 1511 comprising a Radon Transform module 1512 for generating Radon transforms $R_2$ and $R_1$ of the resized Distorted Image $Y_2$ and the Reference Image X respectively, and a Radon Transforms Correlation module 1516 for estimating the rotation angle "$(\theta)_0$" from the Radon transforms $R_2$ and $R_1$;

an Image Rotation module 1518 in which the resized Distorted Image $Y_2$ is rotated by the rotation angle "$\theta_0$" to form a corrected image $Y_3$ which however may still be offset laterally from the Reference Image X;

a Translation Estimating module 1520 in which an offset vector "TV" between the corrected image $Y_3$ and the Reference Image X is determined;

and an Image Translation module 1522 in which the offset vector "TV" is applied to the corrected image $Y_3$ to generate the Registered Image Y*.

For the method of the third embodiment, it is assumed that there is a black background around the actual visual content inside distorted image Y. It is also important to note that an increasing number of pixels are lost with this method as the rotation angle is departing significantly from rotation angles of 0, 90, 180 or 270 degrees. The more one departs from these angle values, the larger the number of lost pixels. Therefore, if the alignment method is followed by an image evaluation method, the more we depart from these angle values, the less accurate the quality evaluation will be.

Figure 16:
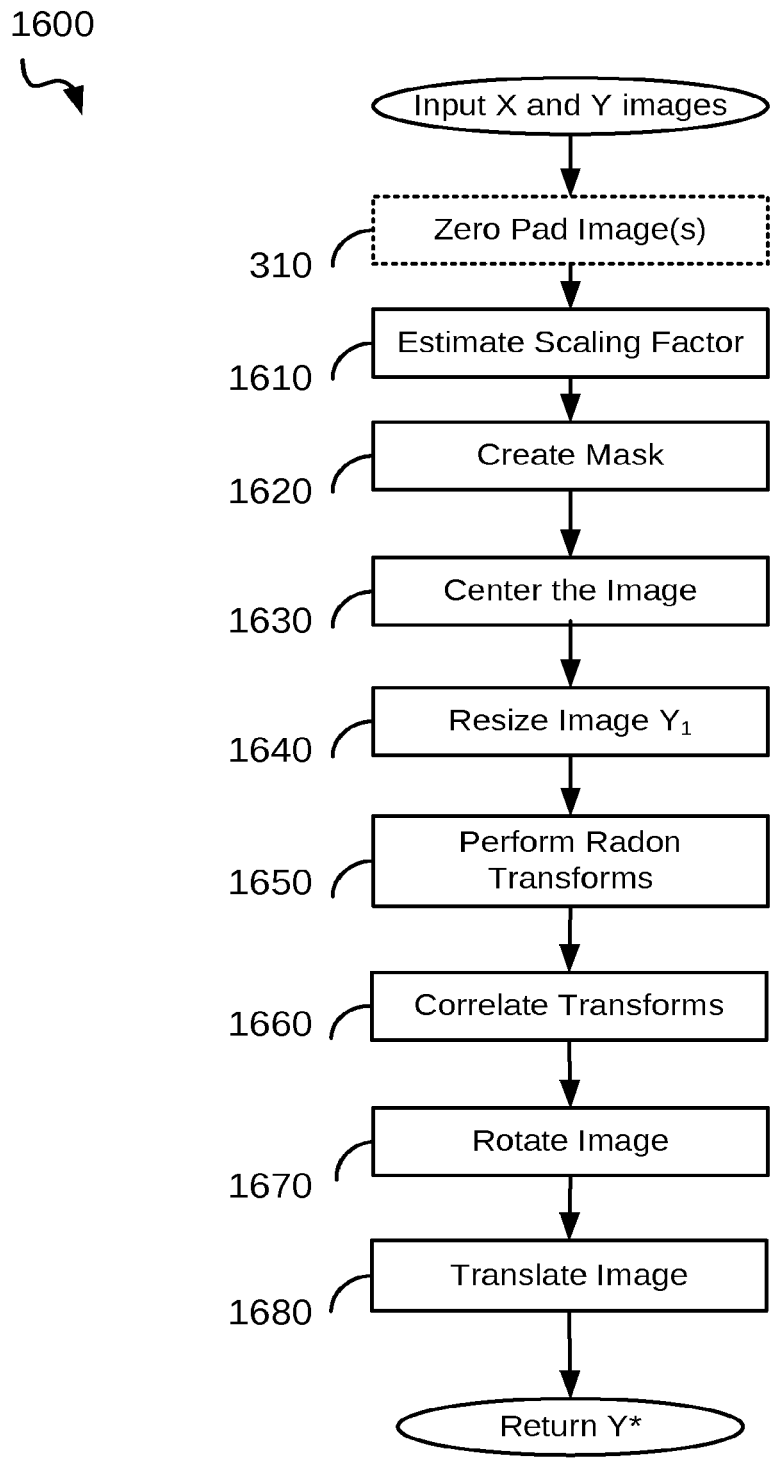
FIG. 16 shows a first Radon Transform based method 1600 for the system of FIG. 15.

FIG. 16 shows a first Radon Transform based method 1600 that may be instantiated in the modules of the first Radon Transform based image alignment system 1500 including steps:
310 "Zero Pad Image(s)";
1610 "Estimate Scaling Factor a";
1620 "Compute Centroid of Image Y";
1630 "Center the Image Y to Generate $Y_1$";
1640 "Resize the Image $Y_1$ to Generate $Y_3$";
1650 "Perform Radon Transforms R1 and R2";
1660 "Correlate Transforms to Generate $\theta_0$";
1670 "Rotate Image $Y_1$ to Generate $Y_3$"; and
1680 "Translate Corrected Image $Y_3$".

After equalizing the sizes of the Reference Image X and the Distorted Image Y in the step 310 "Zero Pad Image(s)" as described earlier, the following sequence of steps is performed by which the Distorted Image Y is scaled, rotated, and translated to become the registered image Y.

In the step 1610 "Estimate Scaling Factor", which is performed in the Scaling Factor Estimation module 1502, the scaling factor "a" is determined by averaging the luminance of each image which may be done using a Fourier Transform, and dividing the results. This assumes that in creating the distorted image, no operation altering the average luminance (such as contrast or brightness manipulation) had occurred:

Let the Distorted Image Y be considered as a rotated and scaled version of the Reference Image X.

Fourier transforms $F_1$ and $F_2$ of images X and Y, each of size M×N, are given in equations (9) and (10):

$$F_1(u, v) = \frac{1}{MN} \sum_{m=1}^{M} \sum_{n=1}^{N} X(m, n) e^{-i(um/M + vn/N)} \quad (9)$$

$$F_2(u, v) = \frac{1}{MN} \sum_{m=1}^{M} \sum_{n=1}^{N} Y(m, n) e^{-i(um/M + vn/N)} \quad (10)$$

In the polar coordinate system, their magnitudes are related as given in equation (11), see B. S. Reddy and B. N. Chatterji, "An FFT-based technique for translation, rotation and scale-invariant image registration," IEEE Transactions on Image Processing, vol. 5, no. 8, pp. 1266-1271, 1996, for details:

$$\|F_1(r, \theta)\| = \frac{1}{a^2} \|F_2(r/a, \theta - \theta_0)\| \quad (11)$$

where a is the scaling factor (the same factor applying horizontally and vertically) and $\theta_0$ is the rotation angle between the two images, and $$r = \sqrt{m^2 + n^2} \quad (12)$$

$$\theta = \tan^{-1}(n/m) \quad (13)$$

Therefore, the scaling factor may be obtained as:

$$a = \sqrt{\frac{\|F_2(0, 0)\|}{\|F_1(0, 0)\|}} \quad (14)$$

The scaling factor a may also be obtained more simply without computing the 2D FFT of images X and Y, since $$F_1(0, 0) = \frac{1}{MN} \sum_{m=1}^{M} \sum_{n=1}^{N} X(m, n) \quad (15)$$

and $$F_2(0, 0) = \frac{1}{MN} \sum_{m=1}^{M} \sum_{n=1}^{N} Y(m, n) \quad (16)$$

Now, consider that the Distorted Image Y may also be translated and rotated as well as scaled. The approach used to compute the scaling factor a will still hold as long as the shift operation removes very few pixels relative to the total number of pixels of the Distorted Image Y.

In the step 1620 "Create Mask", which is performed in the Image Masking module 1504, a mask image $Y_0$ is then created by the following rule: $Y_0(m,n)=1$ if $Y(m,n)>\tau$; and $Y_0(m,n)=0$, otherwise. In this embodiment of the invention, the inventors have chosen $\tau=40$.

In the step 1630 "Center the Image", the Image Y is centered to become the centered Image $Y_1$. The centroid ($c_r$, $c_c$) of the mask image $Y_0$ may be calculated as:

$$c_r = \sum_{m,n} m Y_0(m, n) \Big/ \sum_{m,n} Y_0(m, n) \quad (17)$$

$$c_c = \sum_{m,n} n Y_0(m, n) \Big/ \sum_{m,n} Y_0(m, n) \quad (18)$$

where the parameters $c_r$ and $c_c$ represent the row and column coordinates respectively of the pixel which is referred to as the "centroid". This operation is performed in the Centroid Computation module 1506.

The position corresponding to $Y(c_r, c_c)$ is then moved to the center of the image Y, the translation being performed in the Image Centering module 1508. The centered image $Y_1$ is computed with equation 19 as:

$$Y_1(m,n) = Y(m - c_r + M/2, n - c_c + N/2). \quad (19)$$

where $m \in [1,M]$ and $n \in [1,N]$. If $(m - c_r + M/2, n - c_c + N/2)$ is outside the index range $[1,M] \times [1,N]$, then $Y_1(m,n)$ is set to equal 0.

In the step 1640 "Scale the Image", which is performed in the Image Resizing module 1510, the scaling factor "a" is then used to resize the centered image $Y_1$ into a normalized image $Y_2$ such that it has the same scale as the Reference Image X. This is done in preparation for estimating the rotation angle. The normalized image $Y_2$ is defined by $Y_2(m,n) = Y_1(m/a, n/a)$.

The indices m and n of the normalized image $Y_2$ must be integer values, but after the resizing calculation, they would generally be floating point numbers which then need to be truncated or rounded to become integer values. For the pixel values in the resized image, one may then use the nearest pixel value, or use bilinear interpolation to determine pixel values from a number of adjacent pixels.

The rotation angle $\theta_0$ between the Reference Image X and the normalized image $Y_2$ is obtained from the corresponding Radon Transforms, in the following two steps.

The step 1650 "Perform Radon Transforms", is performed in the Radon Transform module 1512, to compute corresponding Radon transforms of the Reference Image X and of the normalized image $Y_2$.

The Radon transform $R_1$ of the Reference Image X, is defined as:

$$R_1(r,\theta) = \iint X(m,n)\delta(r - m\cos\theta - n\sin\theta)dmdn \quad (20)$$

and the Radon transform $R_2$ of the normalized image $Y_2$ is defined as:

$$R_2(r,\theta) = \iint Y_2(m,n)\delta(r - m\cos\theta - n\sin\theta)dmdn \quad (21)$$

where $\delta(\ )$ is the Dirac delta function.

As was pointed out in A. Averbuch, R. R. Coifman, D. L. Donoho, M. Israeli, and Y. Shkolnisky. "A framework for discrete integral transformations I—the pseudo-polar Fourier transform". SIAM Journal on Scientific Computing, 30(2): 764-784, 2008, for modern applications it is important to have a discrete 2D Radon transform, which has been the object of attention of many authors over the last twenty years. Until recently, the Radon transform lacked a coherent discrete definition for 2D discrete images, which is algebraically exact, invertible, and rapidly computable. Therefore, Averbuch et al. defined a notion of 2D discrete Radon transforms for discrete 2D images, which is based on summations along lines of absolute slope less than 1. Values at non-grid locations are defined using trigonometric interpolation on a zero-padded grid. They proved that their definition provides a faithful description of the continuum, as it converges to the continuous Radon transform as the discretization step approaches zero. More details about the discrete Radon transform can be found in Averbuch et al. According to Averbuch et al., we can perform the discrete Radon transform of X and Y2, denoted as $R_1(r,\theta)$ and $R_2(r,\theta)$, respectively, where both of them are of size K×L.

Based on the premise that the two images (the Reference Image X and the normalized Distorted Image $Y_2$) are the same or at least very similar except for the rotation between them and possible noise, it follows that their Radon transforms $R_1(r,\theta)$ and $R_2(r,\theta)$ are substantially or exactly the same, except for the circular shift along the $\theta$ direction, i.e., $R_2(r,\theta) = R_1(r,\theta + \theta_0)$. The sizes of $R_1$ and $R_2$ are characterized by the parameters K and L which are selected based on the desired precision for the radius "r" and the angle theta. In the embodiments of the Radon Transform based system, the parameter K was selected as the default from the 'radon' function of the software used (MATLAB, see above), which is related to the image size as approximately K=sqrt(M*M+N*N)+5, i.e. slightly exceeding the length of the diagonal of the image in number of pixels. For the angle precision, the range of L was selected as L=0 to 179 which provides a precision of about 1 degree.

The Radon Transform function is described in the MATLAB documentation as follows:

"R=radon(I, theta) returns the Radon transform R of the intensity image I for the angle theta degrees. The Radon transform is the projection of the image intensity along a radial line oriented at a specific angle. If theta is a scalar, R is a column vector containing the Radon transform for theta degrees. If theta is a vector, R is a matrix in which each column is the Radon transform for one of the angles in theta."

According to theory, if one image is a rotated version of another, the two images will have the same Radon transform, except for a circular shift along the angle dimension. In the present case, the Reference Image X and the normalized Distorted Image $Y_2$ are subject to more differences, and the equivalence of the transforms will not hold exactly. For this reason, computing the angle for several values of r and taking the median of the angle will make the estimation of the angle more robust.

In the step 1660 "Correlate Transforms", which is performed in the Radon Transforms Correlation module 1516, the two Radon transforms are systematically compared by a correlation method, to estimate the most likely angle of orientation of the Distorted Image Y with respect to the Reference Image X.

The circular cross-correlation could be used to calculate $\theta_0$, but this would be time-consuming, with a computational complexity of $O(KL^2)$ because for every row of $R_1$ and $R_2$, one would need to circularly shift $R_2$ and then calculate the cross-correlation between the two rows. This has a computational complexity of $O(L^2)$. Since there are K rows in total, the total computational complexity would be $O(KL^2)$.

As a more efficient alternative, one can use the one-dimensional (1D) FFT instead, which has a computational complexity of $O(KL\log L)$.

The following paragraphs provide a general theory of computing a cross correlation by FFT, on which the preferred method of the third embodiment rests:

We briefly state the definition of the cross-correlation and its fast implementation here. The cross-correlation between two discrete real-valued functions of f[n] and g[n] is, according to D. Nikolic, R. C. Muresan, W., Feng and W. Singer, "Scaled correlation analysis: a better way to compute a cross-correlogram," European Journal of Neuroscience, pp. 1-21, 2012:

$$(f*g)[n] = \sum_{m=-\infty}^{\infty} f[m]g[n+m].$$

The convolution between f[n] and g[n] is given in V. Sobolev, "Convolution of functions", in Michiel Hazewinkel, Encyclopedia of Mathematics, Springer, ISBN 978-1-55608-010-4:

$$(f \oplus g)[n] = \sum_{m=-\infty}^{\infty} f[m]g[n-m].$$

The cross-correlation of function f[n] and g[n] is equivalent to the convolution of h[n]=f[−n]) and g[n]:

$$(f*g)[n] = \sum_{m=-\infty}^{\infty} f[-m]g[n-m] = (h \oplus g)[n].$$

Analogous to the convolution theorem, the cross-correlation satisfies:

$$FFT\{f*g\} = FFT\{h \oplus g\}$$
$$= FFT\{h\} \cdot FFT\{g\}$$
$$= conj(FFT(f)) \cdot FFT\{g\}$$

where FFT denotes the fast Fourier transform, conj the complex conjugate, and the dot means component-wise multiplication. By taking the inverse FFT, we can obtain a fast implementation of f*g.

Figure 17:
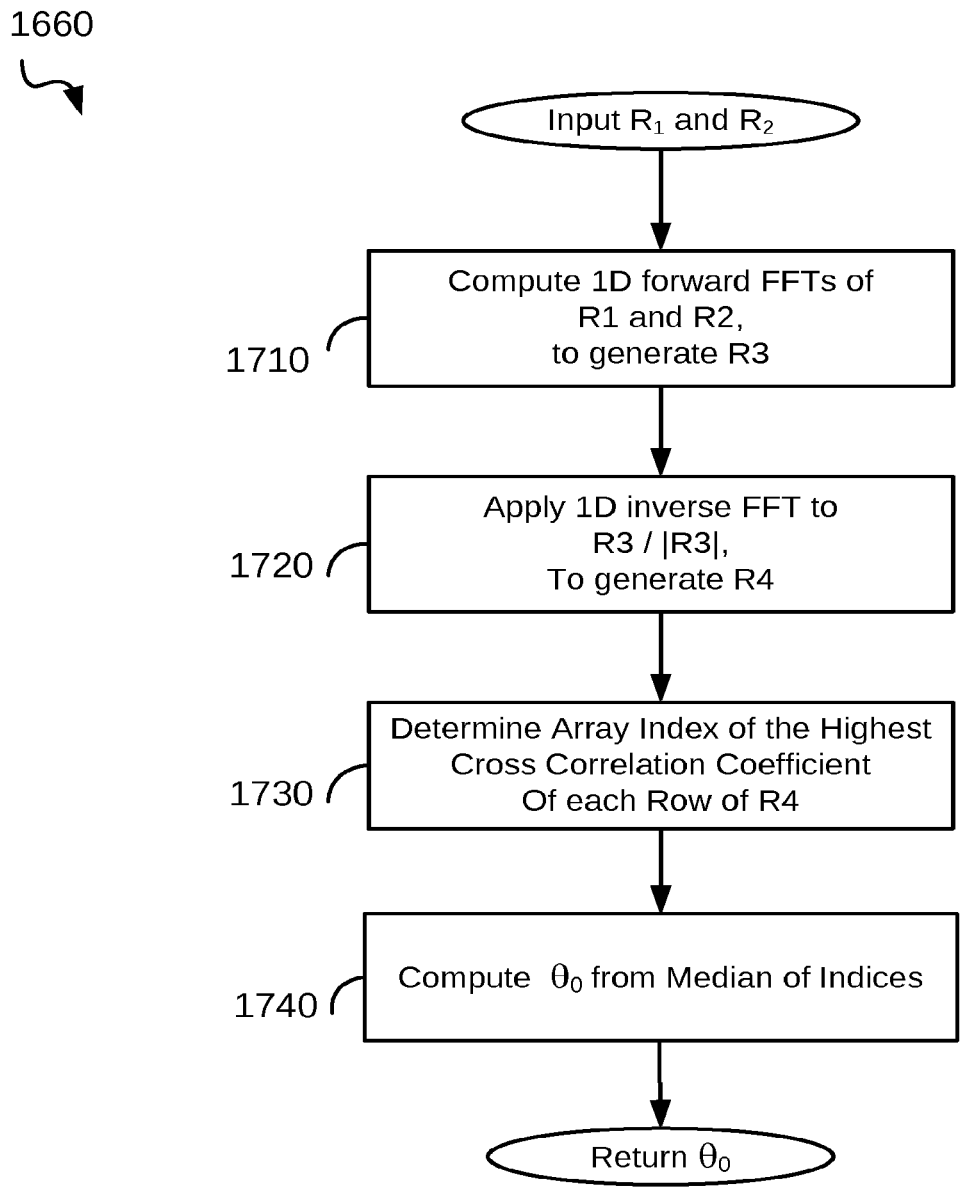
FIG. 17 shows an expansion of the step 1660 "Correlate Transforms of FIG. 16.
Figure 18B:
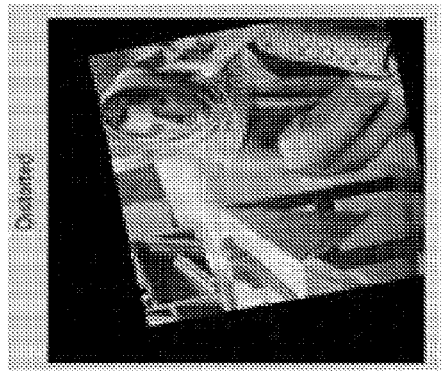
FIG. 18B shows a distorted version (scale=0.8, rotation=0.2 radian, translation=(40,40), the noise standard deviation $\sigma_n$=10) of the original image of FIG. 18A.
Figure 18E:
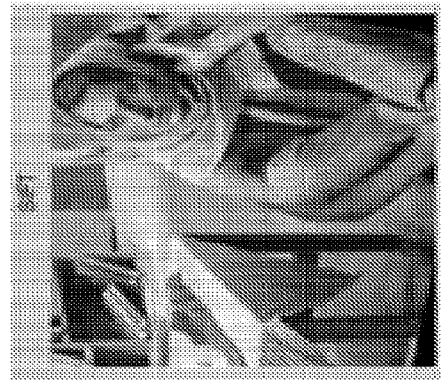
FIG. 18E shows the distorted image of FIG. 18B registered by the SIFT method.
Figure 18D:
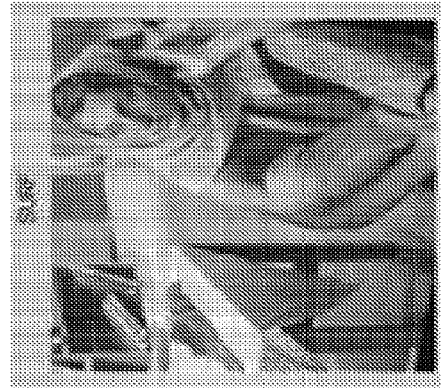
FIG. 18D shows the distorted image of FIG. 18B registered by the SURF method.
Figure 18A:
FIG. 18A shows an original image.
Figure 18C:
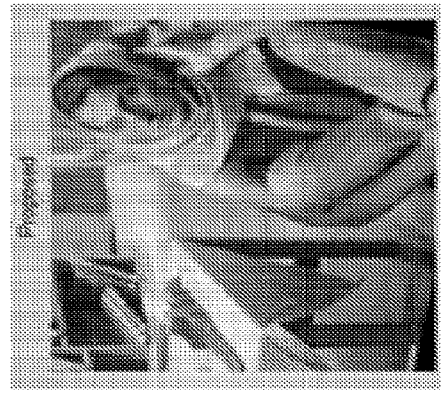
FIG. 18C shows the distorted image of FIG. 18B registered by the method of the third embodiment of the present invention.
Figure 19E:
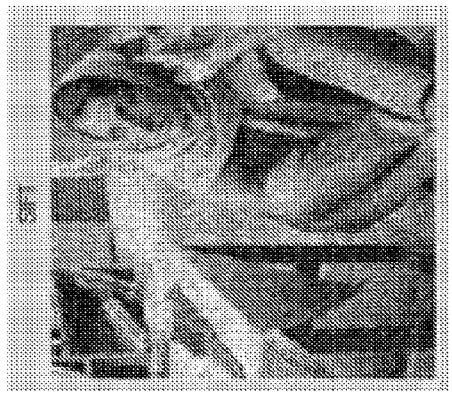
FIG. 19E shows the distorted image of FIG. 19B registered by the SIFT method.
Figure 19B:
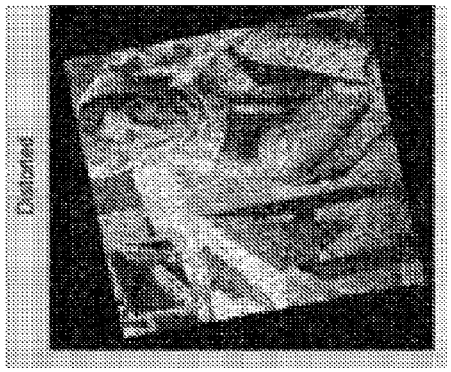
FIG. 19B shows a distorted version (scale=0.8, rotation=0.2 radian, translation=(4,4), the noise standard deviation $\sigma_n$=50) of the image of FIG. 19A.
Figure 19D:
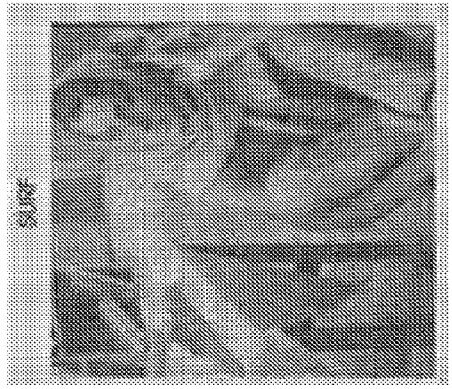
FIG. 19D shows the distorted image of FIG. 19B registered by the SURF method.
Figure 19A:
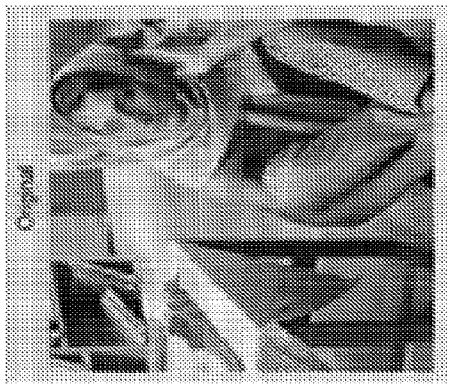
FIG. 19A shows the original image of FIG. 18A.
Figure 19C:
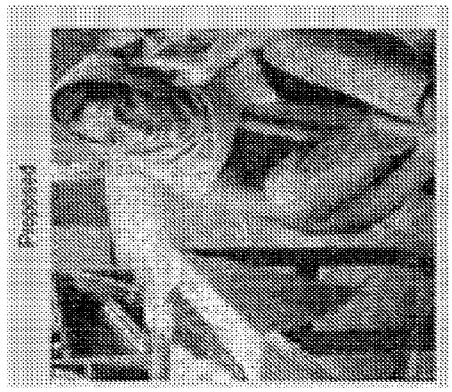
FIG. 19C shows the distorted image of FIG. 19B registered by the method of the third embodiment of the present invention.
Figure 20E:
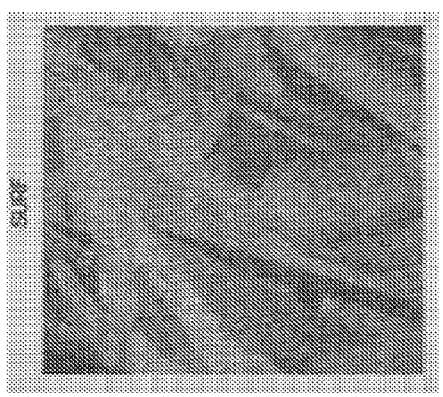
FIG. 20E shows the distorted image of FIG. 20B registered by the SIFT method.
Figure 20B:
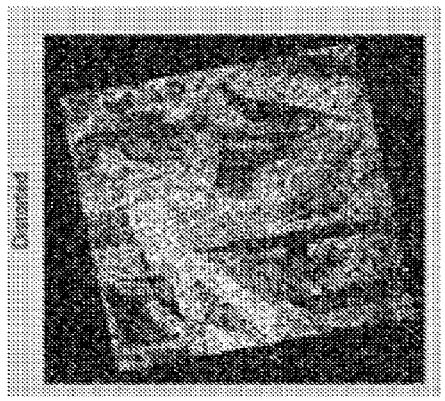
FIG. 20B shows a distorted version (scale=0.8, rotation=0.2 radian, translation=(4,4), the noise standard deviation $\sigma_n$=100) of the image of FIG. 20A.
Figure 20D:
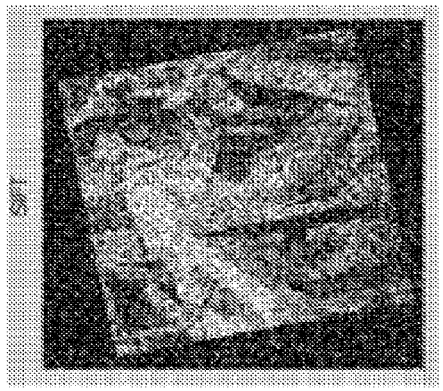
FIG. 20D shows the distorted image of FIG. 20B registered by the SURF method.
Figure 20A:
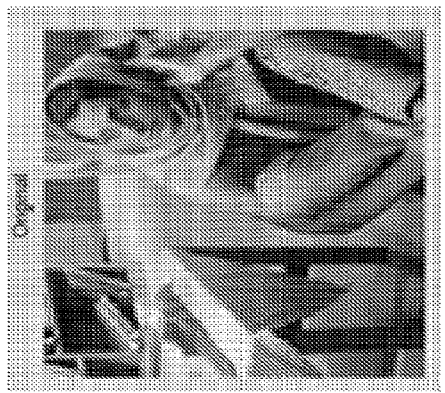
FIG. 20A shows the original image of FIG. 18A.
Figure 20C:
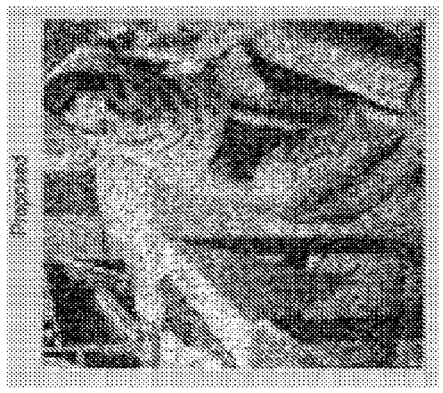
FIG. 20C shows the distorted image of FIG. 20B registered by the method of the third embodiment of the present invention.

FIG. 17 shows an expansion of the step 1660 "Correlate Transforms", including steps:

1710 "Compute 1D forward FFTs of R1 and R2 to generate R3";

1720 "Apply 1D inverse FFT to R3/|R3| to generate R4";

1730 "Determine highest Cross Correlation Coefficient by Row"; and

1740 "Estimate $\theta_0$ from the median of array indices maximum cross correlation coefficients".

Let us denote the m$^{th}$ row of R$_1$ and R$_2$ as r$_1$(n) and r$_2$(n), respectively, where n=1 to L, the number of angles, i.e. circular shifts of R1 and R2.

In the step 1710 "Compute 1D forward FFTs of R1 and R2 to generate R3" a 1D forward FFT is performed on each of r$_1$(n) and r$_2$(n), to generate a first intermediate result R3=r$_3$(u): r$_3$(u)=FFT(r$_1$)·conj(FFT(r$_2$)), where "conj" stands for complex conjugate and ⊡ is the component-wise product.

In the step 1720 "Apply 1D inverse FFT to R3/|R3| to generate R4" the 1D inverse FFT is applied to r$_3$(u)|r$_3$(u)|, i.e. a second intermediate result R4=r$_4$(n) is calculated:

$$r_4(n) = IFFT(r_3(u)/\|r_3(u)\|). \quad (22)$$

Since $r_2(n) = r_1(n + \theta_0)$, we have
$$FFT(r_2(n)) = FFT(r_1(n+\theta_0)) = FFT(r_1(n))e^{-i\theta_0 u}$$

$$r_3(u)/\|r_3(u)\| = \frac{FFT(r_1(n))FFT^*(r_1(n))e^{+i\theta_0 u}}{\|FFT(r_1(n))FFT^*(r_1(n))e^{+i\theta_0 u}\|} = e^{+i\theta_0 u} \quad (23)$$

$$r_4(n) = \delta(n + \theta_0) \quad (24)$$

Therefore, r$_4$(n) will have a peak value of 1.0 at $-\theta_0$ and all the remaining values will be 0. Each of the values of R4=r4(n) represent a vector (i.e. an array) of cross correlation coefficients between R1 and R2, for a given offset angle between two Radon transforms.

In the step 1730 "Determine highest Cross Correlation Coefficient by Row", we find the location index $\theta^*(m)$ of the maximum value on every row of R4=r$_4$(n), i.e., $$\theta*(m) = -\max_{1 \leq n \leq L} r_4(n).$$

In the step 1740 "Estimate $\theta_0$ from the median of array indices maximum cross correlation coefficients", by taking the median of the respective array indices pointing to these maximum values one obtains an estimate of the rotation angle between the two images (between the Reference Image X and the centered image Y$_1$) as $\theta_0$=median($\theta^*$(m)).

The following MATLAB code sample 2 implements the estimation of the rotation angle.

MATLAB code sample 2

```
function [theta]=ridgelet(A,B)
% Radon transform
theta0=0:180;
[B1,xp1] = radon(B,theta0); B1=B1';
[A,xp1] = radon(A,theta0); A=A';
[dim2,col2]=size(A);
A(dim2+(1:dim2),1:col2)=A(1:dim2,col2:-1:1);
B1(dim2+(1:dim2),1:col2)=B1(1:dim2,col2:-1:1);
[dim2,col2]-size(A);
% Correlation
ftA=fft(A);
ftB=fft(B1);
pro=ftA.*conj(ftB);
ift=real(ifft(pro));
for ii=1:col2,
    ifc=ift(:,ii);
    mft0=find(ifc==max(ifc(:)));
    mft(ii)=min(mft0(:));
    if mft(ii)>dim2/2,
        mft(ii)=floor(mft(ii)-dim2/2+0.5);
    end
end
theta=(median(mft)-1)*pi/180;
```

Returning now to the description of FIG. 16.

In the step 1670 "Rotate Image Y$_2$", which is performed in the Image Rotation module 1518, the resized image Y$_2$ is rotated by $-\theta_0$, degrees in order to compensate for the orientation difference, and thus obtain the corrected image Y$_3$.

In the step 1680 "Translate Corrected Image Y$_3$", which is performed in the Image Translation module 1522, the rotated Distorted Image Y$_3$ is translated into the final position, thereby generating the Register Image Y*.

For translation, one may choose the global motion compensation (MC) method proposed in G. Varghese and Z. Wang, "Video denoising based on a spatiotemporal Gaussian scale mixture model," IEEE Transactions on Circuits and Systems for Video Technology, vol. 20, no. 7, pp. 1032-1040, 2010, which is a simple, fast, and reliable method, providing integer pixel precision. Let Y$_3$(m,n) be the corrected image that has already been compensated for scaling and rotation, and X(m,n) the reference image. Also, we perform the 2D FFT to X and Y$_3$:

$$F_1(u, v) = \frac{1}{MN} \sum_{m=1}^{M} \sum_{n=1}^{N} X(m, n) e^{-i(um/M + vn/N)} \quad (25)$$

$$F_2(u, v) = \frac{1}{MN} \sum_{m=1}^{M} \sum_{n=1}^{N} Y_3(m, n) e^{-i(um/M + vn/N)}. \quad (26)$$

Then, the cross-correlation (CC) function is defined as:

$$k_{CC}(m,n) = IFFT_2(F_1(u,v) \cdot conj(F_2(u,v))), \quad (27)$$

where IFFT$_2$ is the inverse 2D Fourier transform, ⊡ is the component-wise product, and conj means complex conjugate. The estimated motion vector is given as:

$$(m_{opt}, n_{opt}) = \underset{(m,n)}{\mathrm{argmax}} k_{CC}(m, n). \quad (28)$$

This estimated motion vector, which is computed in the Translation Vector Estimating module 1520, is interpreted as the translation vector needed to move the rotated Distorted Image into the final position as the Registered Image Y*, i.e. Y*(m,n)=Y$_3$(m-m$_{opt}$,n-n$_{opt}$).

FIGS. 18-22 show results of experiments to illustrate the performance of the registration method proposed in the fourth embodiment of the invention described in FIG. 23 described below.

Each of the FIGS. 18(a-e) to 22(a-e) show:
an original image (a);
its distorted version (b); and
the distorted images registered by:
the method of the third embodiment of the present invention (c);
by the SURF method (d);
and by the SIFT method (e) respectively.

In particular, FIGS. 18a, 18b, 18c, 18d and 18e show the original image, its distorted version (scale=0.8, rotation=0.2 radian, translation=(40,40), the noise standard deviation $\sigma_n$=10), and the images registered using the proposed method of the embodiment of the invention, SURF, and SIFT, respectively.

FIGS. 19a, 19b, 19c, 19d and 19e show the original image, its distorted version (scale=0.8, rotation=0.2 radian, translation=(4,4), the noise standard deviation $\sigma_n$=50), and the images registered using the proposed method of the embodiment of the invention, SURF, and SIFT, respectively.

In FIGS. 18(a-e) and 19(a-e), it can be seen that all three methods work well for distortion by large to moderate spatial shifts (40,40 and 4,4 respectively) combined with relatively little to moderate noise ($\sigma_n$=10 and $\sigma_n$=50 respectively).

FIGS. 20a, 20b, 20c, 20d and 20e show the original image, its distorted version (scale=0.8, rotation=0.2 radian, translation=(4,4), the noise standard deviation $\sigma_n$=100), and the images registered using the proposed method of the embodiment of the invention, SURF, and SIFT, respectively. It can be seen that both SURF and SIFT fail, but the proposed method works well in this case.

FIGS. 21a, 21b, 21c, 21d and 21e show the original image, its distorted version (scale=0.5, rotation=0.2 radian, translation=(4,4), the noise standard deviation $\sigma_n$=10), and the images registered using the proposed method of the embodiment of the invention, SURF, and SIFT, respectively. With scaling factor of 0.5, all three methods perform well.

FIGS. 22a, 22b, 22c, 22d and 22e show the original image, its distorted version (scale=0.1, rotation=0.2 radian, translation=(4,4), the noise standard deviation $\delta_n$=10), and the images registered using the proposed method, SURF, and SIFT, respectively. With scaling factor of 0.1, our proposed method of the embodiment of the invention performs very well. However, both SURF and SIFT fail. Thus, the proposed method of the embodiment of the present invention is better than SIFT and SURF when the input image is scaled very small.

In summary, it can be seen that at $\sigma_n$=100, both SURF and SIFT methods fail, but our proposed method works very well in this case. In addition, with scaling factor a=0.5, all three methods generate good registration (see FIG. 21). However, with scaling factor a=0.1, both SURF and SIFT fail, whereas our proposed method works very well (see FIG. 22c).

The computational complexity of the proposed method of the third embodiment of the present invention has been compared with two existing methods. In a prior art paper, B. S. Reddy and B. N. Chatterji, "An FFT-based technique for translation, rotation and scale-invariant image registration," IEEE Transactions on Image Processing, vol. 5, no. 8, pp. 1266-1271, 1996, propose a technique to estimate translation, rotation, and scaling parameters. Their method uses 6 forward 2D FFT and 6 inverse 2D FFT, which is time-consuming and error-prone. In the third embodiment of the present invention, we use the ratio of means to estimate the scaling factor, and the Radon transform to estimate the rotation angle between the reference and distorted images. The Radon transform of an image can be carried out with constant time O(1) on a reconfigurable mesh as shown in Y. Pan, K. Li and M. Hamdi, "An improved constant-time algorithm for computing the radon and hough transforms on a reconfigurable mesh," IEEE Transactions on Systems, Man, and Cybernetics, Part A—Systems and Humans, vol. 29, no. 4, pp. 417-421, 1999. At most, the Radon transform can be carried out at a complexity of a 2D FFT, as shown by K. Jafari-Khouzani and H. Soltanian-Zadeh, "Radon transform orientation estimation for rotation invariant texture analysis," IEEE Transactions on Pattern Analysis and Machine Intelligence, vol. 27, no. 6, pp. 1004-1008, 2005. We then utilize the 2D FFT to obtain global spatial shifts, see G. Varghese and Z. Wang, "Video denoising based on a spatiotemporal Gaussian scale mixture model," IEEE Transactions on Circuits and Systems for Video Technology, vol. 20, no. 7, pp. 1032-1040, 2010. The method of the third embodiment of the invention uses only 3 forward 2D FFT, 2 inverse 2D FFT and 2 Radon transforms. Therefore, our proposed method is faster than the prior art method described in a paper of B. S. Reddy and B. N. Chatterji cited above. In E. De Castro and C. Morandi, "Registration of translated and rotated images using finite Fourier transforms," IEEE Transactions on Pattern Analysis and Machine Intelligence, vol. PAMI-95, pp. 700-703, 1987, the authors propose an image registration method, which requires 180 inverse 2D FFT. And furthermore, that method fails if a scale change is present. Conversely, the method of the third embodiment of the present invention works well in the presence of scale changes, and its computational complexity is much less than the method described by E. De Castro and C. Morandi.

The method and system of the third embodiment of the present invention provide the following advantages over existing prior art methods. The method of the third embodiment of the present invention performs very well in noisy environments, whereas existing methods such as those proposed in D. G. Lowe, "Distinctive Image Features from Scale-Invariant Keypoints," International Journal of Computer Vision, vol. 60, no. 2, pp. 91-110, 2004, and H. Bay, A. Ess, T. Tuytelaars and L. Van Gool "SURF: Speeded Up Robust Features," Computer Vision and Image Understanding (CVIU), vol. 110, no. 3, pp. 346-359, 2008, fail if the noise level is too high. In addition, the method of the embodiment of the present invention is fast in terms of computational complexity O(MN log(MN)+KL log(L)), where the input images are of size M×N and the Radon image is of size K×L. Furthermore, the method of the embodiment of the present invention can estimate all three parameters (translation, rotation, and scaling), whereas most existing methods only calculate one or two parameters, for example those proposed in K. Jafari-Khouzani and H. Soltanian-Zadeh, "Radon transform orientation estimation for rotation invariant texture analysis," IEEE Transactions on Pattern Analysis and Machine Intelligence, vol. 27, no. 6, pp. 1004-1008, 2005, or in W. Wei, S. Wang, X. Zhang and Z. Tang, "Estimation of image rotation angle using interpolation-related spectral signatures with application to blind detection of image forgery," IEEE Transactions on Information Forensics and Security, vol. 5, no. 3, pp. 507-517, 2010. Experimental results conducted in the next section show that our proposed method is feasible in registering images, especially in noisy environments.

Experimental Results from the Third Embodiment of the Invention

We have performed certain experiments on 512×512 Barbara and Lena images, and again used the LIVE Image Quality Assessment Database Release 2 (H. R. Sheikh, Z. Wang, L. Cormack and A. C. Bovik, "LIVE image quality assessment database release 2," http://live.ece.utexas.edu/research/quality.), which contains 779 distorted images derived from 29 original images using five types of distortions. The distortions include JPEG compression, JPEG2000 compression, Gaussian white noise (GWN), Gaussian blurring (GBlur), and the Rayleigh fast fading (FF) channel model. We performed experiments on all 779 distorted images in the LIVE image database. We used MATLAB code for our proposed method of the third embodiment of the invention.

Tables 6 and 7 give the experimental results for the Lena and Barbara images with translation, rotation, and scaling distortion, and with added noise. In both tables, our estimated parameters are very close to the input distortion parameters that produced the distorted images. In addition, our proposed method performs very well in noisy environments, whereas at $\sigma_n=100$, SIFT fails to find matching key points and SURF does not generate accurate results for the Lena image.

It should be pointed out that the precision of the rotation angle in the proposed method of the embodiment of the invention depends on the number of points L. In our simulations, we have used L=360 sample points in the rotation angle of the Radon transform. Therefore the precision is 1 degree (equivalent to 0.0174 radian). We can increase the accuracy by increasing the number of sample points, but this will make increase the computational complexity. Therefore, there is a trade-off to make between parameter accuracy and computational complexity.

Table 8 tabulates the results when every distorted image in the LIVE database is further distorted by scaling factor 0.9, rotation angle $0.1 \times 180/\pi$ degrees, spatial shifts 4 pixels in the horizontal direction, and 4 pixels in the vertical direction. For this database, all three (the proposed, SIFT, and SURF) methods allow a good estimation of parameters when there is no noise added. We estimate that the proposed method of the embodiment of the invention performs better than SIFT and SURF if we add noise to the images in this database, just as shown in Tables 6 and 7.

Table 9 lists the execution time in seconds associated with the three methods to register one pair of images of size 512×512. It can be seen that our proposed method of the embodiment of the invention spends less time than SURF, but more time than SIFT. Note that the SIFT was written in C, and is thus faster than the MATLAB implementation. According to H. Bay, A. Ess, T. Tuytelaars and L. Van Gool "SURF: Speeded Up Robust Features," Computer Vision and Image Understanding (CVIU), vol. 110, no. 3, pp. 346-359, 2008, SIFT was not as fast as SURF if both were written in MATLAB. We can therefore conclude that our proposed method of the embodiment of the invention is faster than both SURF and SIFT. In addition, our proposed method performs better than SURF and SIFT in noisy environments, as demonstrated in our experiments.

TABLE 6

Matching results of a translated (4, 4), rotated (0.1 radian), and scaled (0.9) Lena image with different noise levels

| Noise level | Method | Translation | Rotation | Scale |
|---|---|---|---|---|
| | Original | (4, 4) | 0.1000 | 0.9000 |
| | Proposed | (4, 4) | 0.0873 | 0.8983 |
| $\sigma_n = 0$ | SIFT | (4, 4) | 0.1001 | 0.9000 |
| | SURF | (5, −5) | 0.0979 | 0.9076 |
| | Proposed | (4, 4) | 0.0873 | 0.8982 |
| $\sigma_n = 50$ | SIFT | Fail | Fail | Fail |
| | SURF | (4, 5) | 0.1091 | 0.9081 |
| | Proposed | (4, 4) | 0.0873 | 0.8981 |
| $\sigma_n = 100$ | SIFT | Fail | Fail | Fail |
| | SURF | (27, 20) | 0.5684 | 1.8512 |

TABLE 7

Matching results of a translated (4, 4), rotated (0.1 radian), and scaled (0.9) Barbara image with different noise levels

| Noise level | Method | Translation | Rotation | Scale |
|---|---|---|---|---|
| | Original | (4, 4) | 0.1000 | 0.9000 |
| | Proposed | (4, 4) | 0.0873 | 0.8983 |
| $\sigma_n = 0$ | SIFT | (4, 4) | 0.0998 | 0.9002 |
| | SURF | (4, 4) | 0.0969 | 0.8993 |
| | Proposed | (4, 3) | 0.0873 | 0.8982 |
| $\sigma_n = 50$ | SIFT | (5, 4) | 0.1042 | 0.9078 |
| | SURF | (4, 4) | 0.0989 | 0.8969 |
| | Proposed | (4, 3) | 0.0873 | 0.8979 |
| $\sigma_n = 100$ | SIFT | Fail | Fail | Fail |
| | SURF | (4, 4) | 0.0935 | 0.8972 |

TABLE 8

The overall estimated parameters for every already distorted image in the LIVE image database, which is further distorted by scaling factor 0.9, rotation angle $0.1 \times 180/\pi$ degrees, spatial shifts 4 pixels in the horizontal direction, and 4 pixels in the vertical direction

| Method | Translation | Rotation | Scale |
|---|---|---|---|
| Original | (4, 4) | 0.1000 | 0.9000 |
| Proposed | (4, 4) | 0.1047 | 0.8980 |
| SIFT | (4, 4) | 0.1000 | 0.9000 |
| SURF | (4, 5) | 0.0998 | 0.9010 |

TABLE 9

Execution time for registering one pair of images of size 512 × 512. SURF and Proposed used MATLAB code while SIFT used C code. According to H. Bay, A. Ess, T. Tuytelaars and L. Van Gool "SURF: Speeded Up Robust Features," Computer Vision and Image Understanding (CVIU), vol. 110, no. 3, pp. 346-359, 2008, SIFT should be slower than SURF if both used MATLAB.

| | SURF | SIFT | Proposed |
|---|---|---|---|
| Time in Seconds | 5.19 | 2.80 | 4.91 |

An alternative to the third embodiment of the invention is disclosed in a fourth embodiment the description of which follows.

The fourth embodiment of the Image Pre-processing system 130 is an enhanced version of the third embodiment, characterized by a different order of rotating and resizing the distorted image. Recapitulating the operations of the third embodiment: the Distorted Image Y is first centered to yield the centered image $Y_1$, then resized (scaled) to match the size of the reference image yielding the normalized image $Y_2$. The rotation angle is determined by correlating angles of Radon transforms of the Reference Image X and the normalized image $Y_2$. The normalized image $Y_2$ is then rotated to align its orientation with that of the Reference Image X, yielding the rotated Distorted Image $Y_3$; and finally the rotated Distorted Image $Y_3$ is translated horizontally and vertically to align it with the Reference Image X, thereby producing the registered image Y. Significantly, the fourth embodiment differs in that, instead of scaling the Distorted Image Y before computing the Radon transforms, in the fourth embodiment the Reference Image X is scaled to match the size of the Distorted Image Y before Radon transforms are computed, and the required resizing of the distorted image is done at the end, after rotation and translation moves are done.

Note, that for easy of reading the description, some variable names of the third embodiment are reused in the fourth embodiment.

Figure 23:
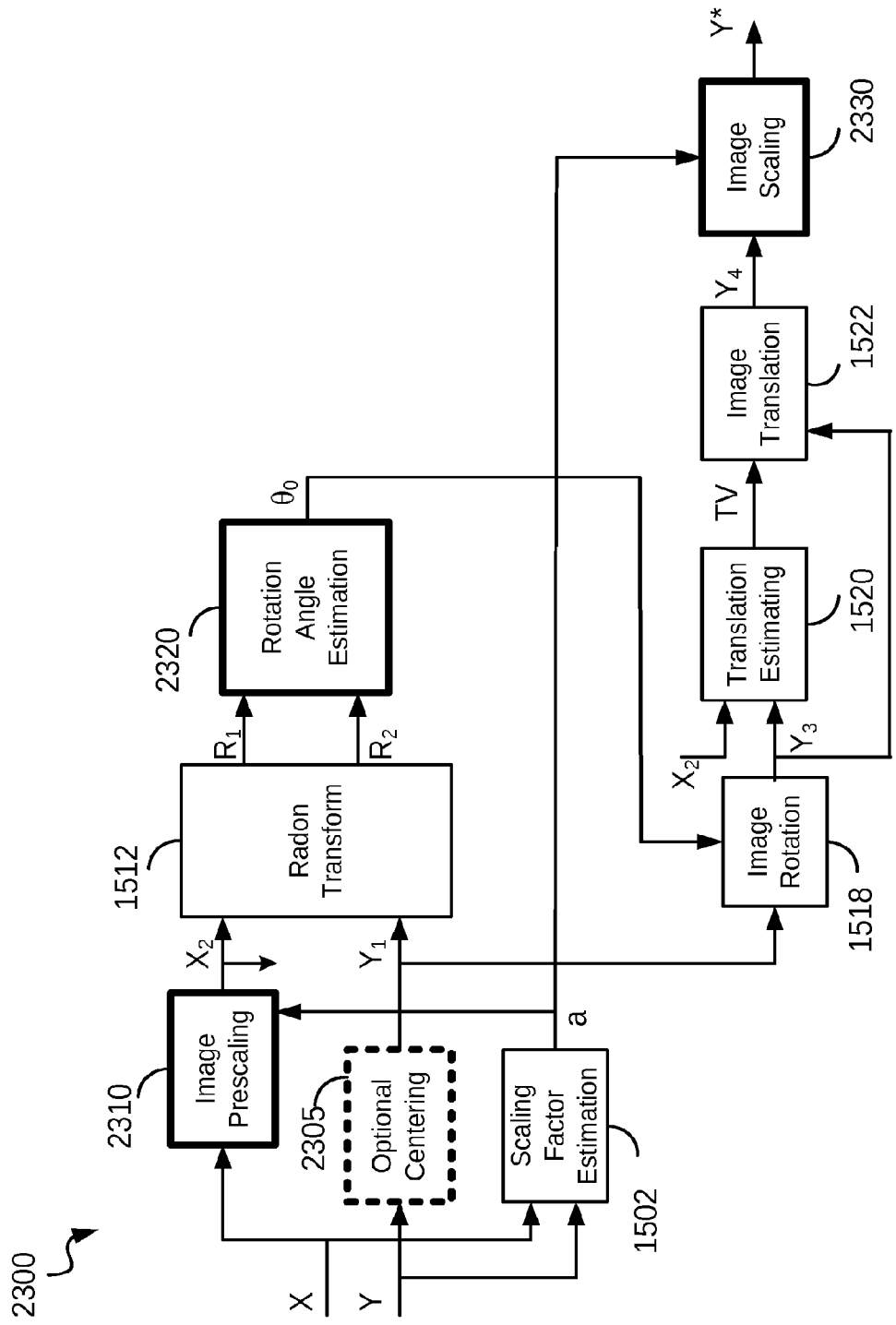
FIG. 23 shows a block diagram of an enhanced Radon Transform based image alignment system 2300 which is a fourth embodiment of the invention.

FIG. 23 shows a block diagram of an enhanced Radon Transform based image alignment system 2300 which is a fourth embodiment of the Image Pre-processing system 130 of FIG. 1, comprising the following modules:
the Scaling Factor Estimation module 1502 of FIG. 15 for determining the scale factor "a";
an Optional Centering module 2305 for generating the centered image $Y_1$, comprising the Image Masking module 1504, the Centroid Computation module 1506, and the Image Centering module 1508 of FIG. 15.
an Image Prescaling module 2310 for scaling the Reference Image X by the inverse of the scale factor "a" into a resized Reference Image $X_2$;
a second Rotation Angle Determination unit 2315 comprising:
Radon Transform module 1512 for generating Radon transforms $R_1$ and $R_2$ of the resized Reference Image $X_2$ and the centered image $Y_1$ respectively; and a Rotation Angle Estimation block 2320 for extracting angles from the Radon transforms R1 and R2, eliminating shift effects from the angles, and determining the rotation angle "$\theta_0$";
the Image Rotation module 1518 of FIG. 15 in which the centered image $Y_1$ is rotated by the rotation angle "$\theta_0$" to form a rotated Distorted Image $Y_3$ which however may still be offset laterally from the Reference Image X;
the Translation Estimating module 1520 of FIG. 15 in which an offset vector "TV" between the rotated Distorted Image $Y_3$ and the resized Reference Image $X_2$ is determined;
the Image Translation module 1522 of FIG. 15 in which the offset vector "TV" is applied to the rotated Distorted Image $Y_3$ to generate a compensated image $Y_4$;
an Image Scaling module 2330 for scaling the compensated image $Y_4$ by the scale factor "a" to the size of the Reference Image X and thus generate the Registered Image Y*.

The modules 1502, 1512, 1518, 1520, and 1522 used in the enhanced Radon Transform based image alignment system 2300 have the same functionality here as in the first Radon Transform based image alignment system 1500 of FIG. 15, although their input and output data may be changed.

The modules 2310 responsible for prescaling of the image X, and 2330 responsible for final scaling of image $Y_4$ to produce the registered image Y*, of the enhanced Radon Transform based image alignment system 2300 are adapted to the changed topology.

The module 2305, comprising the Image Masking module 1504, the Centroid Computation module 1506, and the Image Centering module 1508 of FIG. 15, and having the same functionality, is optional in the enhanced Radon Transform based image alignment system 2300. The functionality of the Image Centring module may also be used to center the image X before prescaling X. In variations of the enhanced Radon Transform based image alignment system 2300, the building blocks of FIG. 14 may also be assembled differently, for example it is possible to pre-scale the centred image $Y_1$ instead of prescaling X, for the purpose of determining the rotation angle.

Figure 24:
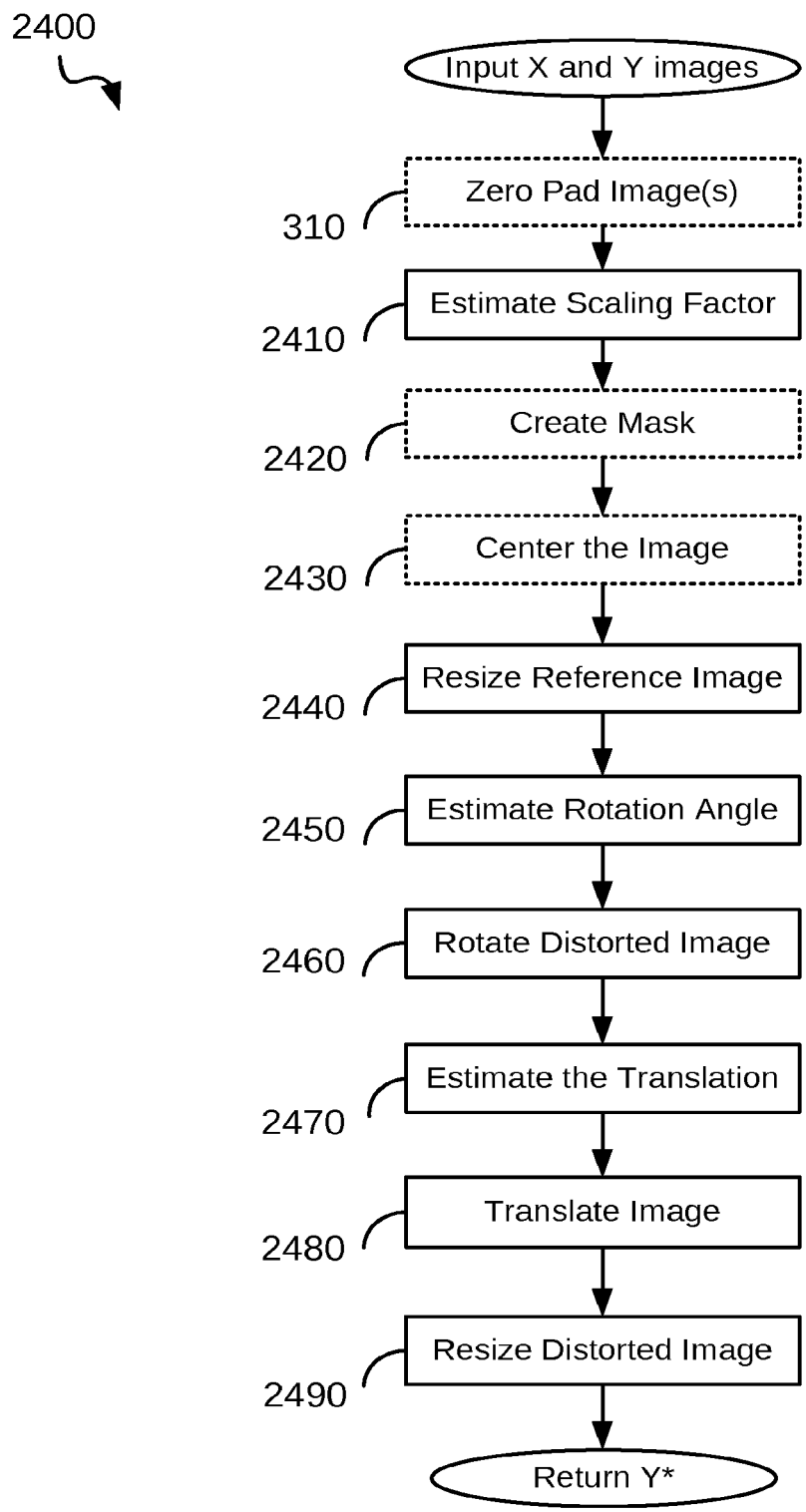
FIG. 24 shows a second Radon Transform based method 2400 for the system of FIG. 23.

FIG. 24 shows a second Radon Transform based method 2400 that may be instantiated in the modules of the enhanced Radon Transform based image alignment system 2300 including steps:
2410 "Estimate Scaling Factor";
2420 "Create Mask";
2430 "Center the Image";
2440 "Resize the Reference Image X to generate the resized Reference Image $X_2$";
2450 "Estimate the Rotation Angle";
2460 "Rotate Distorted Image";
2470 "Estimate the translation";
2480 "Translate Image"; and
2490 "Resize Distorted Image".

If the Reference Image X and the Distorted Image Y do not have the same number of pixels, then we pad zeros around the smaller image in the step 310 "Zero Pad Image(s)" as described earlier. From now on, X and Y refer to the zero padded versions of X and Y.

In the step 2410 "Estimate Scaling Factor", equivalent to the step 1610 of FIG. 16, the scaling factor "a" is determined, as described earlier.

The steps 2420 "Create Mask" and 2430 "Center the Image" (respectively equivalent to the steps 1620 and 1630 of FIG. 16 of the first Radon Transform based method 1600) for centering the Distorted Image Y are optional in the second Radon Transform based method 2400 and may not be required here, because a more robust Radon transform operation is used. However, if the eventual rotation of the image will result in many pixels to be missing (lying outside the frame), then the parameter estimation would be less accurate. Therefore, for increased robustness, one may still choose to calculate the centroid and align the images (steps 1620 and 1630) to convert the Distorted Image Y into the centered image $Y_1$. Similarly, not shown here, the Reference Image X may optionally be centered as well.

In the step 2440 "Resize the Reference Image X to generate the resized Reference Image $X_2$", the inverse 1/a of the calculated scaling factor "a" is used to generate the resized Reference Image $X_2$ from the Reference Image X such that it has the same scale as the Distorted Image Y. This step is advantageous in the estimation the rotation angle. Let us denote the resized Reference Image as $X_2(m,n)=X(m*a,n*a)$.

In the step 2450 "Estimate the Rotation Angle", the rotation angle "$\theta_0$" between the Reference Image X and the Distorted Image $Y_1$ from correlations of the outputs of Radon transforms R1 and R2 of the resized Reference Image $X_2$ and of the Distorted Image $Y_1$ respectively.

Figure 25:
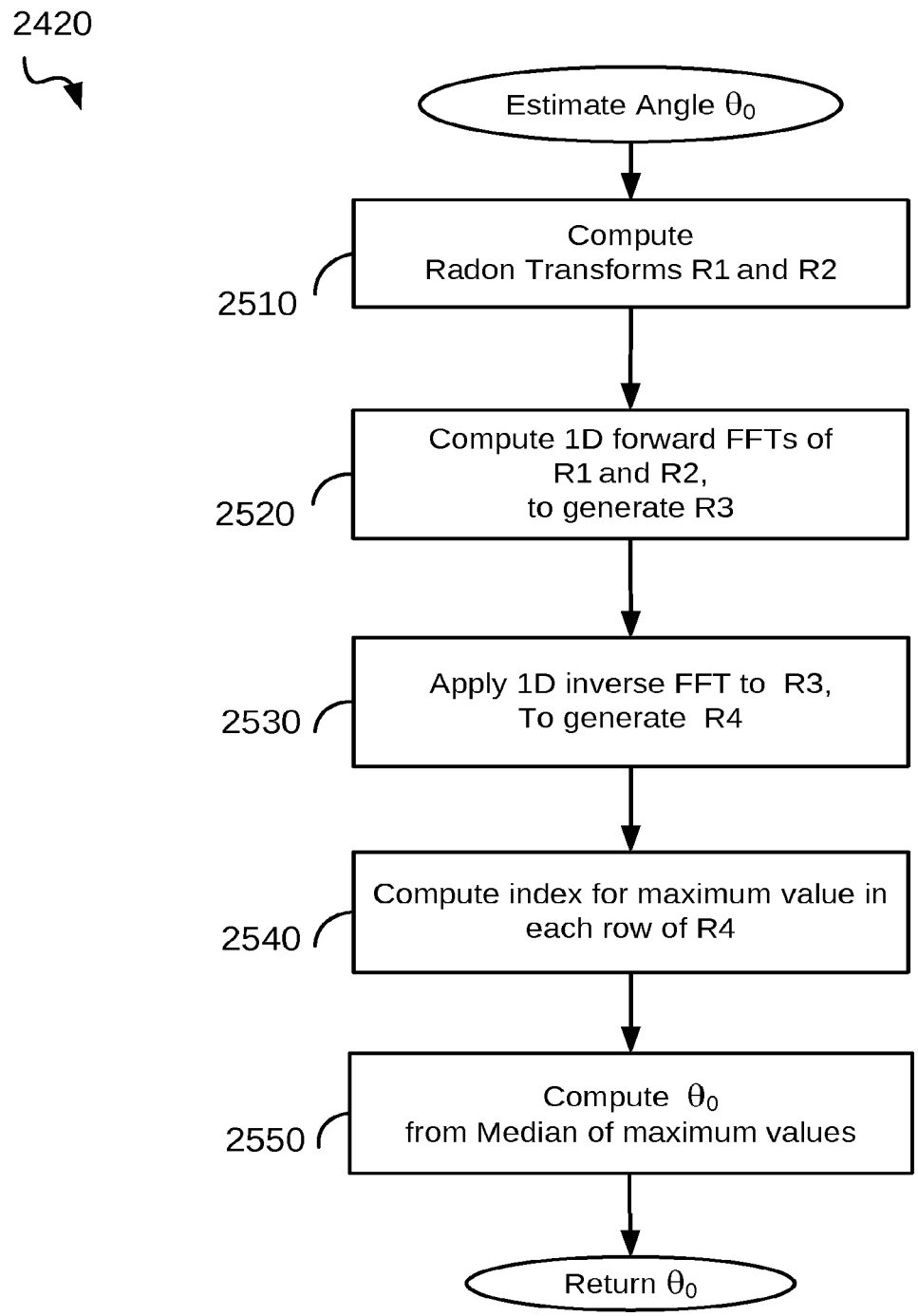
FIG. 25 shows an expansion of the step 2450 "Estimate the Rotation Angle" of FIG. 24.

FIG. 25 shows an expansion of the step 2450 "Estimate the Rotation Angle", comprising steps:
2510 "Compute Robust Radon Transforms";
2520 "Compute 1D forward FFTs of R1 and R2 to generate R3";
2530 "Apply 1D inverse FFT to R3 to generate R4";
2540 "Compute index for maximum value in each row of R4"; and
2550 "Compute $\theta_0$ from median of maximum values".

In the step 2510 "Compute Robust Radon Transforms R1 and R2", Radon transforms R1 and R2 are computed for the resized Reference Image $X_2$, and the centered image $Y_1$ (or the Distorted Image Y instead if centering of the image in the steps 1620 and 1630 was skipped) respectively. The Radon transform of a 2D discrete function A(x,y) is defined by equation (29), following A. Averbuch, R. R. Coifman, D. L. Donoho, M. Israeli, Y. Shkolnisky and I. Sedelnikov. A framework for discrete integral transformations II—the 2D discrete Radon transform. SIAM Journal on Scientific Computing, 30(2):785-803, 2008:

$$R(r, \theta) = \int_x \int_y A(x, y)\delta(r - x\cos\theta - y\sin\theta) \, dx \, dy \quad (29)$$

where $\delta(\ )$ is the Dirac delta function.

According to Averbuch et al., we can perform the discrete Radon transform of $X_2$ and Y (or $Y_1$ if centering had not been skipped), denoted as $R1(r,\theta)$ and $R2(r,\theta)$, respectively, where both of them are of size K×L.

One can then take the 1D FFT along the r direction for both $R1(r,\theta)$ and $R2(r,\theta)$ and take the magnitude of the resulting matrices. This will eliminate the shift along a line with angle θ. For example, if the location of rotation is (x0,y0), then the spatial shift on the line with angle θ will be:

$$b = x0 \cos(\theta) + y0 \sin(\theta).$$

By taking the FFT along this line and obtain the magnitude, we can later eliminate the shift b. This will improve the accuracy of both the rotation angle and global spatial shifts.

Based on the premise that the two images (the resized Reference Image $X_2$ and the Distorted Image Y or its centered version $Y_1$) are the same or at least very similar except for the rotation between them and possible noise, it follows that their Radon transforms $R_1(r,\theta)$ and $R_2(r,\theta)$ are substantially the same, except for the circular shift along the θ direction, i.e., $R_2(r,\theta) = R_1(r,\theta+\theta_0)$. The circular cross-correlation could be used to calculate $\theta_0$, but this would be time-consuming, with a computational complexity of $O(KL^2)$ because for every row of $R_1$ and $R_2$, one would need to circularly shift $R_2$ and then calculate the cross-correlation between the two rows. This has a computational complexity of $O(L^2)$. Since there are K rows in total, the total computational complexity would be $O(KL^2)$.

As a more efficient alternative, one can use the one-dimensional (1D) FFT instead, which has a computational complexity of $O(KL\log L)$.

The method for computing a cross correlation by FFT, on which the preferred method of the fourth embodiment rests is the same as that used in the third embodiment, please see the general description under the step 1660 above, but it is augmented by elimination of shift effects described above.

Based on the above discussion, we use the fast cross-correlation to find $\theta_0$, which has a computational complexity of $O(KL\log L)$.

Let us denote the $m^{th}$ row of $R_1$ and $R_2$ as $r_1(n)$ and $r_2(n)$, respectively, where $n \in [1,L]$. We are looking for the offset for which the cross-correlation is maximum, i.e. for which the two rows $r_1(n)$ and $r_2(n)$ match the most.

In the step 2520 "Compute 1D forward FFTs of R1 and R2 to generate R3" a 1D forward FFT is performed on each of $r_1(n)$ and $r_2(n)$, to generate a first intermediate result $R3=r_3(u)$:

$$r_3(u) = \text{conj}(\text{FFT}(r_1)) \cdot \text{FFT}(r_2),$$

where "conj" stands for complex conjugate and · is the component-wise product.

In the step 2530 "Apply 1D inverse FFT to R3 to generate R4" the 1D inverse FFT is applied to $r_3(u)$, i.e. a second intermediate result $R4=r_4(n)=\text{IFFT}(r_3(u))$ is calculated. The second intermediate result R4 constitutes a vector of cross correlation values between combinations of rows of the Radon transforms R1 and R2.

In the step 2540 "Compute index for maximum value in each row of R4", we find the location index $\theta^*(m)$ of the maximum value on every row of the obtained second intermediate result R4=

$$r_4(n), \text{ i.e. } \theta*(m) = -\max_{1 \leq n \leq L} r_4(n).$$

In the step 2550 "Compute $\theta_0$ from median of maximum values", we take the median of these maximum values as $\theta_0 = \text{median}(\theta^*(m))$.

The following MATLAB code sample 3 implements the estimation of the rotation angle.

MATLAB code sample 3

```
function [theta]=ridgeletNew(A,B)
% Radon transform
theta0=0:180;
[B1,xp1] = radon(B,theta0); B1=B1';
[A,xp1] = radon(A,theta0); A=A';
[dim2,col2]=size(A);
A(dim2+(1:dim2),1:col2)=A(1:dim2,col2:-1:1);
B1(dim2+(1:dim2),1:col2)=B1(1:dim2,col2:-1:1);
% Taking Fourier transform to get rid of shift effect
Anew=abs(fft(A')'); Anew=Anew(:,2:30);
B1new=abs(fft(B1')'); B1new=B1new(:,2:30);
[dim2,col2]=size(Anew) ;
% Correlation
ftA=fft(Anew);
ftB=fft(B1new);
pro=ftA.*conj(ftB);
ift=real(ifft(pro));
for ii=1:col2,
    ifc=ift(:,ii) ,
    mft0=find(ifc==max(ifc(:)));
    mft(ii)=min(mft0(:));
    if mft(ii)>dim2/2,
        mft(ii)=floor(mft(ii)-dim2/2+0.5);
    end
end
mft
theta=(median(mft-1))*pi/180; % -1
```

Returning now to the description of FIG. 24.

In the step 2460 "Rotate Distorted Image", the Distorted Image Y is rotated by −θ degrees in order to compensate for the orientation difference. The result of the rotation is a rotated Distorted Image $Y_3$.

In the step 2470 "Estimate the translation", the necessary translation of the rotated Distorted Image $Y_3$ to be aligned with the resized Reference Image $X_2$ is determined as a function of $X_2$ and $Y_3$.

For translation, one may choose the global motion compensation (MC) method proposed in G. Varghese and Z. Wang, "Video denoising based on a spatiotemporal Gaussian scale mixture model," IEEE Transactions on Circuits and Systems for Video Technology, vol. 20, no. 7, pp. 1032-1040, 2010, which is a simple, fast, and reliable method, providing integer pixel precision. Let $Y_3(m,n)$ be the image that has already been compensated for rotation, and $X_2(m,n)$ the scaled reference image. Also, $$F_1(u,v) = \frac{1}{MN} \sum_{m=1}^{M} \sum_{n=1}^{N} X(m,n) e^{-i(um/M+vn/N)} \quad (30)$$

$$F_2(u,v) = \frac{1}{MN} \sum_{m=1}^{M} \sum_{n=1}^{N} Y_3(m,n) e^{-i(um/M+vn/N)}. \quad (31)$$

Then, we can define the fast cross-correlation (FC) function in equation (32) as:

$$k_{FC}(m,n) = \text{IFFT}_2(\text{conj}(F_1(u,v)) \cdot F_2(u,v)), \quad (32)$$

where $\text{IFFT}_2$ is the inverse 2D Fourier transform, conj the complex conjugate, and the symbol · denotes the component-wise product. The estimated motion vector (translation vector) is given in equation (33) as:

$$(m_{opt}, n_{opt}) = \text{argmax}_{(m,n)} k_{FC}(m,n). \quad (33)$$

In the step 2480 "Translate Image", the calculated translation vector is applied to the rotated Distorted Image $Y_3$ to compensate for the translation and yield a translated image $Y_4$. We denote this function formally as $Y_4(m,n)=Y_3(m-m_{opt}, n-n_{opt})$.

In the step 2490 "Resize Distorted Image", the calculated scaling factor a is used to resize the translated image $Y_4$ such that it has the same scale as the Reference Image X in order to obtain the final image, i.e. the registered image Y*, which has now been compensated for translation, rotation and scaling. We denote this function formally as $Y^*(m,n)=Y_4(m/a,n/a)$.

The system of the fourth embodiment of the invention, shown in FIG. 23, is very robust due in part to the process used for the Radon transform, and in contrast to system of the third embodiment works well for any rotation angle.

Figure 26:
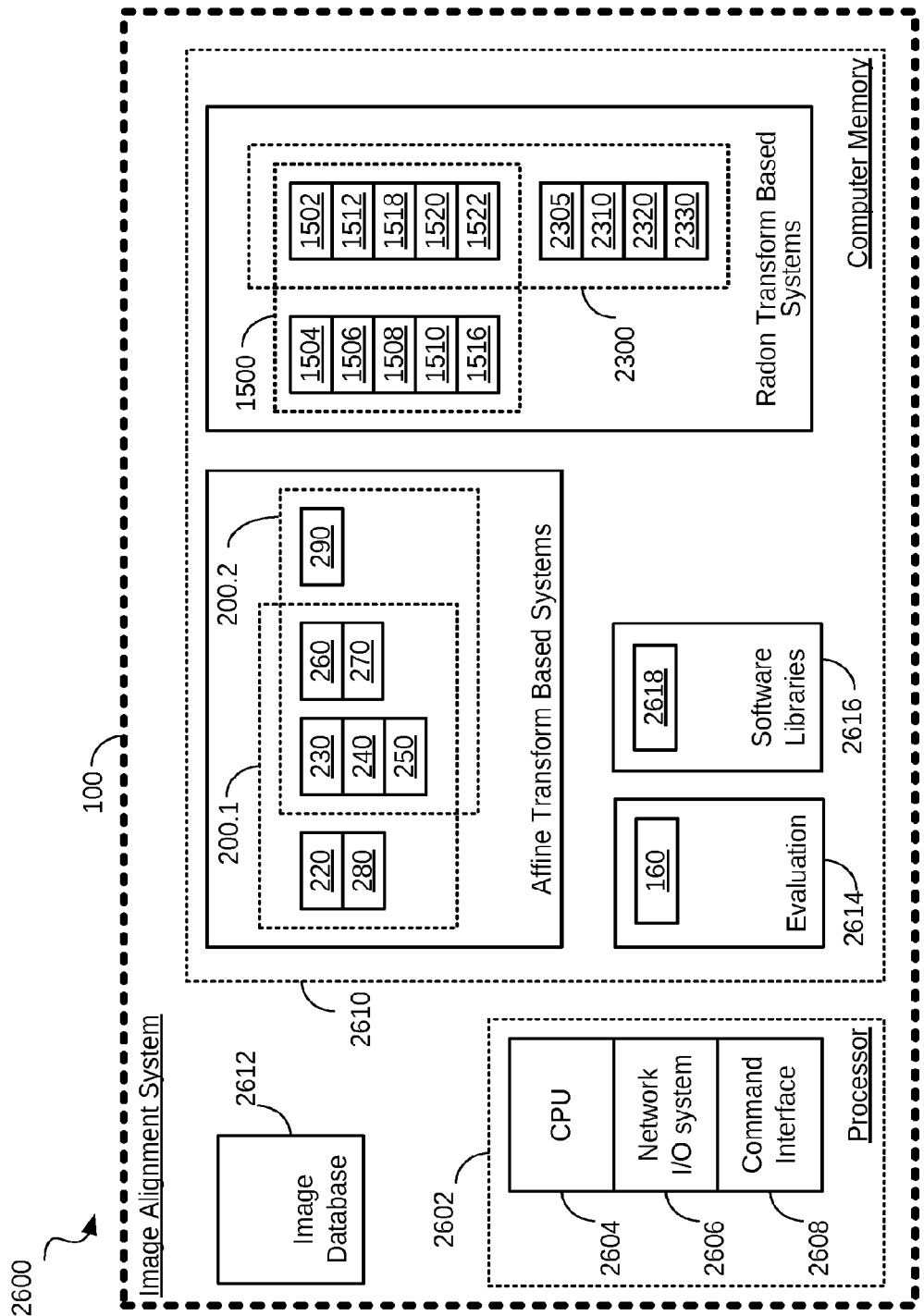
FIG. 26 shows a combined block diagram 2600 of embodiments of the Image Alignment system 100.

FIG. 26 shows a combined block diagram 2600 of embodiments of the Image Alignment system 100 as implemented for the purpose of verification, including: a Processor 2602 comprising a CPU 2604, a Network I/O system, and a Command Interface 2608; a Computer Memory 2610 in the form of a non-transitory computer readable storage medium such a memory, DVD, CD-ROM or the like, comprising computer readable instruction stored thereon for execution by the processor; and an image database 2612 containing reference images and test images for processing by the Image Alignment system 100. The computer readable instruction stored in the Computer Memory 2610 include software modules for implementing at least one of the embodiments of the invention, specifically: the Affine Transform based image alignment system 200.1; the alternative Affine Transform based image alignment system 200.2; the first Radon Transform based image alignment system 1500; and the enhanced Radon Transform based image alignment system 2300. The Computer Memory 2610 may further include storage of Image Evaluation programs 2614 such as the Image Evaluation process 160, and Software Libraries 2614, for example the MATLAB environment 2618 that was used in the implementation of the embodiments of the invention.

FIG. 26 shows the individual modules of the different embodiments of the invention as overlapping groups of modules, for example the Affine Transform based image alignment system 200.1 and the alternative Affine Transform based image alignment system 200.2 share modules 230, 240, 250, 260, and 270, while the Affine Transform based image alignment system 200.1 further includes modules 220 and 280; and the alternative Affine Transform based image alignment system 200.2 includes module 290 in addition to the shared modules. Similarly, the first Radon Transform based image alignment system 1500 and the enhanced Radon Transform based image alignment system 2300 share a group of modules, namely 1502, 1512, 1518, 1520, and 1522, while the first Radon Transform based image alignment system 1500 further uses modules 1504, 1506, 1508, 1510 and 1516; and the enhanced Radon Transform based image alignment system 2300 includes modules 2305, 2310, 2320, and 2330 in addition to the shared modules.

The embodiments of the present invention include a general purpose or specialized computer having a CPU, which may be a multi-core CPU, and a computer readable medium, e.g., memory, DVD, CD-ROM, floppy, magnetic tape or other storage medium, having computer readable instructions stored thereon, which, when executed by the CPU, form modules of the above noted systems as described above. Alternatively, the systems of FIGS. 2a, 2b, 15, and 23 can include specialized dedicated hardware or a combination of firmware and a specialized computer having a computer readable storage medium having computer readable instructions stored thereon for execution by the CPU for forming modules of these systems as described above. Each module of the systems of FIGS. 2a, 2b, 15, and 23 may include a firmware or, alternatively, computer readable instructions stored in a computer readable storage medium for execution by a processor as shown in FIG. 26.

In conclusion, the present invention provides improved systems and methods for pre-processing a distorted image to align it with a reference image, that may be used to provide more accurate visual quality assessments as well as serve to register the distorted image with the reference image.

Although the embodiments of the invention have been described in detail, it will be apparent to the skilled in the art that variations and modifications to the embodiments may be made within the scope of the following claims.

What is claimed is:

1. An image registration method of processing a first image Y into a registered image Y* which is aligned with a second image X, the method comprising:
using at least one processor for:
(a) determining a scale factor "a" between the reference image X and the distorted image Y;
(b) resizing the distorted image Y by the scale factor "a" thereby generating a normalised distorted image Y2;
(c) determining a rotation angle "$\theta_0$" between the reference image X and the normalised distorted image Y2;
(d) rotating the normalised distorted image Y2 by the rotation angle "$-\theta_0$", thereby obtaining a rotated distorted image Y3; and
(e) obtaining the registered image Y* by translating the rotated distorted image Y3 to be aligned horizontally and vertically with the reference image X.

2. The method of claim 1, wherein the step (a) comprises determining the scale factor "a" by computing a ratio of a sum of pixel values of the reference image X to a sum of pixel values of the distorted image Y.

3. The method of claim 1, wherein the step (a) further comprises padding the smaller of the reference image X and the distorted image Y with zero-valued pixels to equalise horizontal and vertical dimensions of the reference image X and the distorted image Y.

4. The method of claim 1, wherein the step (b) further comprises centering the distorted image Y thereby forming a centered distorted image Y1, and resizing the centered distorted image Y1 by the scale factor "a" to generate the normalised distorted image Y2.

5. The method of claim 1, wherein the step (c) comprises forming Radon transforms R1 and R2 of the reference image X and of the normalised distorted image Y2 respectively, and determining the rotation angle "$\theta_0$" using the Radon transforms R1 and R2.

6. The method of claim 5, wherein the determining the rotation angle "$\theta_0$" comprises computing cross-correlations of rows of the Radon transforms R1 and R2.

7. The method of claim 6, wherein the computing cross-correlations comprises:
(i) computing a set of circular cross-correlations between each of the rows of the Radon transform R1 and each of the rows of the Radon transform R2, each circular cross-correlation defining a rotational offset angle "$\theta$" between the respective rows;
(ii) selecting for each row a circular cross-correlation having the highest value; and
(iii) determining the rotational offset "$\theta$" defined by each selected circular cross-correlation for each row, and setting the rotation angle "$\theta_0$" to equal to the median of the determined rotational offsets "$\theta$".

8. The method of claim 6, wherein the computing cross-correlations comprises:
(iv) computing 1-dimensional (1D) Fast Fourier Transforms (FFTs) of the Radon transform R1 and of the Radon transform R2;

(v) combining the 1D FFTs of the Radon transform R1 and of the Radon transform R2 into an intermediate result R3;

(vi) generating a second intermediate result R4 which comprises the circular cross-correlations, the second intermediate result R4 being based on elements of the intermediate result R3;

(vii) selecting in each row of the intermediate result R3, a circular cross-correlation having the highest value; and (viii) determining a corresponding rotational offset "θ" defined in each selected circular cross-correlation, and setting the rotation angle "$\theta_0$" to equal to the median of the determined rotational offsets "θ".

9. The method of claim 8, wherein the step (v) of combining comprises forming a component-wise product of the 1D FFT of the Radon transform R1 with a "conjugate" function of the 1D FFT of the Radon transform R2.

10. The method of claim 8, wherein the step (vi) comprises: determining for each component, a row, in the second intermediate result R4, a maximum value, corresponding to a respective angle "θ".

11. The method of claim 10, further comprising taking the median of the maximum values, the median corresponding to the rotation angle "$\theta_0$".

12. The method of claim 1, further performing a visual quality assessment on the pre-processed image Y*.

13. The method of claim 12, wherein the visual quality assessment is performed by any one of:
 determining a peak signal-to-noise ratio (PSNR);
 computing a structural similarity (SSIM) index; and
 computing visual information fidelity (VIF) index.

14. An image registration method of processing a first image into a registered image Y* which is aligned with a second image, the method comprising:
 using at least one processor for:
 (a) determining a scale factor "a" between the first image and the second image;
 (b) equalizing the sizes of the first image and the second image by resizing the first image with the scale factor "a" to generate a resized version of the first image;
 (c) using Radon transforms for determining a rotation angle "$\theta_0$" between the resized version of the first image and the second image;
 (d) rotating the resized version of the first image by the rotation angle "$-\theta_0$" and outputting it as the registered image Y* after translating it to be aligned horizontally and vertically with the second image.

15. A system for processing a distorted image Y into a registered image Y* by aligning it with a reference image X, comprising:
 a processor;
 a computer readable storage medium having computer readable instructions stored thereon for execution by the processor, forming:
 a Scaling Factor Estimation module for determining a scale factor "a";
 an Image Resizing module for resizing the distorted image Y into a resized Distorted Image $Y_2$ using the scale factor "a";
 a Rotation Angle Determination unit for estimating a rotation angle "$\theta_0$";
 an Image Rotation module for rotating the resized Distorted Image Y2 by the rotation angle "$-\theta_0$" to form a corrected image Y3; and
 an Image Translation module for translating the corrected image Y3 to generate the Registered Image Y*.

16. The system of claim 15, wherein the Rotation Angle Determination unit further comprises:
 a Radon Transform module for generating Radon transforms R2 and R1 of the resized Distorted Image Y2 and the Reference Image X respectively; and
 a Radon Transforms Correlation module for estimating a rotation angle "$\theta_0$" from the Radon transforms R2 and R1.

17. The system of claim 16, wherein the Radon Transforms Correlation module is configured to determine the rotation angle "$\theta_0$" by computing cross-correlations of rows of the Radon transforms R1 and R2.

18. The system of claim 15, further comprising an Image Evaluation module process module for performing a visual quality assessment on the registered image Y*.

19. The system of claim 18, wherein the Image Evaluation module process module is configured to perform the visual quality assessment by any one of:
 determining a peak signal-to-noise ratio (PSNR);
 computing a structural similarity (SSIM) index; and
 computing visual information fidelity (VIF) index.

20. The system of claim 15, further comprising:
 an Image Centering module for centering the distorted image Y and generate a centered image Y1;
 wherein the Image Resizing module is configured to perform resizing the centered image Y1 into the resized Distorted Image Y2 using the scale factor "a".

21. The system of claim 20, further comprising:
 an Image Masking module for extracting a masked image Y0 from the distorted image Y; and
 a Centroid Computation module for determining centering parameters "$c_r$" and "$c_c$" from the masked image Y0;
 wherein the Image Centering module is configured to generate the centered image Y1 from the distorted image Y, using the centering parameters "$c_r$" and "$c_c$".

22. The system of claim 15, further comprising:
 a Translation Estimating module for determining an offset vector "TV" between the corrected image Y3 and the Reference Image X;
 wherein the Image Translation module is configured to translate the corrected image Y3 to generate the Registered Image Y* using the offset vector "TV".

* * * * *